United States Patent
Hoag et al.

(10) Patent No.: US 7,976,241 B2
(45) Date of Patent: Jul. 12, 2011

(54) SOIL REMEDIATION METHOD AND COMPOSITION

(75) Inventors: George E. Hoag, Storrs, CT (US); John Collins, Amston, CT (US)

(73) Assignee: VeruTEK Technologies, Inc., Bloomfield, CT (US)

( * ) Notice: Subject to any disclaimer, the term of this patent is extended or adjusted under 35 U.S.C. 154(b) by 319 days.

(21) Appl. No.: 12/068,653

(22) Filed: Feb. 8, 2008

(65) Prior Publication Data

US 2008/0207981 A1    Aug. 28, 2008

Related U.S. Application Data

(63) Continuation of application No. PCT/US2007/007517, filed on Mar. 27, 2007.

(60) Provisional application No. 60/785,972, filed on Mar. 27, 2006.

(51) Int. Cl.
| | |
|---|---|
| B09B 1/00 | (2006.01) |
| B09C 1/00 | (2006.01) |
| B09C 1/02 | (2006.01) |
| B09C 1/08 | (2006.01) |
| B09C 1/10 | (2006.01) |
| B09C 1/06 | (2006.01) |
| G21F 9/00 | (2006.01) |
| A62D 3/00 | (2007.01) |
| A62D 3/30 | (2007.01) |
| A62D 3/38 | (2007.01) |

(52) U.S. Cl. ........... 405/128.15; 405/128.1; 405/128.45; 405/128.5; 405/128.55; 405/129.2; 588/313; 588/320; 588/400

(58) Field of Classification Search ....... 405/128.1–131; 588/312–400

See application file for complete search history.

(56) References Cited

U.S. PATENT DOCUMENTS

| | | |
|---|---|---|
| 3,640,821 A | 2/1972 | Sweeny et al. |
| 3,938,590 A | 2/1976 | Redford et al. |
| 4,068,717 A | 1/1978 | Needham et al. |
| 4,101,172 A | 7/1978 | Rabbitts |
| 4,229,281 A | 10/1980 | Alquist |
| 4,321,147 A | 3/1982 | McCoy et al. |
| 4,338,185 A | 7/1982 | Noelle |
| 4,353,806 A | 10/1982 | Canter et al. |
| 4,360,061 A | 11/1982 | Canter et al. |
| 4,368,111 A | 1/1983 | Siefkin et al. |
| 4,389,300 A | 6/1983 | Mitchell |
| 4,405,015 A | 9/1983 | Mc Coy et al. |
| 4,470,899 A | 9/1984 | Miller et al. |

(Continued)

FOREIGN PATENT DOCUMENTS

EP    0706427 B1    2/1998

(Continued)

OTHER PUBLICATIONS

Diallo et al. "Solubilization of nonaqueous phase liquid hydrocarbons in micellar solutions of dodecyl alcohol ethoxylates" Environ. Sci. Technol. 1994, 28, pp. 1829-1837.*

(Continued)

*Primary Examiner* — Jerry Lorengo
*Assistant Examiner* — Jennifer A Smith
(74) *Attorney, Agent, or Firm* — Venable LLP; Michael A. Gollin; Lars H. Genieser

(57) ABSTRACT

A method for in-situ reduction of contaminants in soil.

59 Claims, 22 Drawing Sheets

Enhanced Dissolution of MGP DNAPL with Citrus Burst-3

U.S. PATENT DOCUMENTS

| | | | |
|---|---|---|---|
| 4,474,616 A | 10/1984 | Smith et al. | |
| 4,968,412 A | 11/1990 | Guymon | |
| 5,000,872 A | 3/1991 | Olah | |
| 5,009,773 A | 4/1991 | Schramm et al. | |
| 5,143,598 A | 9/1992 | Graham et al. | |
| 5,286,141 A | 2/1994 | Vigneri | |
| 5,319,966 A | 6/1994 | Jackson et al. | |
| 5,340,467 A | 8/1994 | Gregoli et al. | |
| 5,399,350 A | 3/1995 | Potter | |
| 5,414,207 A * | 5/1995 | Ritter | 588/317 |
| 5,484,549 A | 1/1996 | Hei et al. | |
| 5,560,737 A | 10/1996 | Schuring et al. | |
| 5,602,090 A | 2/1997 | Melikyan et al. | |
| 5,622,641 A | 4/1997 | Kim et al. | |
| 5,641,020 A | 6/1997 | Cherry et al. | |
| 5,741,427 A | 4/1998 | Watts et al. | |
| 5,829,691 A * | 11/1998 | Gaudin | 241/46.01 |
| 5,849,201 A | 12/1998 | Bradley | |
| 5,905,036 A | 5/1999 | Pope et al. | |
| 5,919,487 A | 7/1999 | Simmonnet et al. | |
| 5,948,242 A | 9/1999 | Ohsol et al. | |
| 6,019,548 A | 2/2000 | Hoag et al. | |
| 6,019,888 A | 2/2000 | Mishra et al. | |
| 6,039,882 A | 3/2000 | Wolfe et al. | |
| 6,099,206 A | 8/2000 | Pennell | |
| 6,127,319 A | 10/2000 | House | |
| 6,158,924 A | 12/2000 | Athens et al. | |
| 6,242,663 B1 | 6/2001 | Ponder et al. | |
| 6,261,463 B1 | 7/2001 | Jacob et al. | |
| 6,274,048 B1 | 8/2001 | Parker et al. | |
| 6,315,494 B1 | 11/2001 | Oberle | |
| 6,321,595 B1 | 11/2001 | Pope et al. | |
| 6,352,387 B1 | 3/2002 | Briggs | |
| 6,387,278 B1 | 5/2002 | Leif et al. | |
| 6,474,908 B1 | 11/2002 | Hoag et al. | |
| 6,511,954 B1 | 1/2003 | Wilbur et al. | |
| 6,596,190 B1 | 7/2003 | Igawa et al. | |
| 6,623,211 B2 | 9/2003 | Kukor et al. | |
| 6,689,485 B2 | 2/2004 | Ponder et al. | |
| 6,719,902 B1 | 4/2004 | Alvarez et al. | |
| 6,726,406 B2 | 4/2004 | Gilmore et al. | |
| 6,777,449 B2 | 8/2004 | Vance et al. | |
| 6,866,764 B2 | 3/2005 | Dalman et al. | |
| 6,869,535 B2 | 3/2005 | Cowdery et al. | |
| 6,881,709 B2 | 4/2005 | Nelson et al. | |
| 6,913,419 B2 * | 7/2005 | Shiau | 405/128.25 |
| 6,945,734 B1 | 9/2005 | Hayes et al. | |
| 7,021,863 B2 | 4/2006 | Shiau | |
| 7,056,061 B2 | 6/2006 | Kukor et al. | |
| 7,066,254 B2 | 6/2006 | Vinegar et al. | |
| 7,128,841 B2 | 10/2006 | Zhang | |
| 7,141,162 B2 | 11/2006 | Garner et al. | |
| 7,186,673 B2 | 3/2007 | Varadaraj et al. | |
| 7,192,092 B2 | 3/2007 | Watson | |
| 7,229,950 B2 | 6/2007 | Shpakoff et al. | |
| 7,334,965 B2 | 2/2008 | Yang | |
| 7,364,386 B2 | 4/2008 | Shiau | |
| 7,431,775 B2 | 10/2008 | Wang | |
| 2002/0011442 A1 | 1/2002 | McMurtrey et al. | |
| 2002/0179530 A1 * | 12/2002 | Cowdery et al. | 210/638 |
| 2003/0059926 A1 | 3/2003 | DeTorres | |
| 2003/0175081 A1 * | 9/2003 | Shiau | 405/128.7 |
| 2004/0228690 A1 | 11/2004 | Stegemeier et al. | |
| 2005/0077242 A1 | 4/2005 | Karlsson | |
| 2005/0191131 A1 | 9/2005 | Shiau | |
| 2005/0197267 A1 | 9/2005 | Zaki | |
| 2006/0046297 A1 | 3/2006 | Ball | |
| 2006/0054570 A1 | 3/2006 | Block et al. | |
| 2006/0175266 A1 | 8/2006 | Rima et al. | |
| 2007/0116524 A1 | 5/2007 | Shiau | |
| 2008/0207981 A1 * | 8/2008 | Hoag et al. | 588/320 |
| 2008/0237141 A1 | 10/2008 | Kerfoot | |
| 2009/0245939 A1 | 10/2009 | Burns et al. | |
| 2010/0209193 A1 | 8/2010 | Hoag et al. | |
| 2010/0209194 A1 | 8/2010 | Guite et al. | |

FOREIGN PATENT DOCUMENTS

| | | |
|---|---|---|
| WO | WO/95/01232 | 1/1995 |
| WO | WO/98/25857 | 6/1998 |
| WO | WO/03/068324 | 8/2003 |
| WO | WO 2006/055054 | 5/2006 |
| WO | WO 2007/126779 | 11/2007 |
| WO | WO 2009/014697 | 1/2009 |
| WO | WO 2009/042223 | 4/2009 |
| WO | WO-2009/042224 A1 | 4/2009 |
| WO | WO-2009/114145 A2 | 9/2009 |

OTHER PUBLICATIONS

Adventus Group. Products: Overview for Accelerated Bioremediation. Accessed Apr. 15, 2007, www.adventusgroup.com/products/technologies.shtml.

Adventus Group. ISCR vs. ISCO? The Choice is Usually Clear. Accessed Apr. 15, 2007, www.adventusgroup.com.

Adventus Group. Compounds Treated with Adventus Technologies. Accessed Apr. 15, 2007, www.adventusgroup.com/solutions/compounds-treated.shtml.

Adventus Group. Groundwater Solutions. Accessed Apr. 15, 2007, www.adventusgroup.com/solutions/groundwater.shtml.

Anastas PT, Warner JC. Green Chemistry: Theory and Practice, Oxford University Press, Inc: New York. 1998.

Arcadis. IRZ Technology. Accessed Apr. 16, 2007, www.arcadis-us.com/service+types/environment.

Arcadis. Perchlorate. www.arcadis-us.com.

Beal DR, Faircloth H, Tackling Tough Groundwater Contaminants: the presence of dense non-aqueous-phase liquids (DNAPLs) in the sub-surfaces requires some unconventional approaches to site investigation and remediation, Chemical Engineering, Mar. 2002, 91-94.

Bergendahl J, Thies T. Advanced Oxidation of MTBE with Zero-valent Iron and Hydrogen Peroxide, 3rd International Conference on Oxidation Technologies for Water and Wastewater Treatment, Goslar, Germany, May 18-22, 2003.

Bergendahl JA, Thies T. Fenton's Oxidation of MTBE with Zero Valent Iron. Water Research 2004, 38: 2.

Berlin AA. Kinetics of Radical-Chain Decomposition of Persulfate in Aqueous Solutions of Organic Compounds, Kinetics and Catalysis 1986, 27: 34-39.

Block, PA, Brown RA, Robinson, D. Novel activation technologies for sodium persulfate in situ chemical oxidation. Proceedings of the Fourth International Conference on the Remediation of Chlorinated and Recalcitrant Compounds, Monterey, CA, May 2004. Batelle Press, Columbus, OH. 2004.

Boussahel R, Harik D, Mammar M, Lanara-Mohamed S. Degradation of Obsolete DDT by Fenton Oxidation with Zero-Valent Iron., Desalination 2007, 206: 369-372. Presented at the EuroMed 2006 Conference on Desalination Strategies in South Mediterranean Countries, Montpellier, France May 21-25, 2006.

Business Publishers, Surfactant Makes DNAPLS Soluble, Enhances Ground Water Treatment, Ground Water Monitor, Dec. 1993, 9:24.

Carvel DD, Cartwright RT Innovative heavy oil contaminant remediation at typical MGP remediation sites. 2005. Unpublished data from web sites: http://www.mecx.net/servicesl.html.

Chang M, Shu H, Yu H. An Integrated technique using Zero Valent Iron and UV/H202 Sequential Process form Complete Decolorization and Mineralization of C.I. Acid Black 24 Wastewater. Journal of Hazardous Materials 2006, B 138: 574-581.

Choi CW, Kin SC, Hwang SS, Choi BK, Ahn HJ, Lee MY, Park SH, Kim SK. Antioxidant activity and free radical scavenging capacity between Korean medicinal plants and flavonoid by assay-guided comparison. Plant Science 2002, 16: 1161-1168.

Chun H, Scriven LE. Hydrodynamic model of steady movement of a solid/liquid/fluid contact line. J. Colloid Interface Sci. 1971, 35: 85-101.

Coutteneye RA, Huang KC, Hoag GE, Suib SL. Evidence of Sulfate Free Radical ($SO_4$) Formation under Heat-assisted Persulfate Oxidation of MTBE. Proceedings of the 19th Petroleum Hydrocarbons and Organic Chemicals in Ground Water: Prevention, Assessment, and Remediation, Conference and Exposition, Atlanta, GA, United States, Nov. 5-8, 2002, 345-350.

Dahl JA, Maddux LS, Hutchison JE, Toward Greener Nanosynthesis, Chem. Rev. 2007, 107: 2228.

Das, S K, Butler, R M. Mechanism of the Vapor Extraction Process for Heavy Oil and Bitumen. J Petroleum Sci. and Eng. 1998. 21: 43-59.

Diallo, MS, Abriola, LM, Weber, Jr, WJ. Solubilization of Nonaqueous Pahe Liquid Hydrocarbons in Micellar Solutions of Dodecyl Alcohol Ethoxylates. Environ. Sci.1994, 28, 1629-1637.

Edwards, DA, Luthy, RG, Lly, Z. Solubilization of Polycyclic Hydrocarbons in Micellar Nonionic Surfactant Solutions. 1991 Environ. Sci. Technol. 25:127-133.

Engelhardt R, Todirescu M. An Introduction to Development in Alberta's Oil Sands. University of Alberta. Canada. Feb. 2005.

EOS Remediation Inc. Emulsified Edible Oils for Anaerobic Bioremediation. Accessed Apr. 15, 2007, www.eosremediation.com.

EOS Remediation Inc. Product Literature for Emulsified Oil Substrate. Accessed Apr. 15, 2007, www.eosremediation.com/literature/EOS_Family_of_%20Products.html.

Falta RW. Using Phase Diagrams to Predict the Performance of Cosolvent Floods for NAPL Remediation. Ground Water Monit. Rem. 1998, 18(3): 227-232.

Flaming JE, Knox RC, Sabatini DA, Kibbey TC, Surfactant Effects on Residual Water and Oil Saturations in Porous Media. 2003, Vadose Zone Journal 2:168-176.

Florida Chemical Company, Material Safety Data Sheet for Citrus Burst 3. Jul. 2007, Winter Haven, FL.

Florida Chemical Company, Material Safety Data Sheet for Citrus Burst 7. Oct. 2006, Winter Haven, FL.

Frankel AJ, Owsianiak, LM, Wuerl, BJ, Horst, JF. In-Situ Anaerobic Remediation of Perchlorate-Impacted Soils. Arcadis US.

Georgetti SR, Casagrande R, Di Mambro, VM, Azzolini, AECS, Fonseca, MJV. Evaluation of the Antioxidant of Different Flavonoids by the Chemiluminescence Method. AAPA PharmSci. 2003. 5(2) Article 20.

Gillham RW, O'Hannesin SF. Enhanced degradation of halogenated aliphatics by zero-valent iron. Ground Water 1994, 32(6): 959-967.

Guha S, Jaffe PR. Biodegradation kinetics of phenanthrene partitioned into the micellar phase of nonionic surfactants. Env. Sci. & Tech. 1996, 30: 605-611.

Hatano T, Kagawa H, Yasuhara T, Okuda T. Two new flavonoids and other constituents in licorice root: their relative astringency and radical scavenging effect. Chem. Phar. Bull. 1998, 36: 2090-2097.

He F, Zhao D. Preparation and characterization of a new class of starch-stabilized bimetallic nanoparticles for degradation of chlorinated hydrocarbons in water. Environ Sci Technol. 2005, 39: 3314-3320.

House DA, Kinetics and Mechanism of Oxidations by Peroxydisulfate, Chemistry Review 1962, 62: 185-200.

Huang K, Couttenye RA, Hoag G. Kinetics of heat-assisted persulfate oxidation of methyl tert-butyl ether (MTBE). Chemosphere 2002, 49(4), 413-420.

International Search Report and the Written Opinion of the International Searching Authority for PCT/US2007/007517, Nov. 27, 2008.

Interstate Technology & Regulatory Council Dense Nonaqueous Phase Liquids Team, Technical and Regulatory Guidance for Surfactant/Cosolvent Flushing of DNAPL Source Zones, Apr. 2003.

Jafvert CT, Technology Evaluation Report: Surfactants/Cosolvents. Dec. 1996, Ground-Water Remediation Analysis Center, Pittsburg, PA.

Jawitz, JW, Annable, MD, Rao, PSC, Rhue, RD. Field Implementation of a Winsor Type I Surfactant/Alcohol Mixture for in Situ Solubilization of a Complex LNAPL as a Single-Phase Microemulsion. 1998. Environ. Sci. Technol., 32:523-530.

Kislenko VN, Berlin AA, Litovchenko NV, Kinetics of Oxidation of Glucose by Persulfate Ions in the Presence of Mn (II) Ions, Kinetics and Catalysis 1997, 38(3): 391-396.

Kile, DE, Chiou, CT. Water Solubility Enhancements of DDT and Trichlorobenzene by Some Surfactants Below and Above the Critical Micelle Concentration. Environ. Sci. Technol. 1989, 23:832-838.

Kolthoff IM, Medalia AI, Raaen HP, The Reaction Between Ferrous Iron and Peroxides IV Reaction with Potassium Sulfate, Journal of American Chemical Society 1951, 73: 1733-1739.

Kotterman MJ, Rietberg HJ, Hage A, Field JA. Polycyclic aromatic hydrocarbon oxidation by white-rot fungus Bjerkandera sp. Strain BOS55 in the presence of non-ionic surfactants. Biotechnology and Bioengineering 1997, 57: 220-227.

Kumar A, Vemula PK, Ajayan PM, John G., Silver Nanoparticle-Embedded Antimicrobial Paints Based on Vegetable Oil, Nature Materials 2008, 7: 236-241.

Li Zhaohui, Surfactant-enhanced oxidation of trichloroethylene by permanganate—proof of concept. Chemosphere 2004, 54:419-423.

Liang CJ, Bruell CJ, Marley MC, Sperry KL. Persulfate oxidation for in situ remediation of TCE I: Activated by ferrous ion with and without a persulfate—thiosulfate redox couple. Chemosphere 2004, 55(9), 1213-1223.

Liang CJ, Bruell CJ, Marley MC, Sperry, KL. Thermally activated persulfate oxidation of trichloroethylene (TCE) and 1,1,1-trichloroethane (TCA) in aqueous systems and soil slurries. 2003. Soil & Sediment Contamination 2003, 12(2): 207-228.

Liang CJ, Bruell, CJ, Marley MC, Sperry KL. Persulfate oxidation for in situ remediation of TCE II: Activated by chelated ferrous ion. Chemosphere 2004, 55(9), 1225-1233.

Luong HV, Lin HK. Controlling Fenton reaction for soil remediation. Analytical Letters 2000, 33(14), 3051-3065.

Martel R, Gelinas P. Surfactant solutions developed for NAPL recovery in contaminated aquifers. Ground Water 1996, 34: 143-154.

Martel R, Gelinas PJ, Desnoyers JE, Masson A. Phase Diagrams to Optimize Surfactant Solutions for Oil and DNAPL Recovery in Aquifers, Ground Water 1993, 31: 789-800.

Moschopedis SE. et al. Surface-active materials from Athabasca oil sands. Fuel processing Technology 1980, 3: 55-61.

Nadagouda MN, Varma RS. A Greener Synthesis of Core (Fe, Cu)-Shell (Au, Pt, Pd and Ag) Nanocrystals Using Aqueous Vitamin C, Crystal Growth and Design 2007, 7(12): 2582-2587.

Nadagouda MN, Varma RS. Microwave Assisted Shape Controlled Bulk Synthesis of Noble Nanocrystals and Their Catalytic Properties, Crystal Growth and Design 2007, 7(4): 686-690.

Nadagouda MN, Varma RS. Microwave Assisted Shape Controlled Bulk Synthesis of Ag and Fe Nanorods in Poly(ethylene glycol) Solutions, Crystal Growth and Design 2008, 8(1): 291-295.

Nadagouda MN, Varma RS. Green and Controlled Synthesis of Gold and Platinum Nanomaterials Using Vitamin B2: Density-Assisted Self Assembly of Nanospheres, Wires and Rods, Green Chem. 2006, 8: 516.

Nadagouda MN, Varma RS. Green synthesis of silver and palladium nanoparticles at room temperature using coffee and tea extract. Royal Society of Chemistry. Green Chem 2008, 10:859-862.

Nadagouda MN, Varma RS. Preparation of novel metallic and bimetallic cross-linked poly(vinyl alcohol) nanocomposites under microwave irradiation. Macromolecular Rapid Communications 2007, 28: 465-472.

Nadagouda MN, Varma RS. Synthesis of thermally stable carboxymethyl cellulose/metal biodegradable nanocomposites for potential biological applications. Biomacromolecules. 2007, 8(9): 2762-2767.

Niu S-F, Liu Y, Xu X-H, Lou Z-H. Removal of hexavalent chromium from aqueous solution by iron Nanoparticles. J. Zhejiang Univ Sci B 2005, 6(10): 1022-1027.

Pirkanniemi K, Sillanpaa M, Sorokin A. Degradative Science of the Total Environment 2003, 307: 1-3, 11-18.

Ponder S, Darab JG, Bucher J, Caulder D, Craig I, Davis L, Edelstein N, Lukens W, Nitsche H, Rao L, Shuh DK, Mallouk TE. Surface chemistry and electrochemistry of supported zerovalent iron nanoparticles in the remediation of aqueous metal contaminants. Chem. Mater. 2001, 13(2): 479-486.

Ponder SM, Darab JG, Mallouk TE. Remediation of Cr(VI) and Pb(II) aqueous solutions using supported, nanoscale zero-valent iron. Environ. Sci. Technol. 2000,34: 2564-2569.

Powell RM, Puls RW, Hightower SK, Sabatini DA. Coupled Iron Corrosion and Chromate Reduction: Mechanisms for Subsurface Remediation. Environ. Sci. Technol. 1995, 29: 1913-1922.

Raveendran P, Fu J, Wallen SL. Completely "Green" Synthesis and Stabilization of Metal Nanoparticles, J. Am. Chem. Soc. 2003, 125: 13940.

Regeneris. Chemical Oxidation. Accessed Apr. 15, 2007, www.regeneris.com/products/chemOx/.

Regeneris. Enhanced Aerobic Bioremediation, Accessed Apr. 15, 2007, www.regeneris.com/products/enhAer/.

Regeneris. Remediation Products. Accessed Apr. 15, 2007, www.regeneris.com.

Roote, Diane S. Technology Status Report In Situ Flushing: Ground-Water Remediation Technologies Analysis Center, Pittsburg, PA, Nov. 1998.

Schramm et al. The Influence of Interfacial tension in the recovery of bitumen by water-based conditioning and flotation of Athabasca oil sands. Fuel Processing Technology 2003, 80: 101-118.

Schrick B, Blough J, Jones A, Mallouk TE. Hydrodechlorination of trichloroethylene to hydrocarbons using bimetallic nickel-iron nanoparticles. Chem. Mater. 2002, 14(12): 5140-5147.

Shiau BJ, Sabatini DA, Harwell JH. Solubilization and mobilization of DNAPLs using direct food additive (edible) surfactants. Ground Water 1994, 32: 561-569.

Sundstrom DW, Allen JS, Fenton SS, Salimi FE, Walsh KJ, Treatment of Chelated Iron and Copper Wastes by Chemical Oxidation, J Environ Sci Health 1996, A31: 1215.

Swe, MM, Yu, LE, Hung, KC, Chen, BH. Solubilization of Selected Polycyclic Aromatic Compounds by Nonionic Surfactants. Journal of Surfactants and Detergents. 2006, 9:3, 237-244.

Sweeny, KH. 1981 a. The Reductive Treatment of Industrial Wastewater: II. Process Applications. American Institute of Chemical Engineers, Symposium Series, Water-1980 Fd. G.F. Nennett. 209(77): 67-71.

Sweeny, KH. 1981 b. The Reductive Treatment of Industrial Wastewater: I. Process Description. American Institute of Chemical Engineers, Symposium Series, Water-1980 Ed. GF Nennett, 209(77): 72-78.

USDA 2007. Oxygen Radical Absorbance Capacity (ORAC) of Selected Foods-2007. Nutrient Data Laboratory, Beltsville Human Nutrition Research Center, Agricultural Research Service.

Uyeda R. Studies of Ultrafine Particles in Japan: Crystallography, Methods of Preparation and Technological Applications. Prog. Mater. Sci. 1991, 35: 1.

Wang C-B, Zhang W. Synthesizing nanoscale iron particles for rapid and complete dechlorination of TCE and PCBs. Environ. Sci. Technol. 1997, 31(7): 2154-2156.

Wang CC, Chen DH, Huang TC, Synthesis of palladium nanoparticles in water-in-oil microemulsions. Colloids and Surfaces A: Physicochemical and Engineering Aspects 2001, 189: 145.

Wang X, Li Y. Monodisperse nanocrystals: general synthesis, assembly, and their applications. Chem Commun Camb 2007, 28: 2901-2910.

Wei JJ, Xu XH, Liu Y. Kinetics and mechanism of dechlorination of o-chlorophenol by nanoscale. Pd/Fe. Chem Res Chinese U. 2004;20:73-76.

Wu X, Beecher GR, Holden JM, Haytowitz DD, Gebhardt SE, Prior RL. Lipophilic and hydrophilic antioxidant capacities of common foods in the United States. Journal of Agricultural and Food Chemistry 2004, 52: 4026-4037.

Xu Y, Zhang W. Subcolloidal Fe/Ag particles for reductive dehalogenation of chlorinated benzenes. Ind. Eng. Chem. Res. 2000, 39(7): 2238-2244.

Yen GC, Chen F. Antioxidant activity of various tea extracts in relation to their antimutagenicity. Journal of Agricultural and Food Chemistry 1995, 45: 27-32.

Yeom IT, Ghosh MM. Mass transfer limitation in PAH-contaminated soil remediation. Water Sci. Tech 1998, 37: 111-118.

Zeveloff J, Inventor Sues Soil Remediation Co. Over Patents. Portfolio Media. Inc., Oct. 2008, New York NY.

Zhang H, Jin Z-H, Han L, Qin C-H. Synthesis of nanoscale zerovalent iron supported on exfoliated graphite for removal of nitrate. Transactions of Nonferrous Metals Society of China 2006, 16(1): s345-s349.

Zhang W, Wang C, Lien H. Treatment of chlorinated organic contaminants with nanoscale bimetallic particles. Catal. Today 1998, 40(4): 387-395.

Zhang W-X. Nanoscale iron particles for environmental remediation: An overview. J. Nanoparticle Research 2003, 5: 323-332.

Zheng Z, Obbard JP. Polycyclic Aromatic Hydrocarbon Removal from Soil by Surfactant Solubilization and Phanerochaete chrysosporium Oxidation. J. Environ. Qual. 2002, 31: 1842-1847.

International Search Report issued in International Application No. PCT/US2008/011235, mailed on Dec. 19, 2008.

Written Opinion issued in International Application No. PCT/US2008/011235, mailed on Dec. 19, 2008.

International Search Report issued in International Application No. PCT/US2008/11229, mailed on Dec. 9, 2008.

Written Opinion issued in International Application No. PCT/US2008/11229, mailed on Dec. 9, 2008.

Written Opinion issued in International Application No. PCT/US2007/007517, mailed on Nov. 27, 2008.

International Search Report issued in International Application No. PCT/US2007/007517, mailed on Nov. 27, 2008.

Peters, S.M. et al. A Laboratory Study on the Degradation of Gasoline Contamination Using Fenton's Reagent, Proceedings 54th Canadian Geotechnical Conference, 2001 An Earth Odyssey, p. 1170-1177.

Collins J and Hoag G; Coelution technologies and surfactant-enhanced in situ oxidation as new breakthrough technologies in the treatment of toxic subsurface contaminants; 11th Annual Green Chemistry and Engineering Conference, Jun. 28, 2007, abstract.

Goi A et al.; Combined chemical and biological treatment of oil contaminated soil; Chemosphere, 63(10), 1754-1763.

International Search Report and Written Opinion for PCT/US08/008905 mailed May 7, 2009.

International Search Report and Written Opinion for PCT/US08/011228 mailed May 28, 2009.

Diallo et al. Solubilization of nonaqueous phase liquid hydrocarbons in micellar solution of dodecyl alcohol ethoxylates . Environ. Sci. Technol. 1994. 1829-1837.

Office Action issued by the USPTO for U.S. Appl. No. 12/667,478 on Jul. 9, 2010.

Office Action in U.S. Appl. No. 12/771,210 mailed on Aug. 20, 2010.

Tetrachloroethylene. Accessed Nov. 19, 2010. http://en.wikipedia.org/w/index.php?title=Tetrachloroethylene&printable=yes.

Office Action in U.S. Appl. No. 12/667,478 mailed on Jul. 9, 2010.

M.Nadagouda et al., Green Synthesis of Au Nanostructures at Room Temperature Using Biodegradable Plant Surfactants, Crystal Growth & Design, v.9 (2009) pp. 4979-4983.

Office Action in U.S. Appl. No. 12/771,210 mailed on Jan. 3, 2011.

Fensom et al., "Remediation of PAH Contaminated Soil by Enhanced Chemical Oxidation: Case Studies of a Viable Treatment Technology," AWWA Conference, 2000.

Dugan et al., "Coupling Surfactants/Cosolvents With Oxidants for Enhanced DNAPL Removal: A Review," Remediationl, vol. 20, No. 3, pp. 27-49, 2010.

Office Action issued by USPTO for U.S. Appl. No. 12/667,478 on Apr. 1, 2011.

Advisory Action issued by USPTO for U.S. Appl. No. 12/771,210, on Apr. 12, 2011.

* cited by examiner

SOIL REMEDIATION METHOD AND COMPOSITION

This application is a continuation of International Application Number PCT/US2007/007517, filed Mar. 27, 2007, which claims the benefit of U.S. Provisional Application No. 60/785,972, filed Mar. 27, 2006.

FIELD OF THE INVENTION

The present invention relates to methods and compositions for remediating soil and groundwater. For example, the present invention relates to methods and compositions for removing contaminants from soil and groundwater in situ using surfactants or surfactant-cosolvent mixtures and oxidants.

Use of Surfactants on NAPL Sites

In-situ solubilization with surfactants or surfactant-cosolvent mixtures involves injecting water miscible surfactants or surfactant-cosolvent mixtures into sediments or aquifers to facilitate contaminant removal by enhanced nonaqueous phase liquid (NAPL) miscible dissolution and/or mobilization of immiscible NAPL and enhanced desorption. Recent laboratory experiments have demonstrated that NAPLs may be removed from soil columns by leaching columns with certain mixtures of surfactants or surfactant-cosolvent mixtures and water. These surfactants or surfactant-cosolvent mixtures achieve NAPL removal through a number of complementary mechanisms including: reduction of interfacial tension (IFT) between the aqueous and NAPL phases; enhanced solubility of the chemical contaminants (NAPL components) in the aqueous phase; swelling of the NAPL phase relative to the aqueous phase; and, under certain conditions, complete miscibility of the aqueous and NAPL phases.

The relative importance of these different mechanisms depends on the ternary (water; surfactant, cosolvent, or cosolvent-surfactant mixture; NAPL) phase behavior of the specific system (Falta, 1998) (20). Laboratory experiments have shown that surfactants or surfactant-cosolvent mixtures that preferentially partition into the NAPL phase are capable of mobilizing the NAPL as a separate phase due to swelling of the NAPL and reduction of interfacial tension. In cases where the cosolvent strongly partitions into the NAPL phase, the NAPL is effectively removed with about one pore volume of injected fluid. On the other hand, surfactants or surfactant-cosolvent mixtures that preferentially stay with the aqueous phase can dramatically increase the solubility of NAPL components in the aqueous phase. For systems in which the surfactants or surfactant-cosolvent mixtures preferentially partitions into the aqueous phase, separate phase NAPL mobilization is not usually observed and the NAPL removal occurs by the mechanism of enhanced dissolution in a dissolved or in a microemulsion phase, also known as a Winsor Type I system. (Fuangswasdi et al., 2006), Jawitz, J. W. (1998), Kile, D. E. et al. (1989), Edwards et al. (1991), Swe, M. M. (2006), Diallom, M. S. et al. (1994)) Under solubilizing conditions, the NAPL removal rate is dependent on the increase in solubility of the NAPL in the surfactants or surfactant-cosolvent mixtures.

Two groups have recently used cosolvent and surfactant flushing simultaneously with permanganate and have demonstrated success by significantly increasing chlorinated solvent remediation and destruction rates with this treatment. Zhai et al. (2004) (16); Dugan et al. (2004) (17). In the study by Zhai et al. (2004) (16), cosolvency increased the chloride production from permanganate oxidation of dense nonaqueous phase liquid (DNAPL) tetrachloroethylene by about twice that in an aqueous only system. Dugan et al. (2004) (17) recently investigated the use of surfactants and cosolvents on DNAPL mobilization and oxidation using permanganate. However, the oxidant permanganate is not effective on treatment of many non-chlorinated hydrocarbon NAPL liquids and most chloroethanes and chloromethanes. Additionally, the product of all permanganate reduction is manganese dioxide, a precipitate that can clog fine grained soils. Soils that have high concentrations of organic chemical present require high concentrations of oxidants to react with the organic chemicals. The more permanganate needed to oxidize these compounds the more manganese dioxide is formed. By contrast persulfate forms no significant solid phase precipitates.

Research in the area of surfactant enhanced aquifer remediation (SEAR) is well developed with many demonstration projects completed in the U.S. (Jafvert, C. T. (1996)) In this process NAPLs are transformed into a mobile phase and require recovery using pumping wells which is both expensive and difficult to ensure complete recovery of the mobilized contaminants and injected chemicals. There is no destruction of contaminants with the SEAR process, only mobilization and recovery. Thus, only physical methods of contaminant recovery are utilized in this process.

Increased solubilization and mobility of NAPLs at a MGP (manufactured gas plant) site using the SEAR process by a cosolvent/surfactant flood with an added xanthan biopolymer in both laboratory and a field demonstration tests was reported by Young, C. M. et al. (2002) (18). For the purposes of surfactant flooding and hydraulic recovery only they reported an increase in the solubility of coal tar constituents up to 38,000 mg/L in laboratory soil column experiments and up to 9,400 mg/L in a field demonstration test. These authors used 2-butanol as the cosolvent and Alfoterra™ 123-8 PO Sulfate as the surfactant along with a minor amount of xanthan biopolymer to increase viscosity. Alfoterra is a brand name of several types of branched alcohol propoxylate sulfate, sodium salt, manufactured by Sasol® North America Inc. (The trade name of these commercial anionic surfactants are Alfoterra mn.). Alfoterra 145-4PO is a branched alcohol propoxylate sulfate with a high content of mono-branched isomers. Previous studies have consistently shown that low concentrations (0.1% by weight) of this surfactant produce ultra-low oil-water IFTs.

Young et al. also report significant extraction of oil phase NAPLs during the field demonstration test. The goal of SEAR is to mobilize NAPL constituents in a dissolved phase or in a mobile NAPL phase and then collect all of the injected and mobilized liquids by extraction wells. If the increased dissolved phase or mobilized NAPL phase is not removed from the subsurface by the extraction wells, the contaminants may travel further in the subsurface and actually contaminate more of the subsurface than was contaminated prior to treatment. Increased dissolution requires the injection of liquids into the subsurface that are predominantly alcohols with minor amounts of surfactants and water. Increased mobilization of the NAPL phase itself requires the formation of a water-in-oil emulsion by the addition of sufficient surfactants or surfactant-cosolvent mixtures to lower the interfacial tension between the NAPL and water to a level where the NAPL is mobile in the subsurface.

Carvel and Cartwright (2005) (19) recently reported a very preliminary laboratory investigation of Fenton's Reagent in a surfactant/cosolvent remediation system. These authors determined that systems with d-limonene (a citrus-derived solvent), with and without surfactant and isopropyl alcohol, were compatible with Fenton's Reagent based on visual observation. They did not report control tests but did report a 96 percent reduction in contaminant mass using a mixture of isopropyl alcohol and hydrogen peroxide. They reported that d-limonene was "responsive" at low oxidant concentrations but produced a precipitate at 40 percent concentrations of hydrogen peroxide. While the experiments by Carvel and Cartwright (2005) (19) were very preliminary with no experimental data produced and no controls, the compatibility of d-limonene and hydrogen peroxide at lower concentrations is promising for the purposes of examining oxidant-d-limonene/surfactant systems.

Prior approaches for the remediation of NAPLs or sorbed hydrophobic contaminants, using oxidants such as persulfate or activated persulfate alone failed because the rate of dissolution of immiscible or sorbed phase contaminants, limited the rate of chemical oxidation of contaminants. Not having a surfactant or surfactant-cosolvent mixture to increase the solubility of NAPLs or sorbed contaminants in the aqueous phase, where they are more readily oxidized, prior chemical oxidation methods take a much longer time to destroy organic chemicals in soils and require a much greater amount of persulfate or other oxidant system chemicals than if the contaminants were enhanced by using surfactants or mixtures of cosolvents and surfactants.

Recovery and reuse of surfactants can improve the cost effectiveness of a remedial system. Designing a system to recover and reuse the system requires tradeoffs based on ease of recovery versus efficiency of the remedial system.

Thus, there is a need for a method of treating contaminated soil in situ to reduce the amount of contaminant, for example, an organic chemical and/or a NAPL, in the soil which is fast and efficient in terms of the amount of oxidant required. There is a need for selectively treating target contaminants.

SUMMARY OF THE INVENTION

This application presents embodiments of an invention which include fast and efficient methods and compositions for treating contaminated soil and groundwater in situ to reduce the amount of contaminant, for example, an organic chemical and/or a NAPL. The embodiments include methods and compositions for selectively treating target contaminants. For example, a method is presented in which a surfactant or surfactant-cosolvent mixture and an oxidant are introduced into the subsurface containing the soil, groundwater, and a NAPL and the surfactant or surfactant-cosolvent mixture solubilizes the contaminant, so that the overall rate of oxidation of the contaminant is greater than or equal to the overall rate of solubilization of the contaminant.

This application also presents the use of subsurface injected solutions with variable densities to control and optimize contact of the injected solutions with the targeted treatment zones. By more precisely controlling the subsurface strata contacted by the injected solutions, remediation processes can be employed to be more rapidly effective and reduce the quantity of injected liquids and chemicals required to effect treatment.

A method for reducing the concentration of a contaminant in a soil according to the invention includes introducing an oxidant and a surfactant into a subsurface containing the soil, allowing the surfactant to solubilize or desorb the contaminant, and allowing the oxidant to oxidize the solubilized contaminant in the subsurface, so that the amount of the contaminant in the soil is substantially reduced. The overall rate of oxidization of the contaminant is controlled to a predetermined value and the overall rate of solubilization of the contaminant is controlled to a predetermined value by selecting the oxidant, surfactant, and antioxidant and adjusting the concentrations of surfactants, oxidants, and antioxidants. Thus, as the user of the method chooses, the rate of oxidation of the contaminant is greater than, less than, or equal to the rate of solubilization of the contaminant.

In an embodiment according to the invention, a composition includes soil, a non-aqueous phase contaminant, a quantity of surfactant, and an oxidant. The quantity of surfactant is sufficient to solubilize the nonaqueous phase liquid contaminant. The surfactant forms a Windsor I solution or microemulsion.

In an embodiment according to the invention, a treated composition includes soil, an oxidized contaminant, and an oxidant residue.

A method for reducing the concentration of a contaminant in soil according to the invention includes solubilizing the contaminant and oxidizing the contaminant. Mobilization of the contaminant during solubilization and oxidation is minimal.

An alternative method for reducing the concentration of a contaminant in soil according to the invention includes locally mobilizing the contaminant and oxidizing the contaminant.

A method for determining a subsurface contaminant remediation protocol according to the invention includes collecting a soil sample from the subsurface, identifying at least one target contaminant for concentration reduction, choosing a surfactant, and optionally choosing a cosolvent for injection into the subsurface to solubilize the at least one target contaminant. The method further includes choosing an oxidant and optionally choosing an activator for the oxidant for injection into the subsurface to oxidize the target contaminant, and choosing the quantity of surfactant for injection into the subsurface to form a Winsor I system or a submicellar surfactant solution or a microemulsion.

A method for determining a subsurface contaminant remediation protocol according to the invention can include choosing a surfactant or surfactants and optionally choosing a solvent for injection into the subsurface to desorb and solubilize the at least one target contaminant. The method can include the following: determining the spatial concentration distribution of the target contaminant; determining a hydrogeological property of the subsurface; and using the determined spatial concentration distribution of the target contaminant and the hydrogeological property to determine the target depth for the surfactant and oxidant and optionally for the solvent and activator.

A method for reducing the concentration of a contaminant in a soil at a target depth according to the invention can include the following: identifying a target depth range for reducing the concentration of the contaminant; selecting a surfactant, an oxidant, and optionally a non-oxidant, non-activator salt; introducing the surfactant, the oxidant, and optionally the non-oxidant, non-activator salt into a subsurface containing the soil; allowing the surfactant to solubilize or desorb the contaminant; and allowing the oxidant to oxidize the contaminant in the subsurface, so that the concentration of the contaminant in the soil is substantially reduced. The surfactant and the oxidant are introduced together and the oxidant is selected so that the combination of the surfactant and the oxidant has a density to maximize the fraction of the surfactant and oxidant mixture that remains within the target depth range. Alternatively, the non-oxidant, non-activator salt is introduced together with the surfactant, the oxidant, or both, and the non-oxidant, non-activator salt is selected so that the mixture of the non-oxidant, non-activator salt with the surfactant, the oxidant, or both has a density to maximize the fraction of the surfactant and maximize the fraction of the oxidant that remains within the target depth range.

In an embodiment according to the invention, a composition includes at least one citrus terpene, at least one nonionic surfactant, and water. The nonionic surfactant can be ethoxylated soybean oil, ethoxylated castor oil, ethoxylated coconut fatty acid, and amidified, ethoxylated coconut fatty acid.

A method for reducing the initial mass of a contaminant in a volume of soil, according to the invention, includes introducing a volume of a solution including an oxidant and a volume of a solution including a surfactant into a substrate containing the soil. At least 40% of the initial mass of contaminant is eliminated from the volume of soil. No more than 5% of the combined volume of the solution comprising the oxidant and the volume of the solution comprising the surfactant is extracted from the soil.

A method for reducing the concentration of a contaminant in a soil, according to the invention, includes introducing an oxidant and a surfactant into a ground surface or aboveground formation, structure, or container containing the soil. The surfactant is allowed to solubilize or desorb the contaminant, and the oxidant is allowed to oxidize the solubilized contaminant, so that the amount of the contaminant in the soil is substantially reduced. The overall rate of oxidization of the contaminant is controlled to a value predetermined by the user of the method. The overall rate of solubilization of the contaminant is controlled to a value predetermined by the user of the method. The overall rate of oxidation and the overall rate of solubilization are controlled by selecting the oxidant, surfactant, and antioxidant and adjusting the concentrations of surfactants, oxidants, and antioxidants. Thus, the user can choose in advance the rate of oxidation of the contaminant to be greater than, less than, or equal to the rate of solubilization of the contaminant.

DESCRIPTION OF THE DRAWINGS AND APPENDICES

Figure 20:
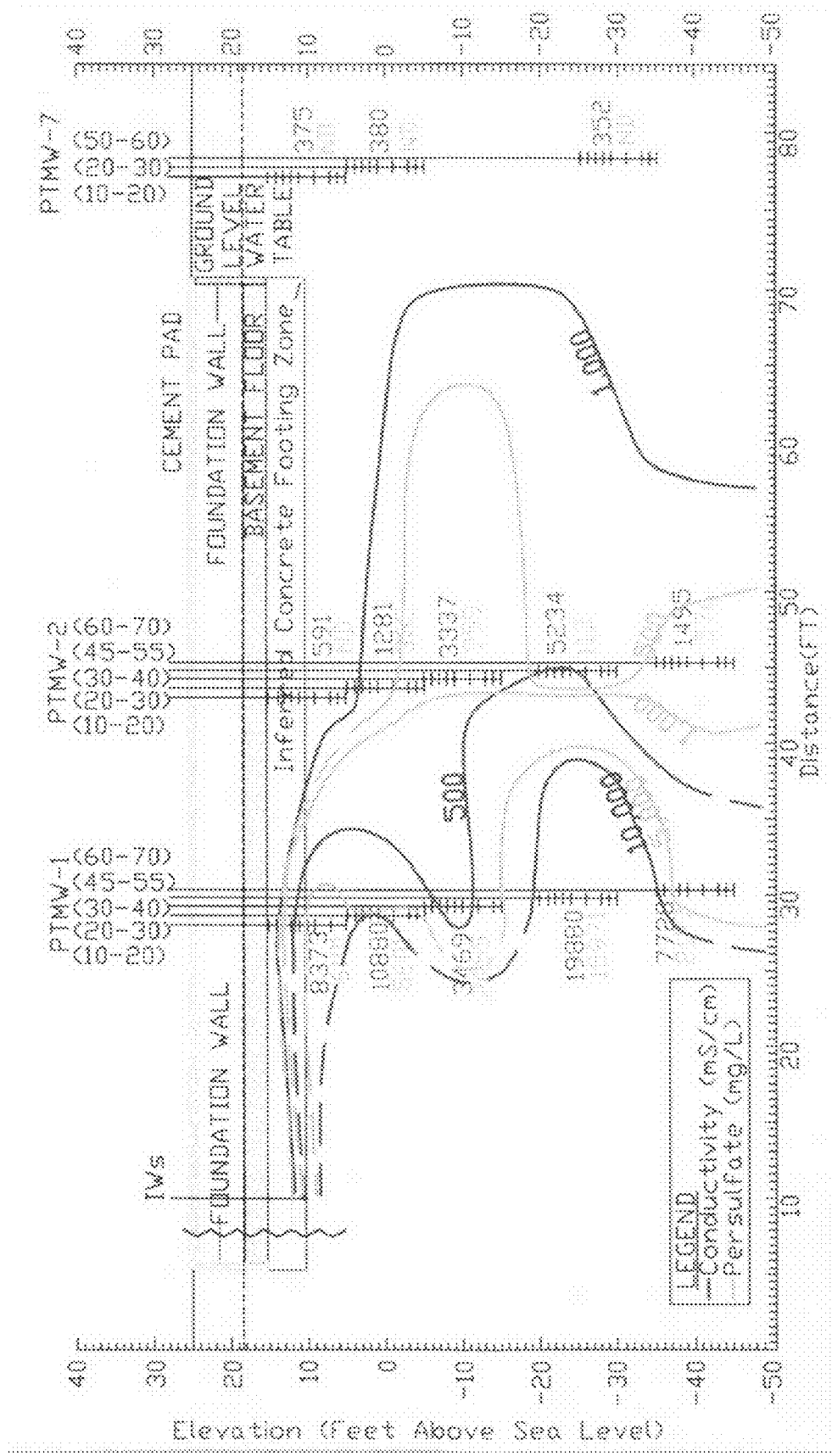

FIG. 20 presents centerline cross-sectional contours of sodium persulfate concentration and electrolytic conductivity for the end of the Phase II monitoring period.

Figure 21:
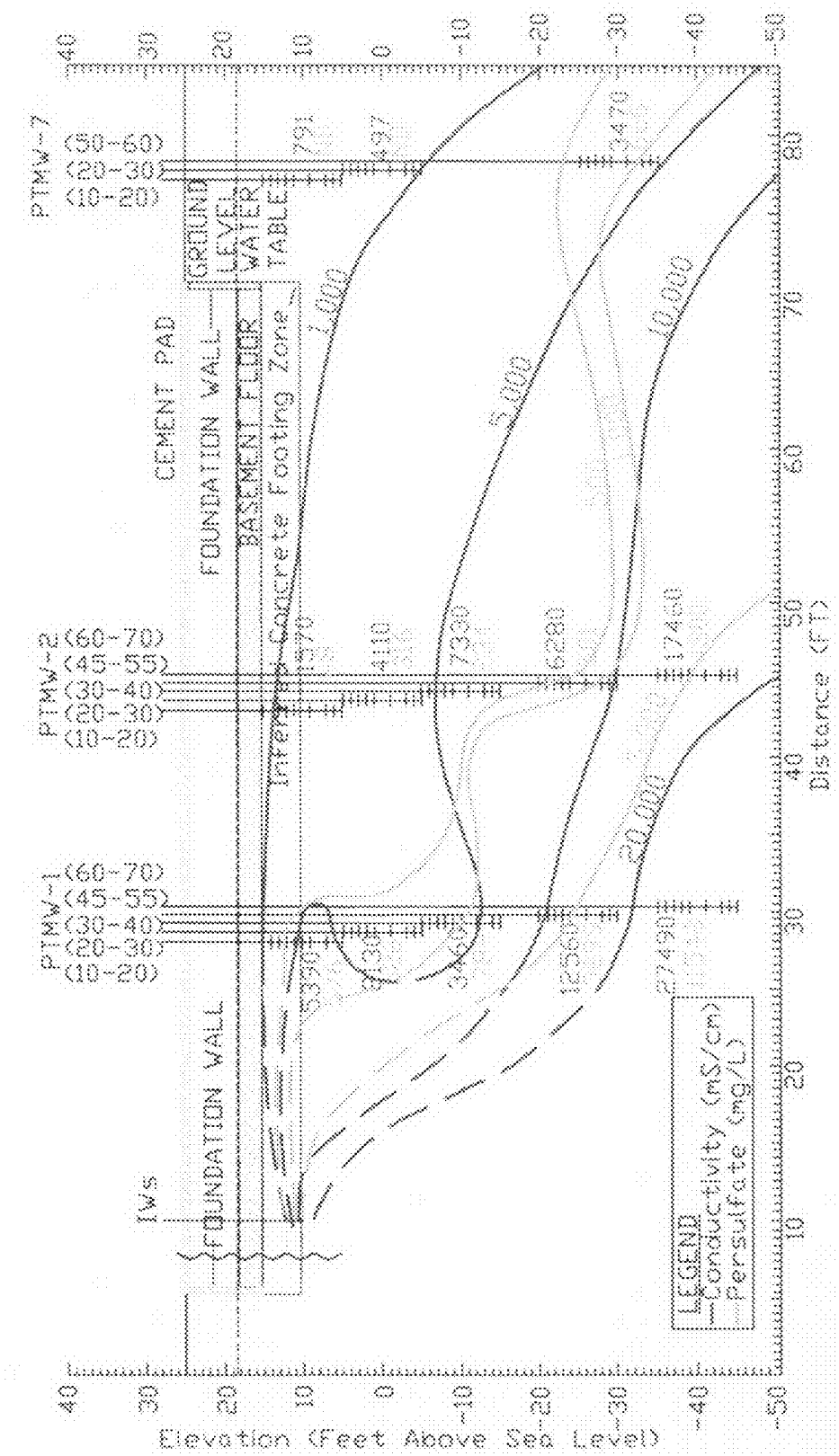

FIG. 21 presents centerline cross-sectional contours of sodium persulfate concentration and electrolytic conductivity for the end of the Phase IIIB injection period.

Figure 22:
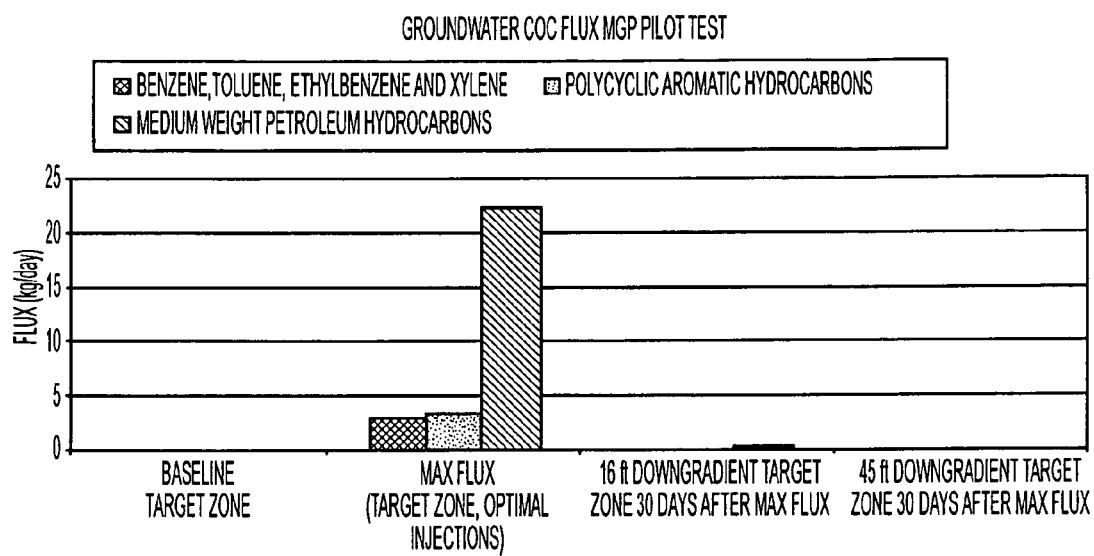

FIG. 22 is bar graph depicting mass-flux values for the 20 to 70 ft bgs (below ground surface) depth interval at the four transects downgradient from the injection wells.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are incorporated by reference as if each had been individually incorporated.

Surfactant enhanced in situ chemical oxidation (S-ISCO™) remediation depends on choosing the correct surfactants or surfactant-cosolvent mixtures that create the most effective solubilized micelle or microemulsion with the NAPL present in the soil, such that a Winsor Type I phenomenon occurs and other Winsor type behaviors are generally avoided. Once an adequate Winsor Type I solubilized micelle or microemulsion has formed and thus increases the apparent solubility of the NAPL, the solubilized micelle or microemulsed NAPL is able to enter into "aqueous phase reactions"

and in the case of S-ISCO™ remediation, it can be oxidized using a chemical oxidant such as permanganate, ozone, persulfate, activated persulfate, percarbonate, activated percarbonate, a peroxide, a peroxide containing compound, or hydrogen peroxide, or ultraviolet (uV) light or any combination of these oxidants with or without uV light. It is well known in the literature that several methods can be used to activate or catalyze peroxide and persulfate to form free radicals such as free or chelated transition metals and uV light. Persulfate can be additionally activated at both high and low pH, by heat or by peroxides, including calcium peroxides. Persulfate and ozone can be used in a dual oxidant mode with hydrogen peroxide.

This invention takes advantage of increased solubilization of NAPL or sorbed contaminants in Winsor Type I systems, without the need for complete extraction well recovery of injected and treated liquids. In situ chemical oxidation of the solubilized or microemulsed NAPLs in a Winsor Type I system eliminates the necessity of complete liquid pumping extraction recovery of the solubilized NAPL. Elimination of extraction systems avoids technical challenges associated with costly complete plume capture, costly above ground treatment systems, requirements to recycle surfactant or surfactant-cosolvent mixtures, and to dispose or reinject the bulk liquid back into the subsurface. Martel et al. (22, 23) proposed the use of Winsor Type I microemulsions to solubilize NAPLs without NAPL mobilization. These systems have the advantage of high solubilization of NAPLs (although not as high as middlephase microemulsions) with relatively low amounts of chemical additives required. Chun-Huh (24) showed that, in microemulsions, solubilization of the oil phase into the microemulsion is related to interfacial tension by an inverse squared relationship. Remediation systems that rely on Winsor Type I solubilized micelle or microemulsification are necessarily less efficient than those that rely on Winsor Type III microemulsions and mobilization, since solubilization is lower at the higher interfacial tensions required to prevent mobilization. However, desorption and solubilization of contaminants using Winsor Type I microemulsions are controllable such that the risk of off-site mobilization of NAPL contaminants of concern (COCs) is minimal and that complete recovery of injected chemicals, mobilized NAPL phases, and solubilized NAPL or sorbed chemicals using extraction wells is not required. This type of behavior is the focus of S-ISCO™ (surfactant enhanced in situ chemical oxidation) remediation and can be useful in remedying manufactured gas plant (MGP) sites as well as sites with chlorinated solvents, petroleum hydrocarbons, pesticides, herbicides, polychlorinated biphenyls, and other NAPL or sorbed COCs. Under solubilizing conditions, the NAPL removal rate is dependent on the increase in solubility of the NAPL in the surfactant mixture. Under desorbing conditions, the sorbed COC species removal rate is dependent on the rate of desorption of the COC into the surfactant or surfactant-cosolvent mixture.

The invention involves a method and process of increasing the solubility of contaminants, such as normally low solubility nonaqueous phase liquids (NAPLs), sorbed contaminants, or other chemicals in soils in surface and ground water, and simultaneously or subsequently oxidizing the chemicals using a chemical oxidant without the need of extraction wells for the purpose of recovering the injected cosolvents and/or surfactants with NAPL compounds. Examples of contaminants are dense nonaqueous phase liquids (DNAPLs), light nonaqueous phase liquids (LNAPLs), polycyclic aromatic hydrocarbons (PAHs), chlorinated solvents, pesticides, polychlorinated biphenyls and various organic chemicals, such as petroleum products. Contaminants can be associated with, for example, manufactured gas plant residuals, creosote wood treating liquids, petroleum residuals, pesticide, or polychlorinated biphenyl (PCB) residuals and other waste products or byproducts of industrial processes and commercial activities. Contaminants may be in the liquid phase, for example, NAPLs, sorbed to the soil matrix or in the solid phase, for example, certain pesticides.

In an embodiment of the invention, a treated composition includes soil, an oxidized contaminant, and an oxidant residue. The contaminant may be oxidized to minerals. For example, a hydrocarbon may be completely oxidized to carbon dioxide and water.

The screening of several surfactants, cosolvents, or surfactant-cosolvent mixtures for dissolution and/or desorption of a given NAPL or sorbed organic chemical (or mixture of chemicals) can lead to a customized and optimal surfactant, cosolvent, or surfactant-cosolvent mixture to dissolve either some or all of the NAPLs or sorbed chemicals. In order to dissolve some or all of the NAPLs or sorbed chemicals, a surfactant or mixture of surfactants alone, a cosolvent or mixture of cosolvents alone, or a mixture of surfactants and cosolvents can be used. For example, certain volatile constituents in the NAPLs may pose a health or ecological risk at a particular site, that is, be contaminants of concern (COCs), but the NAPLs may contain many other compounds that do not result in risks. This invention presents methods to screen different types of surfactants, cosolvents, and cosolvent-surfactant mixtures to obtain an optimal dissolution or desorption of the contaminants of concern, resulting in the oxidation predominantly only of those compounds that need to be treated to reduce risk or reach remediation goals for a given site.

The surfactants and/or cosolvents can be chosen to selectively solubilize contaminants, for example, certain NAPLs, that pose a risk to public health and/or the environment, without solubilizing other compounds. Similarly, by choosing an oxidant that is capable of only oxidizing certain classes of compounds, one can select an oxidant that only treats selected solubilized target compounds. For example, persulfate that is not activated effectively treats volatile organic compounds (VOCs) but does not effectively treat other compounds such as certain hydrocarbons including some PAHs. Additionally, permanganate can effectively treat chloroethene compounds, but does not effectively treat certain chloroethane compounds. The method of screening surfactants and cosolvents to determine which compounds in the NAPL, solid, or sorbed phases can be dissolved or emulsified in a oil in water emulsion or soluble micelle, then selecting an oxidant that is also selective in terms of what compounds are treated creates a system not previously discovered that is a powerful tool to cost-effectively treat sites, where simple injection of a surfactant or surfactant-cosolvent mixture alone or oxidant alone would be slower, ineffective or not cost-effective. Thus, the new approach presented in this application enables more efficient, effective, and optimal treatment of contaminated soils, for example, soils contaminated with NAPLs and/or other organic chemicals, for example, benzene, toluene, ethyl benzene, xylene, and polyaromatic hydrocarbons.

The term "solubilize" as used herein can refer to, for example, one or more of incorporating a contaminant in the aqueous phase, forming a molecular scale mixture of contaminant and water, incorporating contaminant at a micellar interface, and incorporating contaminant in a hydrophobic core of a micelle. The term "solution" as used herein can refer to, for example, a contaminant in the aqueous phase, a molecular scale mixture of contaminant and water, a contaminant at a micellar interface, and a contaminant in a hydrophobic core of a micelle.

The oxidant and surfactant or surfactant-cosolvent mixture can be selected so that the oxidant does not substantially react with the surfactant or cosolvent. Alternatively, the oxidant and surfactant or surfactant-cosolvent mixture can be selected so that the surfactant can function to solubilize contaminant, for example, NAPL, even if the oxidant reacts with the surfactant or cosolvent. Alternatively, the oxidant and surfactant or surfactant-cosolvent mixture can be selected so that the oxidant reacts with the surfactant so as to promote the destruction of contaminant, for example, NAPL. For example, the oxidant may react with the surfactant to alter the chemistry of the surfactant, so that the altered surfactant selectively solubilizes certain contaminants. For example, an oxidant can be chosen that controls the interfacial tension of the resultant soil NAPL/water interface and promotes selective solubilization of surface contaminants.

In an embodiment, an amount of surfactant or surfactant-cosolvent mixture is introduced into a subsurface, for example, rock, soil, or groundwater, including a contaminant, for example, a NAPL, to form a Winsor Type I system. In order to form a Winsor Type I system, the amount of surfactant or surfactant-cosolvent mixture added is controlled and restricted; that is, not so much of a surfactant or surfactant-cosolvent mixture is added to induce the formation of a Winsor Type II system, but enough to result in increased solubilization of the NAPL above the aqueous critical micelle concentration. Thus, the formation of a Winsor Type II system and the mobilization of contaminant, for example, NAPL, associated with a Winsor Type II system, is avoided or minimized. By avoiding or minimizing the mobilization of contaminant, the problem of contaminant migrating to areas not being treated can be avoided.

The mobilization of contaminant can be avoided by controlling the rate of oxidation in the subsurface. For example, by ensuring that the overall rate of oxidation of contaminant is greater than the overall rate of solubilization of contaminant, mobilization can be avoided. The overall rate of oxidation can be controlled by controlling the concentration of oxidant in the subsurface. For example, if a greater mass of oxidant is introduced into a given volume of subsurface, then the concentration of oxidant in that volume will be greater and the rate of oxidation will be faster. On the other hand, if a lesser mass of oxidant is introduced into a given volume of subsurface, then the concentration of oxidant in that volume will be lesser and the rate of oxidation will be slower. The overall oxidation rate can be controlled by selection of the specific oxidant used, as well as the concentration of the oxidant.

In another embodiment of the invention, the contaminant may be locally mobilized in a controlled manner; then, the contaminant which has been mobilized may be oxidized. A Winsor Type II system can be locally formed, for example, near a NAPL accumulation zone in the subsurface, and then the emulsion can be broken with an oxidant or other emulsion breaker to make the NAPL more available to react with the oxidant solution. For example, at many LNAPL and DNAPL sites NAPLs may accumulate in sufficient thicknesses that the relative permeability to water in the NAPL accumulation zone is very low and injected chemicals simply pass over, under or around the NAPL accumulation zone, leaving the area untreated. While a Winsor Type I system can increase the rate of solubilization of contaminants of concern (COCs) from the NAPL phase to the aqueous phase, this still may not be an optimal treatment of the site. By creating a localized Winsor Type II or III system, NAPLs may be mobilized more efficiently into subsurface zones where they are more available to and have greater contact with chemicals injected into the aqueous phase. In some cases, it is preferable to employ a sequential treatment of NAPL using first a Winsor Type II or III system to temporarily mobilize NAPL then to break the Winsor Type II or III system with a breaker or oxidant, to create, for example, a Winsor Type I system enabling an increased rate of solubilization than achievable with a Winsor Type I system alone.

Minimal mobilization can be defined as follows. NAPL may move through colloidal transport but bulk (macroscopic) movement of NAPL downward or horizontal is not occurring.

In an alternative embodiment, an amount of surfactant or surfactant-cosolvent mixture is introduced into a subsurface, for example, soil or groundwater, including a contaminant, for example, a NAPL, to form a Winsor Type III system, that is, a middle phase microemulsion. Such a Winsor Type III system can mobilize a contaminant phase, for example, a NAPL phase, in the microemulsion. For example, when the NAPL content of soil in a subsurface is low, a Winsor Type III middle phase microemulsion can be formed to mobilize the NAPL into a bulk pore space and then oxidize the emulsified NAPL in the bulk pore space, for example, by chemical oxidation.

The oxidant and surfactant or surfactant-cosolvent mixture, with any optional activator or other components, are referred to as an introduced composition.

The surfactant or surfactant-cosolvent mixture can be introduced sequentially or simultaneously (together) into a subsurface. For example, the surfactant or surfactant-cosolvent mixture can first be introduced, then the oxidant can be introduced. Alternatively, the oxidant can first be introduced, then the surfactant or surfactant-cosolvent mixture can be introduced. Alternatively, the oxidant and the surfactant or surfactant-cosolvent mixture can be introduced simultaneously. Simultaneously can mean that the oxidant and the surfactant and/or cosolvent are introduced within 6 months of each other, within 2 months of each other, within 1 month of each other, within 1 week of each other, within 1 day of each other, within one hour of each other, or together, for example, as a mixture of oxidant with surfactant and/or cosolvent. In each case, the oxidant is present in sufficient amounts at the right time, together with the surfactant, to oxidize contaminants as they are solubilized or mobilized by surfactant or cosolvent-surfactant mixture.

The introduced compositions, such as oxidant, surfactant, activator, cosolvent, and salts can be introduced into the subsurface in the solid phase. For example, the location where the compositions are introduced can be selected so that groundwater can dissolve the introduced compositions and convey them to where the contaminant is. Alternatively, the introduced compositions such as oxidant, surfactant, activator, cosolvent, and salts can be introduced into the subsurface as an aqueous solution or aqueous solutions. Alternatively, some compositions can be introduced in the solid phase and some can be introduced in aqueous solution.

In an embodiment of the invention, the contaminated zone to be treated can be the subsurface. Alternatively, the contaminated zone to be treated can be above ground, for example, in treatment cells, tanks, windrows, or other above-ground treatment configurations.

In an embodiment of the invention, the introduced compositions may be applied to the subsurface using injection wells, point injection systems, such as direct push or other hydraulic or percussion methods, trenches, ditches, and by using manual or automated methods.

In an embodiment of the invention, a treated composition includes soil, an oxidized contaminant, and an oxidant residue.

An embodiment of the invention involves the use of controlling the specific gravity of the introduced compositions, consisting of oxidants, activating solutions, salts, surfactants, and/or surfactant-cosolvent mixtures. By controlling the specific gravity of the injected solutions, greater control of the vertical interval of the volume of soil treated can be achieved. Sites with high concentrations of NAPL or sorbed organic chemicals in soils generally require higher concentrations of oxidants than needed at sites with lower concentration of contaminants. Injecting oxidant/activator/surfactant chemicals into the subsurface at sites with a high demand for these injected chemicals can result in solutions with densities great enough to induce downward density driven flow caused by gravitational effects. Variation of the concentration of salts associated with either the oxidant or externally added salts affects the density, which affects the vertical interval of soil contacted by the injected liquids. Controlling the density of the injected liquids enables a controlled and deliberate treatment of contaminated intervals in the subsurface.

The injection flow rate is another parameter which can be controlled to deliver treatment chemicals, e.g., oxidant, activator, and surfactant, to where chemicals of concern (COCs) reside.

For example, if dense non-aqueous phase liquids (DNAPLs) are to be targeted, the density of the injected liquids can be selected to be from about as great to greater than the density of water. For example, the density of the injected liquids can be selected to be in the range of from about 1.0 gram/cm$^3$ to about 1.5 gram/cm$^3$.

For example, shallow contamination near the water table can be effectively targeted by using persulfate concentrations in the, say, 10 g/L (grams per liter) to 15 g/L range and moderately high injection flowrates, e.g., up to 30 gpm (gallons per minute) per injection location, dependent on the geometry of the injection trench or wells. For intermediate depth locations, persulfate concentrations up to, say, 25 g/L can be used with, e.g., up to 20 gpm per injection, dependent on the geometry of the injection trench or wells. For deeper DNAPL contamination, persulfate concentrations up to 100 g/L can be used dependent on the nature of the DNAPL distributions and concentrations. Injection flowrates for deep DNAPL applications can be up to, say, 20 gpm per well, if injected above the lower permeability layers and up to, say, 10 gpm per well, if injected in the lower permeability unit.

The subsurface can include any and all materials below the surface of the ground, for example, groundwater, soils, rock, man-made structures, naturally occurring or man-made contaminants, waste materials, or products. Knowledge of the distribution of hydraulic conductivity in the soil and other physical hydrogeological subsurface properties, such as hydraulic gradient, saturated thickness, soil heterogeneity, and soil type is desirable to determine the relative contribution of downward vertical density driven flow to normal advection in the subsurface.

Field applications of S-ISCO™ technologies at sites with organic contaminants in either or both of the LNAPL and DNAPL phases or with sorbed phases are dependent on several factors for successful achievement of removal of the NAPL or sorbed phases with this new method and process. These factors can include the following.

1) Effective delivery of injected oxidants, activating solutions, and surfactants or surfactant-cosolvent mixture into the subsurface.

2) Travel of oxidant, activator, and surfactant solutions to the desired treatment interval in the soil.

3) Selection of surfactants or cosolvent-surfactant mixtures and oxidants to ensure coelution of the surfactants or cosolvent-surfactant mixtures and oxidants enabling travel of the injected species to the desired treatment interval in the soil.

4) Desorption and apparent solubilization of residual NAPL phases into the aqueous phase for destruction by the oxidant and radical species.

5) Reactions of oxidant and radical species with target mobilized contaminants of concern (COCs).

6) Production of by-products from oxidation and any other injected solutions, including organic or metal species that are below concentrations of regulatory thresholds.

7) Oxidation or natural or enhanced biodegradation of the surfactant or surfactant-cosolvent mixture.

8) Adequate monitoring of COCs, injected oxidant and activator solutions, essential geochemical parameters and any other environmental media potentially affected by the treatment.

The method of using this new S-ISCO™ technology may involve separate screening and testing of the surfactant and cosolvents, separate testing of optimal oxidant (to meet site needs) and then testing the technologies together. This work can be done in the laboratory environment or in a combination of the laboratory environment and during field testing. This method can involve following steps.

Collection of site soils and groundwater representative of the highly contaminated soils targeted for S-ISCO™ treatment. In some cases it may be desirable to add NAPL from the site to the test soils. (One objective of this step is to provide information concerning potential remedies for a range of soil contaminant conditions, including conditions approaching the most contaminated on the site.)

Surfactant or surfactant-cosolvent mixtures to solubilize NAPL components and desorb contaminants of concern (COCs) from site soils or from NAPL in water mixtures can be screened for use in a combined surfactant-oxidant treatment. It is preferred to use blends of biodegradable citrus-based solvents (for example, d-limonene) and degradable surfactants derived from natural oils and products.

For example, a composition of surfactant and cosolvent can include at least one citrus terpene and at least one surfactant. A citrus terpene may be, for example, CAS No. 94266-474, citrus peels extract (*citrus* spp.), citrus extract, Curacao peel extract (*Citrus aurantium* L.), EINECS No. 304454-3, FEMA No. 2318, or FEMA No. 2344. A surfactant may be a nonionic surfactant. For example, a surfactant may be an ethoxylated castor oil, an ethoxylated coconut fatty acid, or an amidified, ethoxylated coconut fatty acid. An ethoxylated castor oil can include, for example, a polyoxyethylene (20) castor oil, CAS No. 61791-12-6, PEG (polyethylene glycol)-10 castor oil, PEG-20 castor oil, PEG-3 castor oil, PEG-40 castor oil, PEG-50 castor oil, PEG-60 castor oil, POE (polyoxyethylene) (10) castor oil, POE (20) castor oil; POE (20) castor oil (ether, ester); POE (3) castor oil, POE (40) castor oil, POE (50) castor oil, POE (60) castor oil, or polyoxyethylene (20) castor oil (ether, ester). An ethoxylated coconut fatty acid can include, for example, CAS No. 39287-84-8, CAS No. 61791-29-5, CAS No. 68921-12-0, CAS No. 805146-5, CAS No. 8051-92-1, ethoxylated coconut fatty acid, polyethylene glycol ester of coconut fatty acid, ethoxylated coconut oil acid, polyethylene glycol monoester of coconut oil fatty acid, ethoxylated coco fatty acid, PEG-15 cocoate, PEG-5 cocoate, PEG-8 cocoate, polyethylene glycol (15) monococoate, polyethylene glycol (5) monococoate, polyethylene glycol 400 monococoate, polyethylene glycol monococonut ester, monococonate polyethylene glycol, monococonut oil fatty acid ester of polyethylene glycol, polyoxyethylene (15) monococoate, polyoxyethylene (5) monococoate, or polyoxyethylene (8) monococoate. An amidified, ethoxylated coconut fatty acid can include, for example, CAS No. 61791-08-0, ethoxylated reaction products of coco fatty acids with ethanolamine, PEG-11 cocamide, PEG-20 cocamide, PEG-3 cocamide, PEG-5 cocamide, PEG-6 cocamide, PEG-7 cocamide, polyethylene glycol (11) coconut amide, polyethylene glycol (3) coconut amide, polyethylene glycol (5) coconut amide, polyethylene glycol (7) coconut amide, polyethylene glycol 1000 coconut amide, polyethylene glycol 300 coconut amide, polyoxyethylene (11) coconut amide, polyoxyethylene (20) coconut amide, polyoxyethylene (3) coconut amide, polyoxyethylene (5) coconut amide, polyoxyethylene (6) coconut amide, or polyoxyethylene (7) coconut amide.

The surfactant can be made from an oil selected from the group consisting of castor oil, coca oil, coconut oil, soy oil, tallow oil, cotton seed oil, and a naturally occurring plant oil.

Aqueous phase screening can be used for the selection of appropriate oxidants with and without activators or cosolvents for the destruction of selected COCs in collected groundwater from the site. An activator can be, for example, a chemical molecule or compound, or another external agent or condition, such as heat, temperature, or pH, that increases the rate of or hastens a chemical reaction. The activator may or may not be transformed during the chemical reaction that it hastens. Examples of activators which are chemical compounds include a metal, a transition metal, a chelated metal, a complexed metal, a metallorganic complex, and hydrogen peroxide. Examples of activators which are other external agents or conditions include heat, temperature, and high pH. Preferred activators include Fe(II), Fe(III), Fe(II)-EDTA, Fe(III)-EDTA, Fe(II)-citric acid, Fe(III)-citric acid, hydrogen peroxide, high pH, and heat.

A catalyst is a substance that increases or hastens the rate of a chemical reaction, but which is not physically or chemically changed during the reaction. For example, a preferred oxidant to use is persulfate, e.g., sodium persulfate. Attributed to its relatively high stability under normal subsurface conditions, persulfate more effectively travels through the subsurface into the target contaminant zone, in comparison to hydrogen peroxide associated with Fenton's or Modified Fenton's Chemistry. Other oxidants include ozone and permanganate, percarbonates, hydrogen peroxide, and various hydrogen peroxide or Fenton's Reagent mixtures. A control system should be run to compare the treatment conditions to those with no treatment. Additionally, tests of the stability of the surfactant or surfactant-cosolvent mixture can be necessary to ensure that the oxidant does not immediately, or too quickly, oxidize the surfactant or cosolvent-surfactant mixture rendering it useless for subsequent dissolution.

Non-thermal ISCO using persulfate requires activation by ferrous ions, Hoag, G. et al. (2000) (ref. 12) but preferentially chelated metals Brown, R. et al. (2002), Hoag, G. and Mao, F. (2004), Liang, C. et al. (2004) (ref. 13). Chelated iron has been demonstrated to prolong the activation of persulfate enabling activation to take place at substantial distances from injection wells.

Several practical sources of Fe(II) or Fe(III) can be considered for activation of persulfate. Iron present in the soil minerals that can be leached by injection of a free-chelate (a chelate not complexed with iron, but usually $Na^+$ and $H^+$) can be a source. Injection of soluble iron as part of a chelate complex, such as Fe(II)-EDTA, Fe(II)-NTA or Fe(II)-Citric Acid (other Fe-Chelates are available) can be a source. Indigenous dissolved iron resulting from reducing conditions present in the subsurface (common at many MGP sites) can be a source. For the Pilot Test, discussed as an example below, Fe(II)-EDTA was used.

Soil slurry tests can be run on selected combinations of surfactant or surfactant-cosolvent mixtures to determine the solubilization of specific COCs relative to site cleanup criteria. Additionally, soil slurry tests can be run to screen and determine optimal dosing of chemical oxidants for both dosing requirements and COCs treated. The technology of combining enhanced solubilization by surfactants or surfactant-cosolvent mixtures with chemical oxidation is a more aggressive approach to desorb residual tars, oils, and other NAPLs from the soils and simultaneously oxidize the desorbed COCs with the chosen chemical oxidant. A soil slurry control system can be run to compare the treatment conditions with no treatment.

Soil column tests can be run to closely simulate treatment performance and COC destruction using soil cores obtained from the most highly contaminated soils associated with the proposed surface enhanced in situ chemical oxidation (S-ISCO™) treatment areas of a site. Results from soil column tests can be used to identify the treatment conditions and concentrations of chemicals to be evaluated. The soil column tests can consist of using one oxidant alone or a mixture of oxidants simultaneously with a surfactant or a mixture of surfactants or a cosolvent-surfactant mixture; various configurations or concentrations of oxidants or mixtures of oxidants used alone or simultaneously with a surfactant or a cosolvent-surfactant mixture can be selected for study based on soil slurry tests. Different activation methods can additionally be tested using soil column testing. By monitoring surfactant concentrations and/or interfacial tension in the effluent of the soil columns, the reactivity of the surfactant and cosolvents with the oxidants can be determined to determine compatibility of oxidants with surfactants and cosolvents. Monitoring of COC concentrations in the effluent of the column can also determine the ability of the oxidant to destroy the cosolvent-surfactant or surfactant micelles or emulsions and react with the COCs.

Data analysis of processes monitored, as described above, enables design criteria for the development of pilot- and full-scale implementation of the S-ISCO™ technology to be implemented in the field. Design parameters include moles of oxidant used in the tests per mole of COCs destroyed, moles of oxidant used per mass of soil treated, moles of surfactant utilized per mole of COC solubilized, moles of surfactant or of cosolvent-surfactant mixture destroyed per unit contact time in the batch or column test, rates of COC destruction, rates of oxidant utilization, and loading rates of chemicals.

An example of an oxidant is persulfate, e.g., sodium persulfate, of an activator is Fe(II)-EDTA, of a surfactant is Alfoterra 53, and of a cosolvent-surfactant mixture is a mixture of d-limonene and biodegradable surfactants, for example, Citrus Burst 3. Citrus Burst 3 includes a surfactant blend of ethoxylated monoethanolamides of fatty acids of coconut oil and polyoxyethylene castor oil and d-limonene.

An embodiment of the invention is the simultaneous or sequential use of the oxidant persulfate, and an activator to raise the pH of the groundwater to above 10.5 by the addition of CaO, Ca(OH)2, NaOH, or KOH, an example of a cosolvent-surfactant is Citrus Burst 3.

An embodiment of the invention is the simultaneous or sequential use of cosolvent-surfactant mixtures, for example, Citrus Burst 3 with activated persulfate (activated at a high pH with NaOH) for the treatment of sites contaminated with chlorinated solvents and other chlorinated or halogenated compounds.

A preferred embodiment of the disclosed process is the simultaneous or sequential use of surfactants or cosolvent-surfactant mixtures with activated persulfate (activated with Fe(II)-EDTA) for the treatment of former manufactured gas plant (MGP) sites. Another preferred embodiment of this invention is the site-specific use of surfactants or cosolvent-surfactant mixtures for selective dissolution or desorption of NAPL constituents exceeding site cleanup criteria with simultaneous oxidation by a chemical oxidant that has capabilities to oxidize the compounds, so that site cleanup criteria are achieved. Another preferred embodiment of this invention is the site-specific use of surfactants or cosolvent-surfactant mixtures for selective mobilization of NAPL constituents using a Winsor Type II or III system with simultaneous or sequential oxidation by a chemical oxidant that has capabilities to oxidize the compounds, so that site cleanup criteria are achieved.

When the S-ISCO™ process according to the present invention is complete, the remaining concentration of contaminants is greatly reduced from the initial concentration. The remaining contaminants, whether they reside in the dissolved or in the sorbed phases are much more readily amenable to natural attenuation processes, including biodegradation.

In an embodiment of S-ISCO™ remediation, a formulation can be introduced into the subsurface above the water table, that is, into the unsaturated or vadose zone. The introduced composition can include cosolvent, surfactant, or a cosolvent/surfactant mixture, can include an oxidant, and can optionally further include an activator. The density of the introduced composition can be adjusted to be less than that of water. Introducing such a composition into the subsurface above the water table can be used to control the volatilization of volatile inorganic and/or organic chemicals from the saturated zone into the unsaturated zone in order to prevent or minimize the risk of exposure of people to vapors of these volatile inorganic and/or organic chemicals.

Examples of cosolvents which preferentially partition into the NAPL phase include higher molecular weight miscible alcohols such as isopropyl and tert-butyl alcohol. Alcohols with a limited aqueous solubility such as butanol, pentanol, hexanol, and heptanol can be blended with the water miscible alcohols to improve the overall phase behavior. Given a sufficiently high initial cosolvent concentration in the aqueous phase (the flooding fluid), large amounts of cosolvent partition into the NAPL. As a result of this partitioning, the NAPL phase expands, and formerly discontinuous NAPL ganglia can become continuous, and hence mobile. This expanding NAPL phase behavior, along with large interfacial tension reductions, allows the NAPL phase to concentrate at the leading edge of the cosolvent slug, thereby increasing the mobility of the NAPL. Under certain conditions, a highly efficient piston-like displacement of the NAPL is possible. Because the cosolvent also has the effect of increasing the NAPL solubility in the aqueous phase, small fractions of the NAPL which are not mobilized by the above mechanism are dissolved by the cosolvent slug.

The phase behavior of the specific system is controllable. Laboratory experiments have shown that surfactant/cosolvents that preferentially stay with the aqueous phase can dramatically increase the solubility of NAPL components in the aqueous phase (Falta, 1998) (20). In cases where the solvent preferentially partitions into the aqueous phase, separate phase NAPL mobilization is not observed and the NAPL removal occurs by enhanced dissolution. Solubilization has the added benefit of increasing bioavailability of the contaminants and increased rate of biological degradation of the contaminants.

Surfactant Solubilization, Surfactant Mobilization, and Microemulsions

Surfactants are surface active agents. They are molecules that have both hydrophilic and lipophilic parts (Shiau et al., 1994) (21). The amphophilic nature of surfactant molecules (having both positive and negative charged parts) causes them when injected into aquifers to accumulate at the water-solid interface. Furthermore, surfactant molecules can coagulate into aggregates known as micelles. Micelles are colloidal-sized aggregates. The surfactant concentration at which micelle formation begins is known as the critical micelle concentration (CMC). Determining the CMC of a surfactant or a cosolvent-surfactant mixture mixtures is an important component in managing S-ISCO™ remediation. Micelle formation generally distinguishes surfactants from amphophilic molecules (for example, alcohols) that do not form micelles and have lower surface activity.

Surfactant addition above the CMC results in the formation of additional micelles. Winsor Type behavior describes different types of micelle formation that is relevant to remediation of sites with NAPLs or sorbed COCs. Winsor Type I micelles have a hydrophilic exterior (the hydrophilic heads are oriented toward the exterior of the aggregate) and a hydrophobic interior (the hydrophobic tails are oriented toward the interior of the aggregate). This type of micelle can be likened to dispersed oil drops or molecules; the hydrophobic inside of the micelle acts as an oil sink into which hydrophobic contaminants can partition. The increased scale aqueous solubility of organic compounds at concentrations above the CMC is referred to as "solubilization." During solubilization, surfactant concentration increases, additional micelles are formed and the contaminant solubility continues to increase. S-ISCO™ remediation optimizes and controls solubilization reactions at NAPL and sorbed COC sites.

Winsor Type II surfactants are oil soluble and have a low hydrophile-lipophile balance (HLB). These type of surfactants partition into the oil phase, and may form reverse micelles. A reverse micelle has a hydrophilic interior and lipophilic exterior. The resulting phenomenon is similar to dispersed water drops in the oil phase. Surfactant systems intermediate between micelles and reverse micelles can result in a third phase (Winsor Type III system) known as a middle-phase microemulsion. The middle phase system is known to coincide with very low interfacial tensions (IFTs) and can be used for bulk (pump-and-treat) extraction of contaminants from residual saturation. Surfactant-enhanced remediation by this approach is often referred to as mobilization. The surfactants or cosolvent-surfactant mixtures used and the chemical conditions under which solubilization and mobilization occur are very different. Solubilization can be effected at very low surfactant concentrations that can be orders of magnitude below that at which mobilization occurs.

Microemulsions are a special class of a Winsor Type I system in which the droplet diameter of the dispersed phase is very small and uniform. Droplet diameters of oil-in-water microemulsions generally range between 0.01 and 0.10 μm. (Tawitz, et al., 1998) (26). These microemulsions are single phase, optically transparent, low viscosity, thermodynamically stable systems that form spontaneously on contact with an oil or NAPL phase. A properly designed microemulsion system is dilutable with water and can be transported through porous media by miscible displacement. This is in contrast to surfactant-based technologies that utilize Winsor Type III middle-phase microemulsions which depend on mobilization to transport the NAPL phase as an immiscible displacement process.

Microemulsions are usually stabilized by a surfactant and a cosolvent. A mixture of water, surfactant, and cosolvent form the microemulsion "precursor"; this "precursor" should be a stable single-phase, low viscosity system. When this precursor is injected into a porous medium containing residual NAPL, the NAPL is microemulsified and can be transported to an extraction well as a single phase, low viscosity fluid. Suitable cosolvents are low-molecular-weight alcohols (propanol, butanol, pentanol, hexanol, etc.), organic acids, and amines. There are many surfactants that form oil-in-water microemulsions in the presence of alcohol cosolvents. Some of these surfactants have been given direct food additive status by the FDA, are non-toxic, and are readily biodegradable.

Any surfactant-based remediation technology must utilize surfactants with optimum efficiency (i.e., minimal losses to sorption, precipitation, coacervate formation, crystallization, or phase changes), environmental acceptance, and biodegradability. Surfactants can be lost from a solution by adsorption onto aquifer solid phases and by precipitation with polyvalent cations dissolved in ground water or adsorbed onto cation exchange sites. Surfactants without cosolvents sometimes create viscous macromolecules or liquid crystals when they combine with the contaminants essentially blocking fluid flow. Cosolvents can be used to stabilize the system and avoid macromolecule formation. It has been suggested that chromatographic separation of surfactants and cosolvents could reduce microemulsification efficiency. However, experimental observations on systems containing 10 to 15 percent residual NAPL saturation indicate that, if chromatographic separation occurred, its effect on microemulsification was negligible.

Methods for Determining Contaminant Remediation Protocols

A method for determining a contaminant remediation protocol, for example, of a protocol for remediating soil in a subsurface contaminated with NAPL or other organic chemicals, can include the following steps. Site soil samples can be collected under zero headspace conditions (e.g., if volatile chemicals are present); for example, samples representative of the most highly contaminated soils can be collected. The samples can be homogenized for further analysis. A target contaminant or target contaminants in the soil can be identified. The demand of a sample of oxidant per unit soil mass can be determined; for example, the demand of a soil sample for a persulfate oxidant, such as sodium persulfate, can be determined. An oxidant is, for example, a chemical or agent that removes electrons from a compound or element, increases the valence state of an element, or takes away hydrogen by the addition of oxygen. A suitable oxidant and/or a suitable mixture of an oxidant and an activator for oxidizing the target contaminant can be selected. Suitable surfactants, mixtures of surfactants, and/or mixtures of surfactants, cosolvents, and/or solvents capable of solubilizing and/or desorbing the target contaminant or contaminants can be identified; for example, suitable biodegradable surfactants can be tested. Suitable solvents capable of solubilizing and/or desorbing the target contaminant or contaminants can be identified; for example, suitable biodegradable solvents such as d-limonene can be tested.

Various concentrations of cosolvent-surfactant mixtures or surfactants alone can be added to water or groundwater from a site along with controlled quantities of NAPLs. Relationships of the extent of dissolution of the NAPL compounds with the varying concentrations of the cosolvent-surfactant mixtures or surfactants can be established by measuring the concentrations of the NAPL compounds that enter the aqueous phase. Relationships between the interfacial tension and solubilized NAPL compounds and their molecular properties, such as the octanol-water partition coefficient ($K_{ow}$) can also be established that enable optimal design of the dissolution portion of the S-ISCO™ process. Various concentrations of cosolvent-surfactant mixtures or surfactants alone can be added to water or groundwater from a site along with controlled quantities of contaminated soils from the site. Relationships of the extent of solubilization of the sorbed COC compounds with the varying concentrations of the cosolvent-surfactant mixtures or surfactants can be established by measuring the concentrations of the sorbed COCs that enter the aqueous phase. Relationships between the interfacial tension and desorbed and solubilized compounds and their molecular properties, such as the octanol water partition coefficient ($K_{ow}$) can also be established that enable optimal design of the dissolution portion of the S-ISCO™ process. The simultaneous use of oxidants and surfactants or cosolvent-surfactant mixtures in decontaminating soil can be tested. For example, the effect of the oxidant on the solubilization characteristics of the surfactant can be evaluated, to ensure that the oxidant and surfactant can function together to solubilize and oxidize the contaminant. The quantity of surfactant for injection into the subsurface can be chosen to form a Winsor I system or a microemulsion.

For example, the type and quantity of surfactants and optionally of cosolvent required to solubilize the target contaminant can be determined in a batch experiment.

For example, it is important that the oxidant not react with the surfactant so fast that the surfactant is consumed before the surfactant can solubilize the contaminant. On the other hand, the surfactant should not reside in the subsurface indefinitely, to avoid being a contaminant itself. This degradation can be caused by living organisms, such as bacteria, through a biodegradation process. On the other hand, the surfactant can be selected to slowly react with the oxidant, so that the surfactant survives sufficiently long to solubilize the contaminant for the purpose of enhancing its oxidation, but once the contaminant has been oxidized, the surfactant itself is oxidized by the remaining oxidant. Experimentation on the effects of various oxidants, combinations of oxidants, and activators on the stability and activity of cosolvent-surfactant mixtures and surfactants can be readily conducted to provide information to optimize S-ISCO™ treatment conditions, Testing of the sorption or reaction of the surfactant or surfactant-cosolvent mixture can be conducted to determine the transport and fate properties of the surfactant or surfactant-cosolvent mixture in soils, rock and groundwater. Testing is conducted in batch aqueous or soil slurry tests in which individual cosolvent-surfactant mixtures or surfactants at specified initial concentrations are mixed together with individual oxidants or mixtures of oxidants and activators. The duration of the tests is a minimum of 10 days and as long as 120 days, dependent on the stability of the oxidant-surfactant system needed for a particular application. Variation of the surface tension over time in several solutions is presented in an Example below.

Selection of Surfactant System

Development of a surfactant system for use in S-ISCO™ remediation can include preparing a series of surfactants or surfactant-cosolvent mixtures. One characteristic of a surfactant-cosolvent mixture is the ratio of the number of ethylene oxide groups to propylene oxide groups (EO/PO ratio) in the backbones of the constituent molecules. The surfactant-cosolvent mixtures in the series can have a range of EO/PO ratios. The EO/PO ratio of a mixture can be determined from knowledge of the EO/PO ratios of the constituent molecules and the molar fraction of each type of constituent molecule in the mixture. The hydrophobicity of the surfactant-cosolvent mixture can be tailored by adjusting the EO/PO ratio through varying the types of surfactant and cosolvent molecules in the mixture, or by varying the concentrations of the types of surfactant and cosolvent molecules in the mixture.

The hydrophilic-lipophilic balance (HLB) is a characteristic of a surfactant. An HLB of less than 10 indicates a surfactant in which the oleophilic (hydrophobic) property is stronger than the hydrophilic property of the surfactant. An HLB of greater than 10 indicates a surfactant in which the hydrophilic property is stronger than the oleophilic (hydrophobic) property of the surfactant.

A characteristic of organic chemicals is a characteristic known as the octanol-water partition coefficient (Kow). The Kow can be determined, for example, in a batch test in which the concentrations of an organic molecular species (such as COCs) in the octanol phase and the concentration of the molecular species in the water phase are measured. The partitioning of the organic species between the octanol and water phases is a property of organic chemicals reported in the literature from both experimental measurements and theoretical approximations. Relationships between the octanol-water partition coefficients of particular COCs and their solubilization in cosolvent-surfactant or surfactant systems is important in the evaluation and optimal design of the S-ISCO™ process.

The surfactant mixtures in the series can have various HLB value distributions. For example, a surfactant mixture can have a narrow HLB value distribution and can have a either high average HLB values, for example 12 to 15, or low average HLB values 10 to 12. Alternatively, a surfactant-cosolvent mixture can have a broad HLB value distribution with HLB values variable depending on the particular NAPL or sorbed chemical species requiring treatment.

The surfactant mixtures in the series can have various molecular weight distributions. For example, a surfactant mixture can have a narrow molecular weight distribution and can have a low or a high average molecular weight. Alternatively, a surfactant-cosolvent mixture can have a broad molecular weight distribution.

A study included preparation of a series of surfactant-cosolvent mixtures in which the EO/PO ratio and average molecular weight were varied for different COCs (Diallo et al. (1994)). Batch testing was performed on the ability of a surfactant-cosolvent mixture to solubilize a hydrocarbon, e.g., a contaminant targeted for remediation. It was observed that as the HLB of the surfactant increased that the solubilization of COC increased through a maximum, then decreased as the HLB further increased.

Thus for a given molecular contaminant species there is an optimal value of HLB for the surfactant to solubilize it. For a distribution of contaminant molecules there is an optimal distribution of HLB values. Thus, an aspect of the method presented here is determining an optimal surfactant or cosolvent-surfactant mixture, based on the HLB for which solubilization is maximized for subsequent or simultaneous oxidation of the solubilized species. An advantage of this approach is that, should circumstances require, e.g., a change in government regulations or cost of a particular surfactant, a different surfactant having a similar HLB can be substituted for a surfactant in a treatment composition.

The ability to tailor the EO/PO ratio and the molecular weight distribution of molecules in the surfactant-cosolvent mixture and thereby adjust the HLB of the surfactant allows the surfactant-cosolvent mixture to be optimized for a targeted contaminant and for sequential or simultaneous oxidation.

The transport properties of the surfactant or surfactant-cosolvent mixture in the soil of the site to be remediated can also be tested, for example, in soil-column tests. Characteristics of the soil, for example, surface chemistry, clay mineralogy, and/or pH may affect the transport properties of the surfactant or surfactant-cosolvent mixture through the soil. The results of testing of transport properties, or observations of transport properties in the field of the surfactant or surfactant-cosolvent mixture may indicate further tailoring of the hydrophilic characteristics of the surfactant. It may be indicated to trade-off some of the desired solubilization characteristics for required transport characteristics in developing a surfactant or surfactant-cosolvent mixture that is optimal for the site to be remediated.

Testing of Compositions for Injection

Testing of oxidants, surfactants, activators, cosolvents and/or solvents can be conducted with the contaminant in the non-aqueous phase and/or sorbed phase in aqueous solution, or with the contaminant in a soil slurry or soil column. A soil slurry or soil column can use a standard soil or actual soil from a contaminated site. An actual soil can be homogenized for use in a soil slurry or soil column. Alternatively, an intact soil core obtained from a contaminated site can be used in closely simulating the effect of introduction of oxidant, surfactant, and/or solvent for treatment.

Testing of oxidants, surfactants, activators, cosolvents, and/or solvents can be conducted with the contaminant in a batch experiment, with or without soil.

The range of quantity of surfactant that can form a Winsor I, II, or III system or a microemulsion in the subsurface can be identified.

Various techniques can be used in conjunction with surfactant enhanced in situ chemical oxidation (S-ISCO™) treatment, for example, use of macro-molecules or cyclodextrins, steam injection, sparging, venting, and in-well aeration.

An aspect of the control that can be achieved by use of an embodiment of the invention for site remediation is direction of antioxidant to a target region of contaminant. As discussed above, the density of the injected solution can be modified, so that the oxidant reaches and remains at the level in the subsurface of the target region of contaminant. Considering of factors such as subsurface porosity and groundwater flow, the location of wells for injecting solution containing oxidant can be selected so that oxidant flows to the target region of contaminant.

In an embodiment, the consumption of antioxidant is further controlled by including an antioxidant in the injected solution. For example, an antioxidant can be used to delay the reaction of an oxidant. Such control may prove important when, for example, the injected oxidant must flow through a region of organic matter which is not a contaminant and with which the oxidant should not react. Avoiding oxidizing this non-contaminant organic matter may be important to maximize the efficiency of use of the oxidant to eliminate the contaminant. That is, if the oxidant does not react with non-contaminant organic matter, then more oxidant remains for reaction with the contaminant. Furthermore, avoiding oxidizing non-contaminant organic matter may be important in its own right. For example, topsoil or compost may be desirable organic matter in or on soil that should be retained. The anti-oxidants used may be natural compounds or derivatives of natural compounds. By using such natural antioxidants, their isomers, and/or their derivatives, the impact on the environment by introduction of antioxidant chemicals is expected to be minimized. For example, natural processes in the environment may degrade and eliminate natural antioxidants, so that they do not then burden the environment. The use of natural antioxidants is consistent with the approach of using biodegradable surfactants, cosolvents, and solvents. An example of a natural antioxidant is a flavonoid. Examples of flavonoids are quercetin, glabridin, red clover, Isoflavin Beta (a mixture of isoflavones available from Campinas of Sao Paulo, Brazil). Other examples of natural antioxidants that can be used as antioxidants in the present method of soil remediation include beta carotene, ascorbic acid (vitamin C), and tocopherol (vitamin E) and their isomers and derivatives. Non-naturally occurring antioxidants, such as beta hydroxy toluene (BHT) and beta hydroxy anisole (BHA) could also be used as antioxidants in the present method of soil remediation.

Citrus Burst 1, Citrus Burst 2, Citrus Burst 3, and E-Z Mulse are manufactured by Florida Chemical.

EXAMPLE

Remediation of Manufactured Gas Plant (MGP) DNAPLs

A former Manufactured Gas Plant (MGP) site DNAPL was obtained from a site to conducted dissolution experiments with Citrus Burst-3. An aliquot of the DNAPL was mixed with a suitable quantity of water to determine the equilibrium solubility of the individual compounds in the presence of the MGP DNAPL. Experimental conditions for these dissolution tests are reported in Table 1.

TABLE 1

Experimental Conditions for MGP DNAPL Dissolution Experiments

| Exp. No. | Water g Total | DNAPL g | Citrus Burst-3 g | Citrus Burst-3 g/L | $DNAPL_{max}$ g/L | NaCl g | NaCl g/L |
|---|---|---|---|---|---|---|---|
| 1 | 60 | 2 | 0.05 | 0.8 | 33.3 | 3 | 50 |
| 2 | 60 | 2 | 0.1 | 1.7 | 33.3 | 3 | 50 |
| 3 | 60 | 2 | 0.25 | 4.2 | 33.3 | 3 | 50 |
| 4 | 60 | 2 | 0.5 | 8.3 | 33.3 | 3 | 50 |
| 5 | 60 | 2 | 1 | 16.7 | 33.3 | 3 | 50 |
| 6 | 60 | 2 | 2.5 | 41.7 | 33.3 | 3 | 50 |
| 7 | 60 | 2 | 5 | 83.3 | 33.3 | 3 | 50 |
| 8 | 60 | 2 | 0 | 0.0 | 33.3 | 3 | 50 |
| 9 | 60 | 2 | 0 | 0.0 | 33.3 | 3 | 50 |

The data collected following the conditions presented in Table 1 were obtained at 25° C. with 60 rpm shaker table mixing for 48 hours. After the shaker was shut off, the samples sat quietly for 5 minutes before the supernatant was analyzed. $DNAPL_{max}$ represents the maximum concentration of DNAPL that may dissolve, given the mass of DNAPL and the volume of water.

The observed solubility of the MGP DNAPL compounds in the aqueous phase are quite low and will be the basis to compare enhanced dissolution using Citrus Burst-3. After 48 hours of slowly mixing the DNAPL and water mixtures (with and without Citrus Burst-3), the samples were allowed to sit for 5 minutes and then samples of the solubilized fraction of the mixture were collected and analyzed for VOCs and SVOCs using USEPA Methods 8260 and 8270, respectively. Samples from experiment number 1, 3, 5, 7 and 8 (control) were analyzed. Additionally, measurements of interfacial tension (IFT) were conducted on the samples after the 48 hour period.

Figure 1:
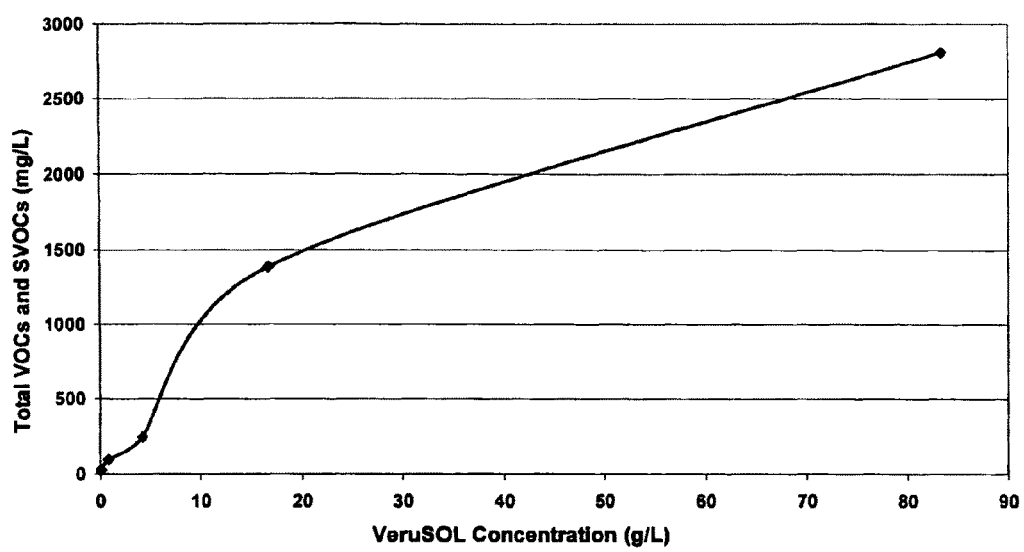
FIG. 1 is a graph depicting the concentration of dissolved VOCs and SVOCs together as a function of VeruSOL (Citrus Burst 3) concentration.
Figure 2:
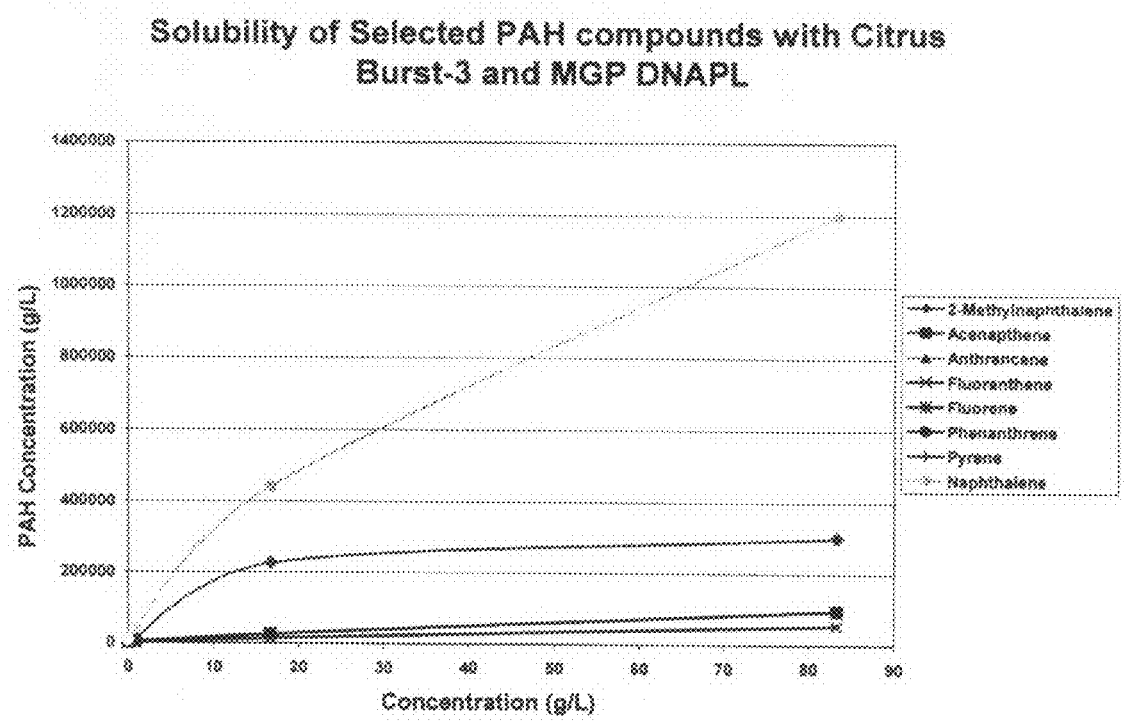
FIG. 2 is a graph depicting the solubility of selected PAH compounds as a function of Citrus Burst 3 concentration.
Figure 3:
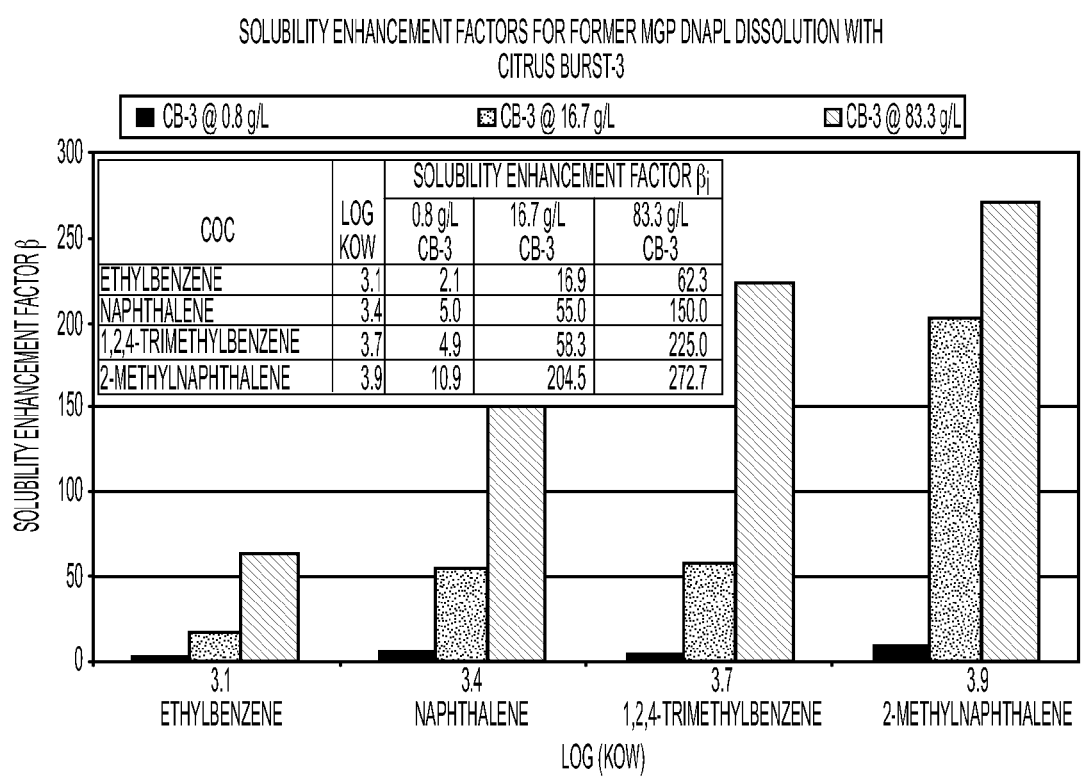
FIG. 3 is a bar graph depicting solubility enhancement factors for several different molecules having different octanol-water partition coefficients at three different concentrations of Citrus Burst 3.
Figure 4:
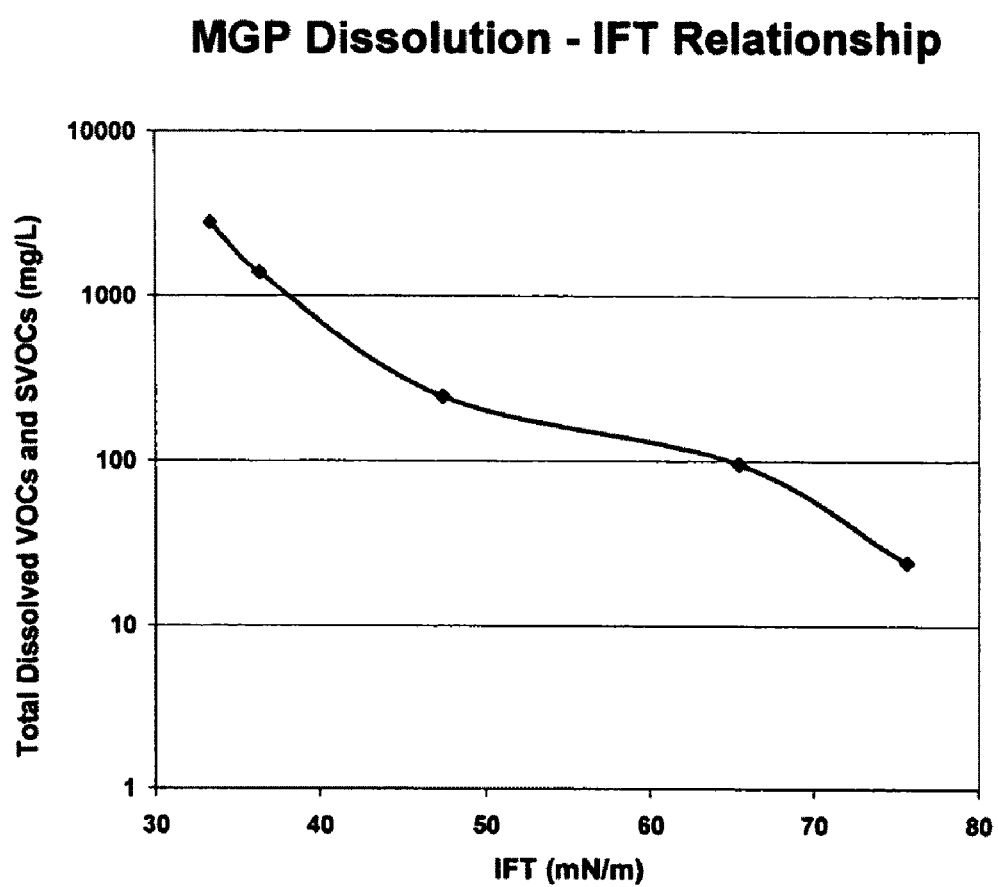
FIG. 4 is a semilog plot depicting the total concentration of dissolved VOCs and SVOCs as a function of interfacial surface tension.

The ability of increasing concentrations of Citrus-Burst-3 to dissolve the MGP DNAPL is evident in FIG. 1 for Total VOCs and SVOCs and in FIG. 2 for selected individual Polycyclic Aromatic Hydrocarbon (PAH) compounds. Once the concentrations of the VOCs and SVOCs compounds in the solubilized phase were measured, the solubility enhancement factors, β, were calculated for selected MGP compounds at each Citrus Burst concentration. β is simply the ratio of the concentration in mg/L of the individual VOC compound dissolved with the CB-3 divided by the solubility of the same individual VOC or SVOC compound dissolved in the presence of the MGP DNAPL without the cosolvent surfactant. The results of this test are found in FIG. 3. The β values varied from a low of 2.1 for ethylbenzene at a Citrus Burst concentration of 0.8 g/L, to a high of 272.7 for 2-methyl naphthalene at a Citrus Burst concentration of 83.3 g/L. A log-normal plot of the total VOCs dissolved using various doses of Citrus-Burst 3 versus the interfacial tension measurement (IFT) taken in each vial after 48 hours of contact can be found in FIG. 4. For example, it can be readily observed from FIG. 4 that IFT measurements can be used to easily determine the solubility potential of the cosolvent-surfactant mixture with MGP DNAPLs. The highly linear log-normal relationship of the logarithm of the octanol water partition coefficient (log $(K_{ow})$) and the solubility enhancement factor, β, for each of the tested Citrus Burst-3 concentration allows prediction of the solubility behavior of many organic compounds using the relationship. It is evident to those skilled in the art that these types of experiments and relationships can be used to screen and determine optimal types and concentrations of surfactants and cosolvent-surfactant mixtures that can be used to optimize dissolution of MGP DNAPL organic compounds useful in the S-ISCO process.

EXAMPLE

Remediation of Chlorinated Solvent

A chlorinated solvent DNAPL was obtained from a site consisting of chlorinated solvents and chlorinated semi-volatile compounds. Composition of the chlorinated solvent DNAPL is presented based on determinations using USEPA Methods 8260 and 8270. An aliquot of the DNAPL was mixed with a suitable quantity of deionized water to determine the equilibrium solubility of the individual compounds in the presence of the DNAPL. Experimental conditions for these dissolution tests are reported in Table 2.

TABLE 2

Experimental Conditions for Chlorinated DNAPL Dissolution Experiments

| Exp. No. | Water g Total | DNAPL g | Citrus Burst-3 g | Citrus Burst-3 g/L | $DNAPL_{max}$ g/L | NaCl g | NaCl g/L |
|---|---|---|---|---|---|---|---|
| 1 | 60 | 2 | 0.05 | 0.8 | 33.3 | 3 | 50 |
| 2 | 60 | 2 | 0.1 | 1.7 | 33.3 | 3 | 50 |
| 3 | 60 | 2 | 0.25 | 4.2 | 33.3 | 3 | 50 |
| 4 | 60 | 2 | 0.5 | 8.3 | 33.3 | 3 | 50 |

TABLE 2-continued

Experimental Conditions for Chlorinated
DNAPL Dissolution Experiments

| Exp. No. | Water g Total | DNAPL g | Citrus Burst-3 g | Citrus Burst-3 g/L | $DNAPL_{max}$ g/L | NaCl g | NaCl g/L |
|---|---|---|---|---|---|---|---|
| 5 | 60 | 2 | 1 | 16.7 | 33.3 | 3 | 50 |
| 6 | 60 | 2 | 2.5 | 41.7 | 33.3 | 3 | 50 |
| 7 | 60 | 2 | 5 | 83.3 | 33.3 | 3 | 50 |
| 8 | 60 | 2 | 0 | 0.0 | 33.3 | 3 | 50 |
| 9 | 60 | 2 | 0 | 0.0 | 33.3 | 3 | 50 |

The data collected under the experimentation conditions presented in Table 2 were obtained at 25° C. with 60 rpm shaker table mixing for 48 hours. After the shaker was shut off, the samples sat quietly for 5 minutes before the supernatant was analyzed. $DNAPL_{max}$ represents the maximum concentration of DNAPL that may dissolve, given the mass of DNAPL and the volume of water.

Results of these analyses and the pure compound solubilities of the individual compounds are reported in Table 3.

TABLE 3

Chlorinated DNAPL Composition and Dissolution
in Control Sample Without Cosolvent-Surfactant

| Compound | DNAPL Composition % | Observed Solubility in Control Sample (mg/L) | DNAPL Mol Fraction | Pure Compound Aqueous Solubility (mg/L) |
|---|---|---|---|---|
| Tetrachloroethene (PCE) | 67.68% | 140 | 0.194 | 800 |
| Carbon Tetrachloride (CTC) | 19.65% | 100 | 0.724 | 129 |
| Hexachlorobutadiene (HCBD) | 4.15% | NA | 0.006 | 0.005 |
| Hexachlorobenzene (HCB) | 0.93% | 1.4 | 0.024 | 3.2 |
| Hexachloroethane (HCE) | 7.42% | NA | 0.051 | 50 |
| Octachlorostyrene (OCS) | 0.16% | NA | 0.000 | insoluble |
| Octachloronaphthalene (OCN) | 0.01% | NA | 0.001 | insoluble |

Carbon tetrachloride and tetrachloroethylene comprised more than 87 percent of the DNAPL. Being a saturated compound, carbon tetrachloride is generally a pervasive and difficult to degrade compound once introduced to the subsurface. The observed solubility of the DNAPL compounds in the aqueous phase are quite low and will be the basis to compare enhanced dissolution using Citrus Burst-3. After 48 hours of slowly mixing the DNAPL and water mixtures, the samples were allowed to sit for 5 minutes and then samples of the solubilized fraction of the mixture were collected and analyzed for VOCs using USEPA Method 8260. Samples from experiment number 1, 3, 5, 7 and 8 (control) were analyzed. Additionally, measurements of interfacial tension (IFT) were conducted on the samples after the 48-hour period.

Figure 5:
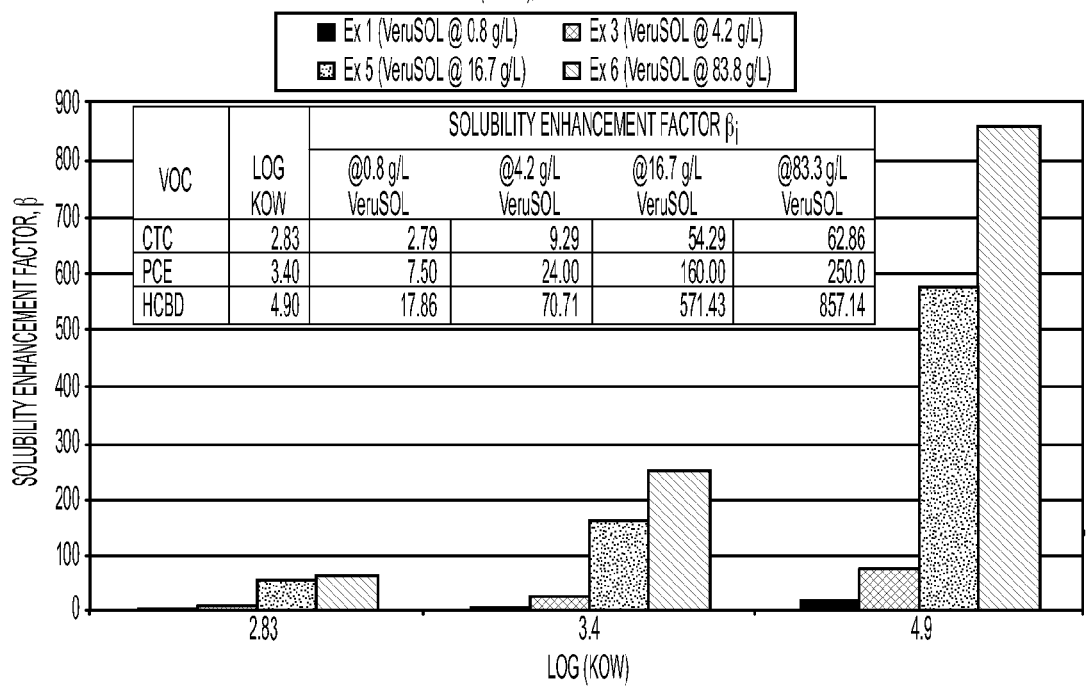
FIG. 5 is a bar graph depicting solubility enhancement factors for several different chlorinated molecules having different octanol-water partition coefficients at four different concentrations of Citrus Burst 3.
Figure 6:
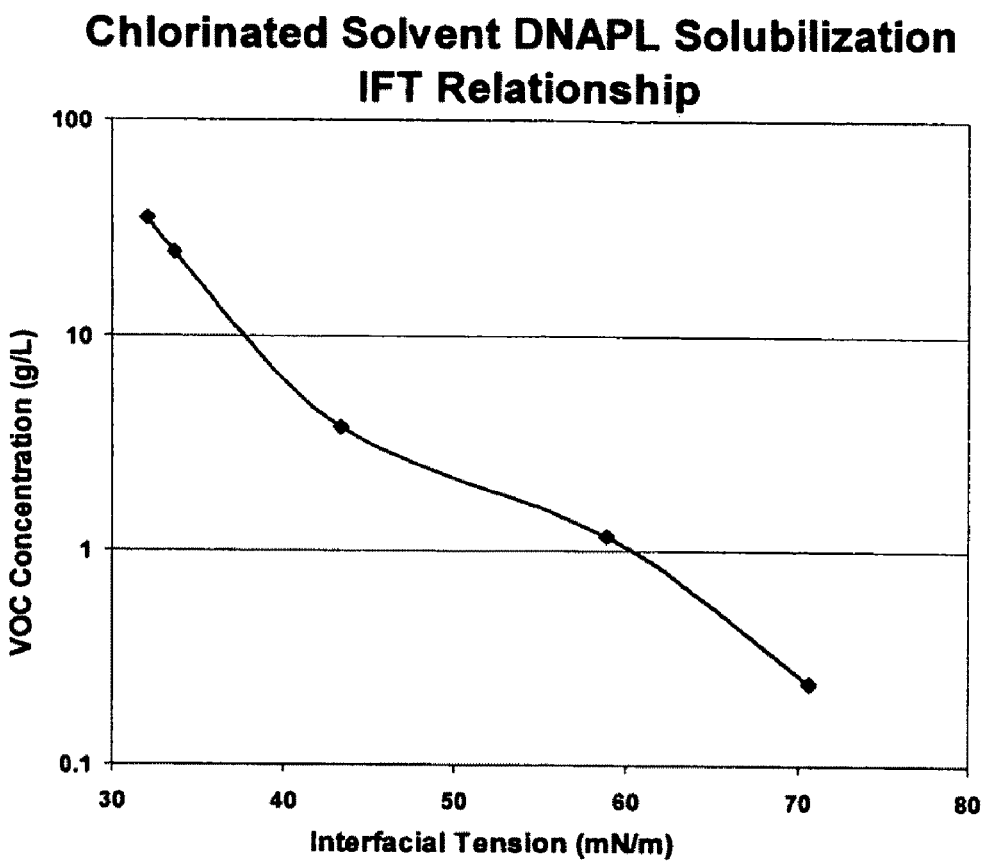
FIG. 6 is a semilog plot depicting the concentration of dissolved VOCs as a function of interfacial surface tension.

Once the concentrations of the VOC compounds in the solubilized phased were measured, the solubility enhancement factors, $\beta$, was calculated for each compound at each Citrus Burst concentration. $\beta$ is the ratio of the concentration in mg/L of the individual VOC compound dissolved with the CB-3 divided by the solubility of the same individual VOC compound dissolved in the presence of the DNAPL without the cosolvent surfactant. The results of this test are found in FIG. 5. The b values varied from a low of 2.79 for carbon tetrachloride at a Citrus Burst concentration of 0.8 g/L, to a high of 857.14 for hexachlorobutadiene at a Citrus Burst concentration of 83.3 g/L. A log-normal plot of the total VOCs dissolved using various doses of Citrus-Burst 3 versus the interfacial tension measurement (IFT) taken in each vial after 48 hours of contact can be found in FIG. 6. For example, it can be readily observed from FIG. 6 that IFT measurements can be used to easily determine the solubility potential of the cosolvent-surfactant mixture. The highly linear log-normal relationship of the logarithm of the octanol-water partition coefficient ($\log(K_{ow})$) and the solubility enhancement factor, $\beta$, for each of the tested Citrus Burst-3 concentration allows prediction of the solubility behavior of many organic compounds using the relationship. It is evident to those skilled in the art that these type of experiments and relationships can be used to screen and determine optimal types and concentrations of surfactants and cosolvent-surfactant mixtures that can be used to optimize dissolution of NAPL organic compounds useful in the S-ISCO process.

Figure 7:
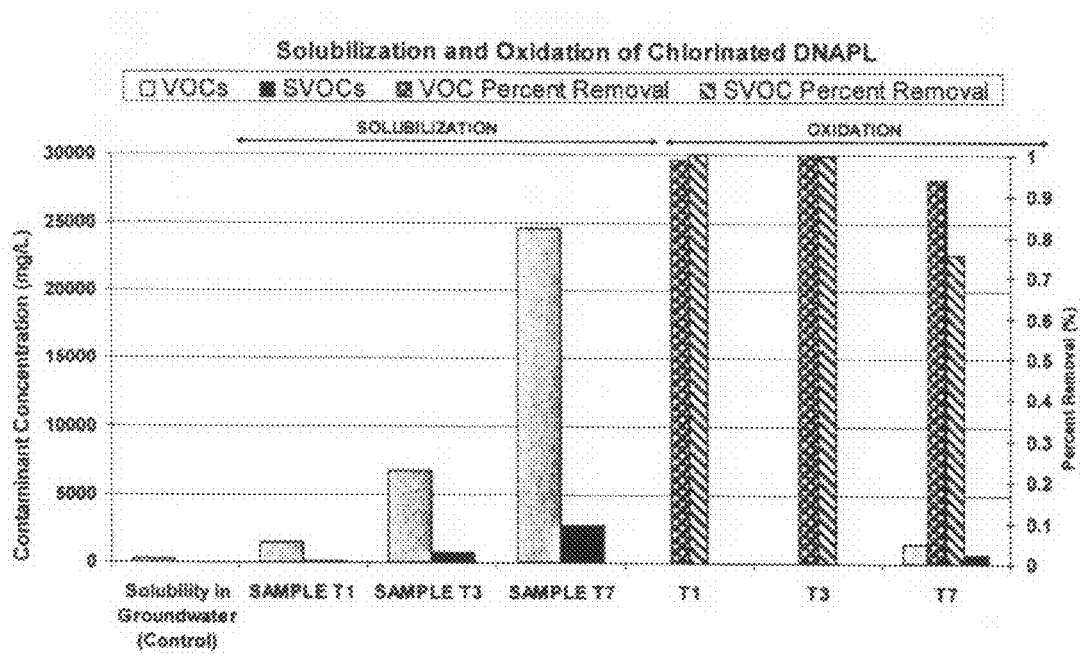
FIG. 7 is a bar graph depicting the concentration of VOC and SVOC contaminants upon solubilization and following oxidation. The percentages of VOC and SVOC contaminants removed are also depicted.

Aliquots of the Citrus Burst-3 enhanced solubilized DNAPL mixtures were added to aliquots of a sodium persulfate solution and the bulk solution pH adjusted to greater than 12 using NaOH. Prior to adding the sodium persulfate, initial VOC and SVOC concentrations of the solutions were determined using USEPA Methods, 8260 and 8270, respectively, as shown in Table 3. These solutions were slowly mixed at 60 rpm on an orbital shaker table for 14 days. After the 14 day mixing period the solutions were removed from the mixer and the VOC and SVOC concentrations were measured using USEPA Methods 8260 and 8270. The overall removal of VOCs and SVOCs was calculated for each treatment condition and the results can be found in FIG. 7. The T1 and T3 samples, which initially had 0.8 g/L and 4.3 g/L, respectively of Citrus-Burst 3, had greater than 99 percent removals of VOCs and SVOCs after 14 days of treatment. The T7 sample that initially had a Citrus Burst-3 concentration 83.3 g/L and a much greater concentration of VOCs and SVOCs than the other vials, removed of VOCs and SVOCs were 94 percent and 76 percent, respectively. The initial IFT measurements for the T1, T3, and T7 tests prior to oxidation were 63.9 mS/cm, 48.5 mS/cm and 35.40 mS/cm, respectively. Following the 14 day oxidation period, the final IFT readings for the T1, T3, and T7 tests were 74.4 mS/cm, 73.1 mS/cm and 35.40 mS/cm, respectively. It evident that the alkaline persulfate substantially removed the dissolved VOCs and SVOCs from the T1 and T3 samples, as well as the returning the IFT values to background conditions of water without any added cosolvent-surfactant. In the case of the T-7 sample, the IFT values remained low while high removal percentages of the VOCs and SVOCs were observed. It is likely that additional time was required to destroy the remaining VOCs and SVOCs in the T7 vial and to increase the IFT to background conditions. Digital photographs were taken of the test vials before, during and after the 14 day treatment. It was evident after 14 days of treatment that the turbidity and red color (associated with the Suidan IV dyed DNAPL) were completely removed and the solutions returned to a clear condition. In the T7 sample, the red color was removed (indicative of most of the dissolved DNAPL removed) and much of the turbidity was reduced.

EXAMPLE

Stability of Cosolvent-Surfactant Mixtures with Activated Persulfate

In this example, the stability of a cosolvent, surfactants and cosolvent-surfactant mixtures in the presence of persulfate activated using Fe(II)-EDTA and at high pH are presented. The ability of cosolvents, surfactants and cosolvent-surfactant mixtures to resist rapid destruction by oxidants is an important design parameter in the S-ISCO process.

First experiments were conducted using d-limonene as a cosolvent, a mixture of non-ionic surfactants (EZ-Mulse) and cosolvent-surfactant mixtures (Citrus Burst-1, Citrus Burst-2 and Citrus Burst-3).

Initial tests to evaluate the impacts of pH and alkaline activated persulfate were conducted using 1,000 mg/L concentrations of the various cosolvent, surfactant or cosolvent-surfactant mixtures in water alone at: 1) controlled pH values of 7, 10 and 12 and controlled pH values with 25 g/L of sodium persulfate. The tests were conducted for 30 days. pH was controlled using NaOH.

Figure 8:
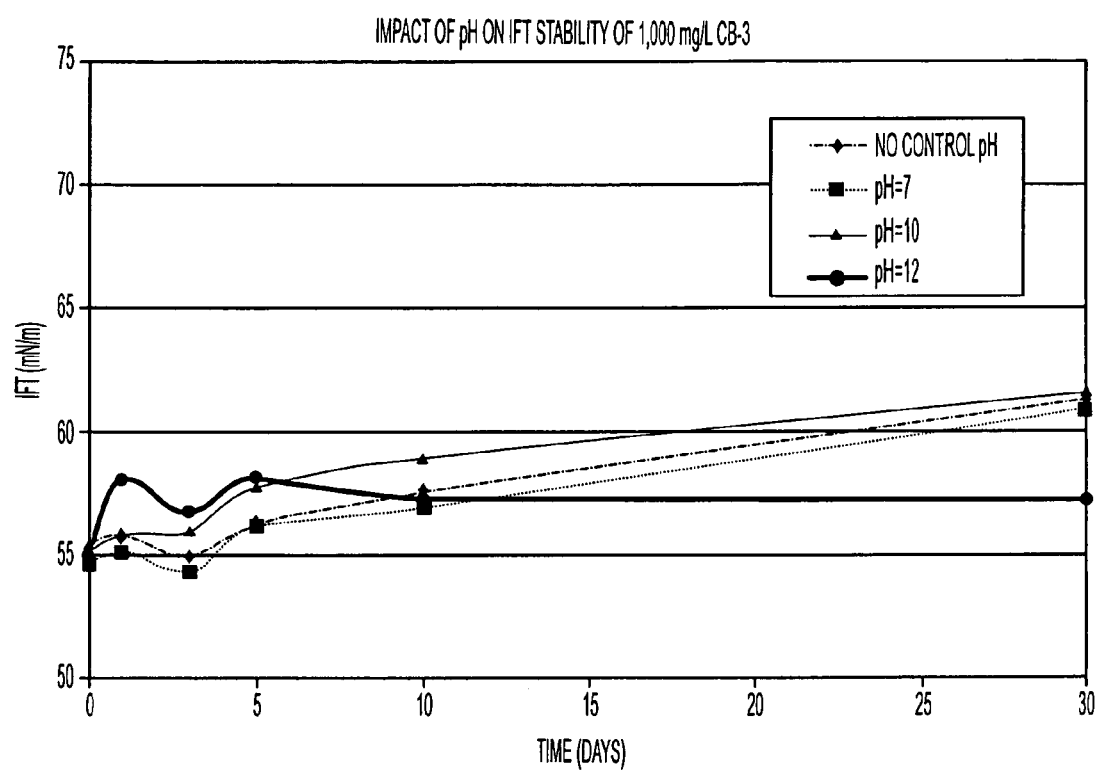
FIG. 8 is a graph depicting the interfacial surface tension as a function of time for solutions of Citrus Burst 3 in water at three different pH values.

In the absence of persulfate all mixtures exhibited only minor effects by the pH of the system. For example, in FIG. 8 the effects of pH on the IFT stability demonstrates that as the pH increased from 7 to 12, there was an increase in the IFT stability over a 30 day period. The maximum decrease of IFT was less than 15 percent over a 30 day period. All other cosolvent, surfactant or cosolvent-surfactant mixtures exhibited similar behavior.

Figure 9:
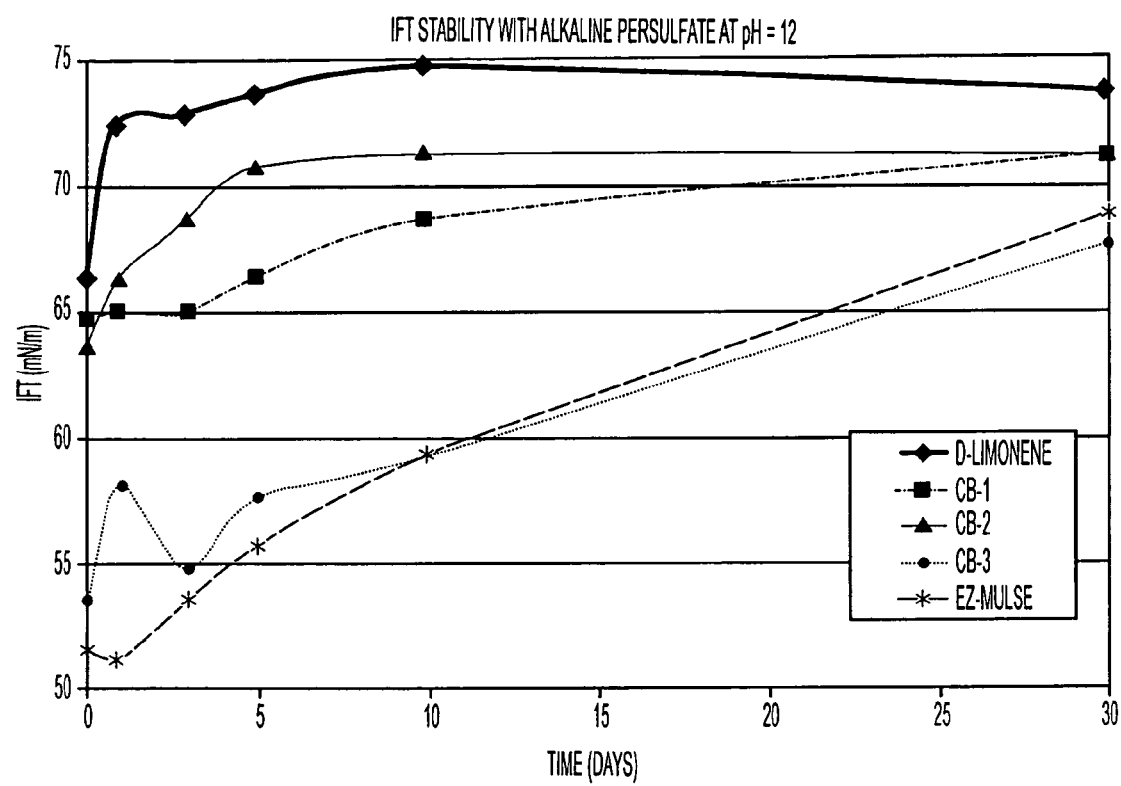
FIG. 9 is a graph depicting the interfacial surface tension as a function of time at a pH of 12 for solutions of several different cosolvents and surfactants (d-limonene, Citrus Burst 1 (CB-1), Citrus Burst 2 (CB-2), Citrus Burst 3 (CB-3), and EZ-Mulse) in water.

The same experiments were repeated with 25 g/L of sodium persulfate added to evaluate the impacts of alkaline persulfate. For example, the effect of alkaline persulfate on IFT stability can be seen in FIG. 9, where the experimental conditions were as follows; pH=12, with 1,000 mg/L of the individual cosolvent, surfactant or cosolvent-surfactant mixtures and initial sodium persulfate concentrations of 25 g/L. The initial IFT varied depending on the specific cosolvent, surfactant or cosolvent-surfactant mixture. The overall IFT values using Citrus Burst-3 and EZ-Mulse were lower than the other mixtures and remained lower for the duration of the test. After 30 days of exposure to persulfate the IFT values associated with Citrus Burst-3 and EZ-Mulse remained below background values. Test results at pH values of 7 and 10 exhibited nearly identical IFT stability responses as did the pH=12 tests. This importantly illustrate that alkaline persulfate (pH>10) exhibits no significantly greatly change in IFT stability that persulfate at neutral pH.

Figure 10:
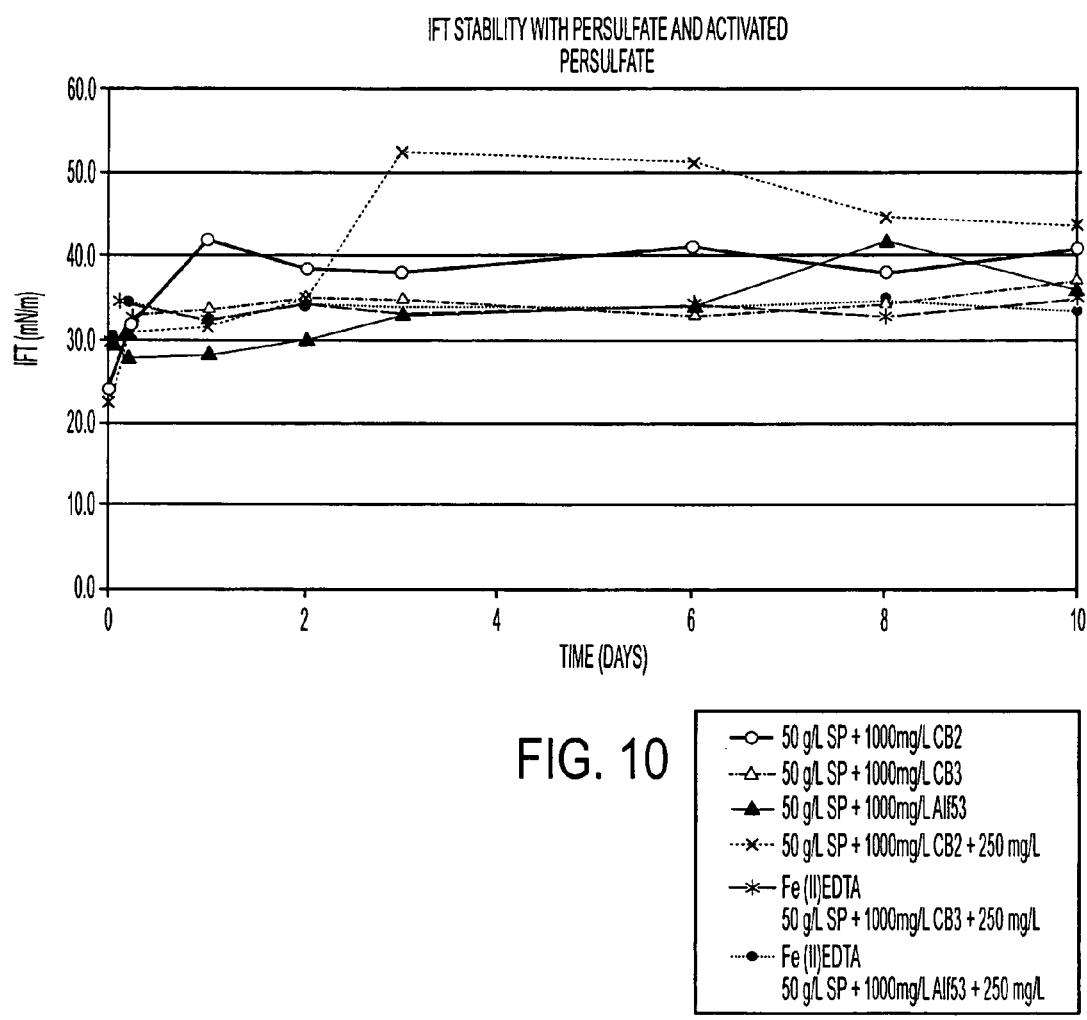
FIG. 10 is a graph depicting the interfacial surface tension as a function of time for solutions of three different surfactants (Citrus Burst 2 (CB2), Citrus Burst 3 (CB3), and Alfoterra 53 (Alf53)) and sodium persulfate in water, both with Fe(II)EDTA activator and without activator.
Figure 11:
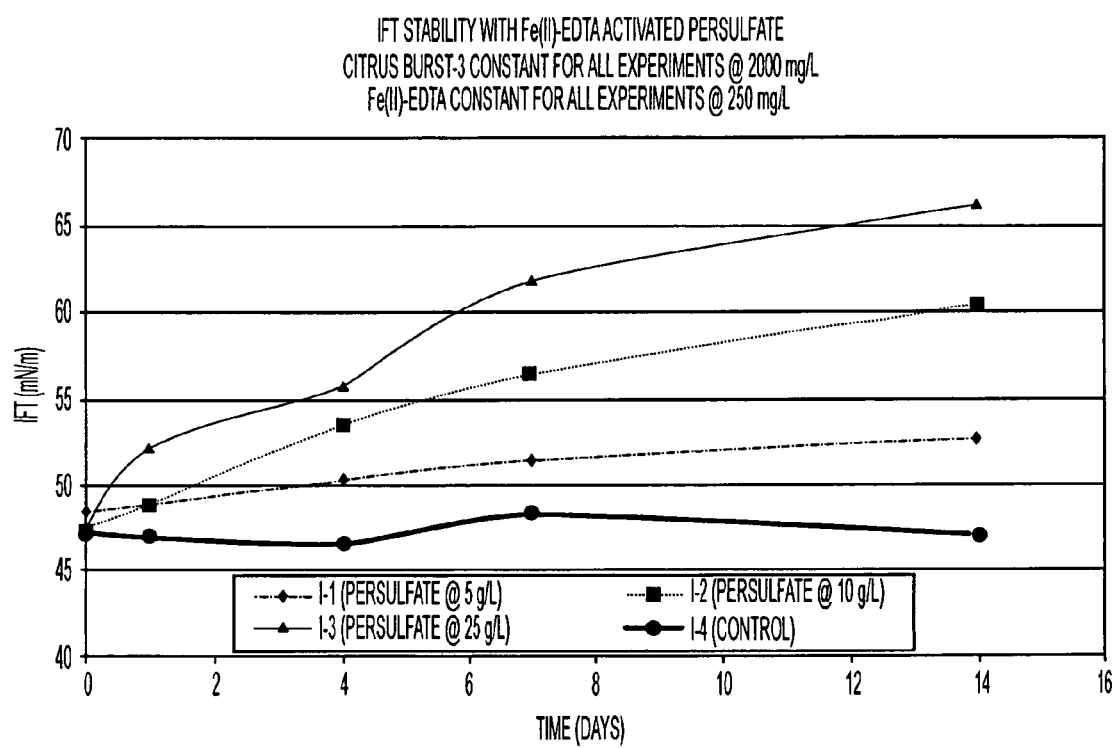
FIG. 11 is a graph depicting the interfacial surface tension as a function of time for solutions of Citrus Burst 3 and Fe(II)-EDTA in water with various concentrations of sodium persulfate.

Similarly, experiments were conducted comparing IFT stability of Citrus Burst 2, Citrus Burst-3 and the surfactant Alfoterra 53 with sodium persulfate alone at 50 g/L and sodium persulfate at 50 g/L with 250 mg/L as Fe of Fe(II)-EDTA. These experiments were run for a 10 day period. In FIG. 10, it can be seen that the IFT initial increased with all systems tested, then generally stability after this initial period. All systems had a greater increase in IFT when the persulfate was activated with Fe(II)-EDTA, with the exception of Citrus Burst-3, which had only a minor changes in IFT stability. Additional experiments were conducted on the IFT stability of Citrus Burst-3 at a concentration of 2,000 mg/L using Fe(II)-EDTA activated persulfate. In this example, the initial Fe(II)-EDTA activator concentration was fixed at 250 mg/L as Fe and the sodium persulfate concentration was varied from 0 g/L to 25 g/L. Increasing the concentration of sodium persulfate, resulted in increases in the IFT over the 14 day test period as shown in FIG. 11. However, the IFT values remained at or below 60 mN/m with the 5 g/L and 10 g/L sodium persulfate concentrations. At the 25 g/L sodium persulfate concentration, the IFT value was measured at 66.2 mN/m after the 14 day test period.

Figure 12:
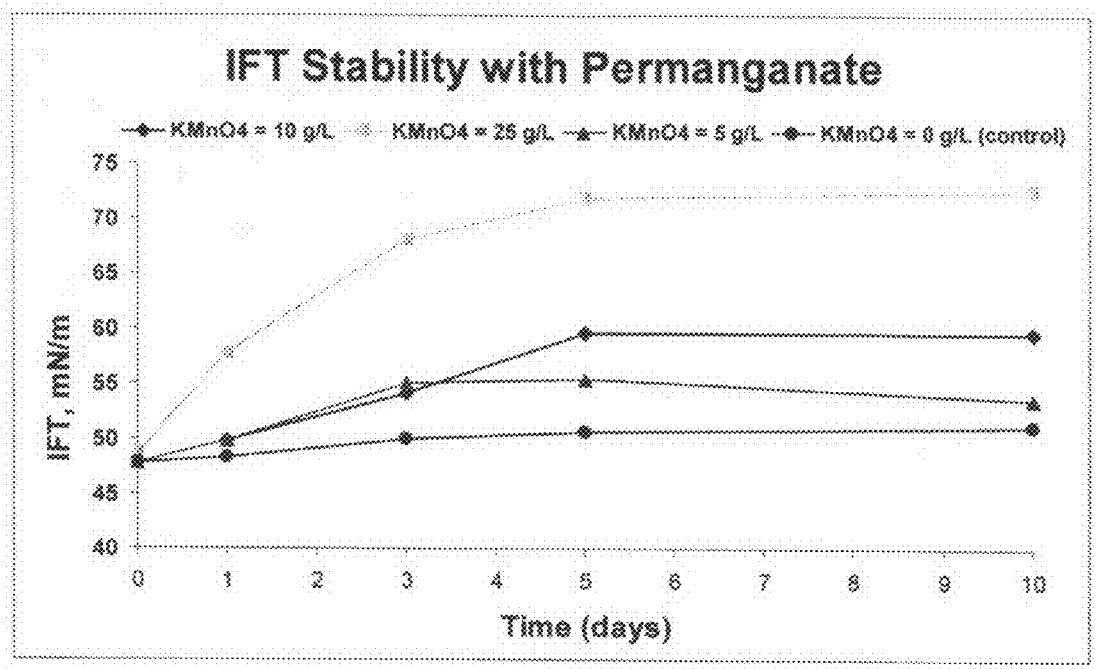
FIG. 12 is a graph depicting the interfacial surface tension as a function of time for solutions with various concentrations of potassium permanganate in water.

Experiments were conducted on the effects of permanganate on the stability of IFT in systems with 2,000 mg/L Citrus Burst-3 with varying concentrations of permanganate. Results from these experiments in FIG. 12 indicate that permanganate concentrations of 5 g/L and 10 g/L affected the IFT of these systems, but the IFT values remained below background conditions. When the permanganate concentration was increased to 25 g/L, the IFT values increased to background conditions after 5 days.

Figure 13:
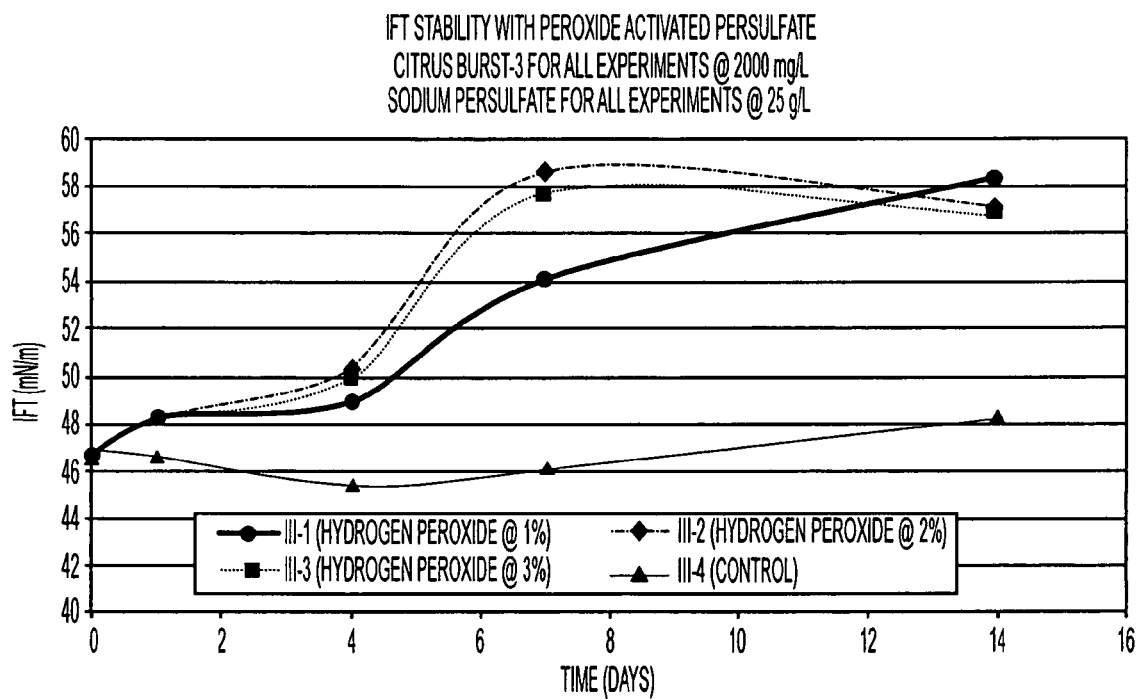
FIG. 13 is a graph depicting the interfacial surface tension as a function of time for solutions of Citrus Burst 3 and sodium persulfate in water with various concentrations of hydrogen peroxide.

Similarly, experiments were conducted on the effects of hydrogen peroxide activated persulfate with increasing concentration of hydrogen peroxide at 0 percent, 1 percent, 2 percent and 3 percent hydrogen peroxide at sodium persulfate concentrations at 25 g/L and Citrus Burst-3 concentrations at 2,000 mg/L. In FIG. 13, it can be seen that there are effects of hydrogen peroxide on IFT values, however, all IFT values remain below 60 mN/m. Increasing the hydrogen peroxide concentration above 2 percent had no significant impact of IFT values.

One skilled in the art can readily learn that exposing various specific cosolvents, surfactants or cosolvent-surfactant mixtures to various oxidant and oxidant-activator systems can be used as a screening and design method for the optimal development of surfactant and cosolvent-surfactant systems for specific and oxidant-activator systems. Using the experimental method described above for specific NAPL or sorbed phase contaminants and various specific cosolvents, surfactants or cosolvent-surfactant mixtures to various oxidant and oxidant-activator systems will lead to customized and optimized formulations of the S-ISCO process.

EXAMPLE

Treatability Test for Soil Decontamination

An aspect of the control than can be achieved by use of an embodiment of the invention for site remediation is direction of oxidant to a target region of contaminant. As discussed above, the density of the injected solution can be modified, so that the oxidant reaches and remains at the level in the subsurface of the target region of contaminant. Considering of factors such as subsurface porosity and groundwater flow, the location of wells for injecting solution containing oxidant can be selected so that oxidant flows to the target region of contaminant.

In an embodiment, the consumption of an oxidant is further controlled by including an antioxidant in the injected solution. For example, an antioxidant can be used to delay the reaction of an oxidant. Such control may prove important when, for example, the injected oxidant must flow through a region of organic matter which is not a contaminant and with which the oxidant should not react. Avoiding oxidizing this non-contaminant organic matter may be important to maximize the efficiency of use of the oxidant to eliminate the contaminant. That is, if the oxidant does not react with non-contaminant organic matter, then more oxidant remains for reaction with the contaminant. Furthermore, avoiding oxidizing non-contaminant organic matter may be important in its own right. For example, topsoil or compost may be desirable organic matter in or on soil that should be retained. The antioxidants used may be natural compounds or derivatives of natural compounds. By using such natural antioxidants, their isomers, and/or their derivatives, the impact on the environment by introduction of antioxidant chemicals is expected to be minimized. For example, natural processes in the environment may degrade and eliminate natural antioxidants, so that they do not then burden the environment. The use of natural antioxidants is consistent with the approach of using biodegradable surfactants, cosolvents, and solvents. An example of a natural antioxidant is a flavonoid. Examples of flavonoids are quercetin, glabridin, red clover, Isoflavin Beta (a mixture of isoflavones available from Campinas of Sao Paulo, Brazil). Other examples of natural antioxidants that can be used as antioxidants in the present method of soil remediation include beta carotene, ascorbic acid (vitamin C), and tocopherol (vitamin E) and their isomers and derivatives. Non-naturally occurring antioxidants, such as beta hydroxy toluene (BHT) and beta hydroxy anisole (BHA) could also be used as antioxidants in the present method of soil remediation.

Former Manufactured Gas Plant (MGP) Laboratory Treatability Study Example

Bench-scale tests are used to evaluate the efficiency of dissolving and oxidizing Former Manufactured Gas Plant (MGP) site contaminants including polycyclic aromatic hydrocarbons (PAHs), total petroleum hydrocarbons (TPH), and volatile organic compounds (VOCs) in site soils and groundwater matrices with several selected chemical oxidation processes: 1) activated persulfate oxidation; 2) persulfate-hydrogen peroxide dual oxidant system; and 3) cosolvent-surfactant activated persulfate. All of the selected oxidation processes generate highly reactive free radicals in the systems and have a great capability of degrading the targeted contaminants of concern (COCs) at the site. Ferrous iron complexed with chelating agents including ethylene diamine tetra acetate (EDTA) and citric acid are used as the compounds to activate persulfate necessary to enhance oxidation strength by increasing the formation of free radicals. The dual oxidant persulfate-hydrogen peroxide system may promote a multi-radical attack, but requires low concentrations of hydrogen peroxide to minimize gas phase formation. Biodegradable cosolvent-surfactants are additionally investigated to determine their effect on increasing the rate of remediation achievable at the site.

To determine which process is more economically and technically effective in the remediation of the contaminated soils at the site, several experimental systems are evaluated and are discussed in the following sections.

Feasibility Test

Catalyzed Persulfate Oxidation

The scope of work includes several laboratory tasks listed below.
Task IA: Preparation and characterization of a homogenized contaminated site soil uncontaminated groundwater, contaminated groundwater and NAPL.
Task I: Determination of the oxidant (persulfate) demand of a homogenized contaminated site soil.
Task II: Batch and column cosolvent-surfactant screening for NAPL, contaminated soil and oxidant interactions.
Task III: Investigation of the effectiveness of degrading target PAHs, TPH, and VOCs and production of by-products using several activated persulfate systems included chelate iron activation, a dual oxidant persulfate hydrogen peroxide system, a cosolvent-surfactant activated persulfate system in aqueous and soil slurry systems.
Task IV: Evaluation of the treatment effectiveness MGP contaminated soils from intact soil cores obtained from the site flushing the soils with surfactants and cosolvent-surfactant mixtures, activated persulfate, a dual oxidant persulfate hydrogen peroxide system, and a cosolvent-surfactant activated persulfate system.
Task V: Investigation of ozone treatment of site COCs in groundwater and soils and ozone interactions with site soils.

Several tasks produce information regarding the reactivity and persistence of persulfate with the site soils, the reduction of COC concentrations in soils and groundwater by several activation methods, production of byproducts from activated persulfate oxidations, effects of cosolvent-surfactants on system performance and design parameters for both Pilot- and Full-Scale application of activated persulfate at the Site. The method of examining several persulfate activation methods, a dual oxidant system and biodegradable cosolvent-surfactant flushing of residual tars and oils represents a significantly more aggressive and focused treatability study than previously used with former In Situ Chemical Oxidation (ISCO) approaches.

Set A Task I

Determination of the Persulfate Soil Oxidant Demand (SOD)

The batch test persulfate SOD is determined on the homogenized contaminated soil. These data are used for the determination of oxidant concentrations and estimates of chemicals needed for the subsequent treatability tests. The batch test persulfate SOD is run using persulfate alone to identify the reactivity of the soil matrix and site groundwater with the oxidant.

The initial concentrations of $Na_2S_2O_8$ vary as indicated in Table 2. A total of four persulfate doses are used to determine the SOD. Control tests use deionized (DI) water in place of $Na_2S_2O_8$. Contaminated site groundwater is also screened to determine the oxidant demand of the matrix. After preparation, amber glass bottles are capped and the contents slowly mixed on a shaker table. Samples for pH, ORP, residual persulfate concentration are collected from the bottles and analyzed just prior to the persulfate addition and then on days 1, 10, and 20.

Figure 14:
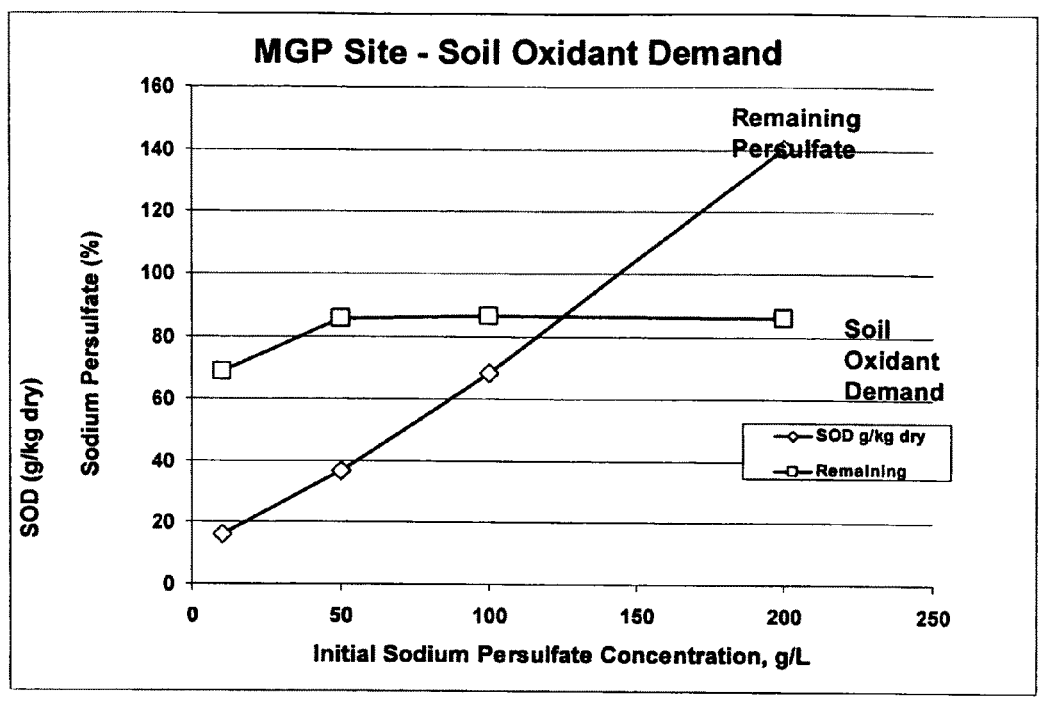
FIG. 14 is a graph depicting the results of soil oxidant demand (SOD) testing.

The oxidant demand is calculated based on the persulfate concentrations, measured after 10 days using equation 14, $$SOD = V(C_0 - C_s)/m_{soil} \qquad (Eq. 14)$$

where V=total volume of persulfate solution in the vials, $C_0$=initial persulfate concentration, $C_s$=persulfate concentration at the relatively steady state or the reaction period of $10_{th}$ day, and $m_{soil}$=the mass of dry soil in reactors. A relationship is developed relating the persulfate oxidant demand and initial concentration of persulfate used in the tests. Results of the SOD tests for the tested MGP site soils are found in FIG. 14.

Task II Batch and Column Cosolvent-Surfactant Screening

The cosolvent proposed for use in the treatability studies is d-limonene. This cosolvent is a 100 percent biodegradable, naturally occurring chemical and is a natural product derived from citrus crops. d-Limonene is not miscible with water and requires a surfactant to form an emulsion creating its apparent solubility in water. d-Limonene is available in a food grade form and is also used in many household cleaning chemicals. When mixed with surfactants, the emulsion has the ability to dissolve and displace oils and tars.

Figure 15:
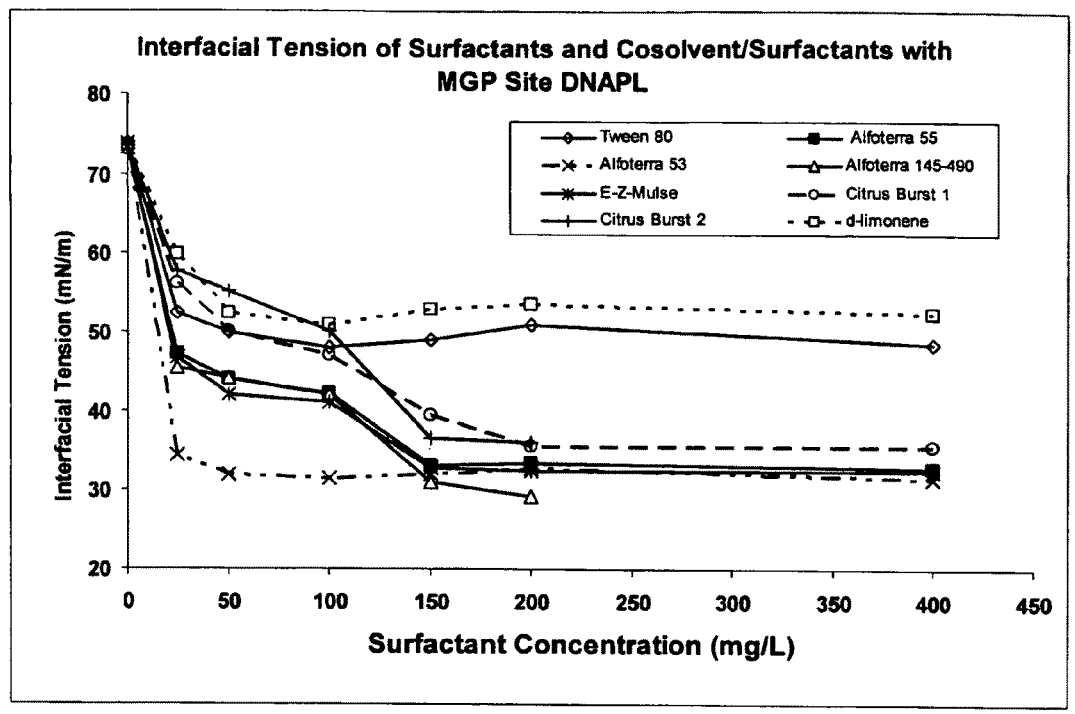
FIG. 15 is a graph depicting interfacial tension of a DNAPL-water mixture as a function of surfactant concentration for various surfactants.

As part of Task II, several d-limonene and surfactant blends are screened for their ability to solubilize NAPLs and tars from an MGP Site. Several test surfactants and cosolvent-surfactant blends are mixed with NAPL phase and site groundwater. The phase behavior is monitored by the examination of the extent of NAPL solubilization, emulsion formation, critical micelle formation, and interfacial tension. FIG. 15 illustrates the use of this methodology of adding successively increasing concentrations of the surfactants and cosolvent-surfactant blends to the MGP DNAPL and water mixtures and recording interfacial tension (IFT) measurements. It is evident to those skilled in the art that this procedures can be used to measure the critical micelle concentration if the system was solely in the aqueous phase. A log-normal plot can also be used to interpret the critical micelle concentration. In this case MGP DNAPL is present causing the CMC to be greater than in a pure aqueous system alone.

Figure 16:
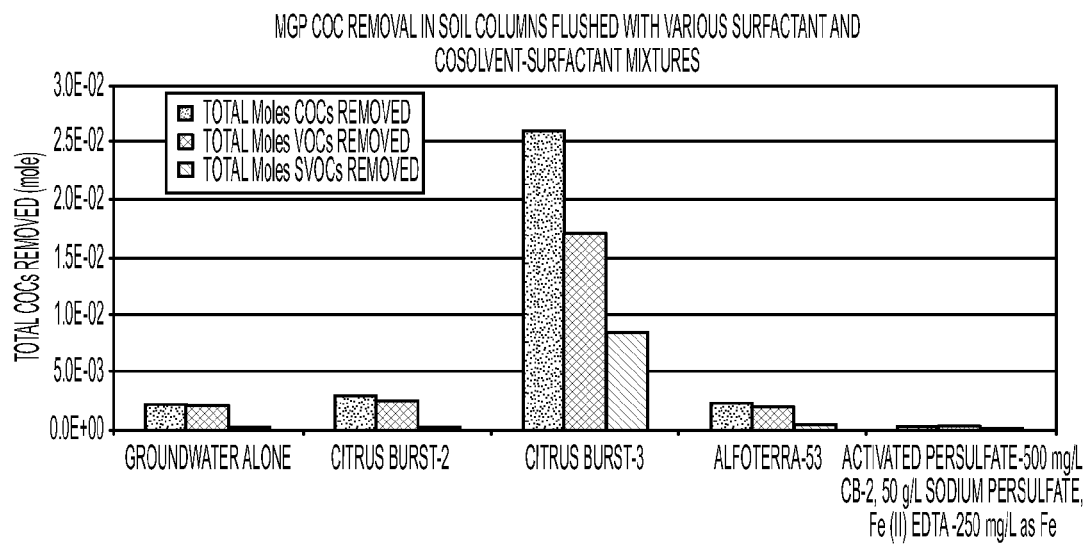
FIG. 16 is a bar graph depicting the results of column tests performed under various conditions.

Soil Column tests were run using homogeneous soil from an MGP site and spiking the soil with DNAPL from the MGP site to approximate residual saturation with respect to MGP DNAPL Various surfactants and cosolvent-surfactant mixtures were flushed through replicate columns and various process parameter were measured in the column effluent, such as turbidity, oxidation-reduction potential, pH, electrolytic conductivity, temperature, dissolved oxygen. Additionally, VOCs and SVOCs were periodically monitored in the column effluent using USEPA Methods 8260 and 8270. Results from the column tests are shown in FIG. 16 in which the total effluent VOCs and SVOCs (in molar units) for each of the column run conditions, including a run in which Fe(II)-EDTA activated persulfate was flushed through a replicate spiked soil column, It is evident that Citrus Burst-3 exhibited the greatest potential for solubilizing the MGP DNAPL compounds in comparison to the other tested surfactants and cosolvent-surfactant mixtures. The simultaneous addition of Fe(II)-EDTA activated persulfate to a column being flushed with Citrus-Burst-2. The addition of the activated persulfate reduced total effluent COCs flushed from the column by 87 percent.

Task III Batch Aqueous and Soil Slurry Activated Persulfate

Experiments in this task relate the reduction of MGP COC concentrations in both aqueous and soil slurry batch systems. The initial persulfate concentration may be varied, based on the persulfate SOD tests, which are run first. Because the stability of the Fe(II)-chelates in the presence of persulfate determines the extent of reaction (i.e., zone of reaction influence at full-scale) in the subsurface at the site, it is important the optimal chelate be used. Prior work has indicated the stability of EDTA is greater than that of citric acid in the neutral pH range (12). During all of the proposed tests as part of Task II, persulfate and the metal chelate concentration are measured to determine the longevity of the chelate complex in the persulfate solution. During the aqueous phase tests, COCs are analyzed at various times. Based on the aqueous phase results, a chelate can be chosen to be used in a soil slurry tests.

Figure 17:
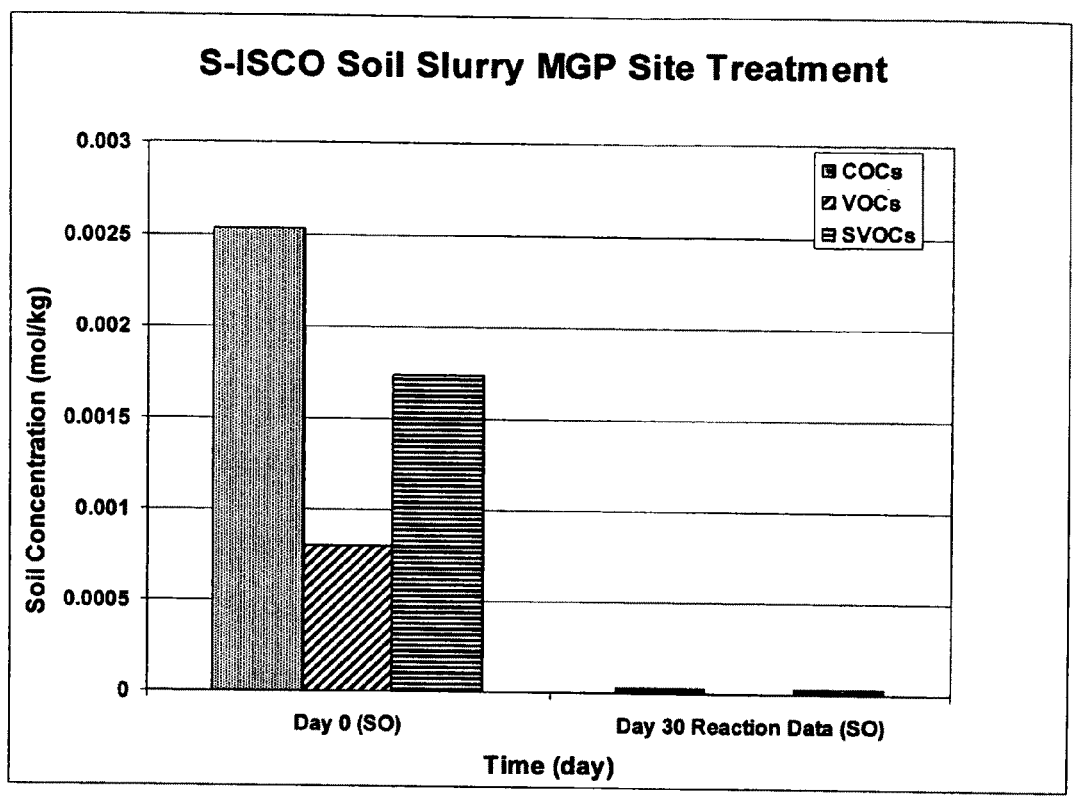
FIG. 17 is a bar graph depicting the results of 30-day soil slurry testing using Fe(II)-EDTA activated persulfate and Citrus Burst-1.

In the soil slurry tests, COCs are measured at Time=0, 1, 5 and 30 days. The chelate used is based on the results of the aqueous phase comparison of EDTA and citric acid The best performing persulfate activation method from the aqueous phase tests is used in these soil slurry tests. Results of the 30-day soil slurry test using Fe(II)-EDTA activated persulfate and Citrus Burst-1 indicate that there was a 98.9 percent removal of total COCs in this soil slurry test as shown I FIG. 17. In comparison to other soil slurry treatments with a dual oxidant hydrogen peroxide-persulfate, Fe(II)-EDTA activated persulfate and Fe(II)-EDTA activated persulfate with Alforterra 53 (S-ISCO process), the greatest removal and efficiency was with the S-ISCO soil slurry test. The efficiency of the S-ISCO process was evaluated with respect to the moles of MGP COCs removed from soil slurry tests per moles of sodium persulfate utilized during the 30 day testing period.

Figure 18:
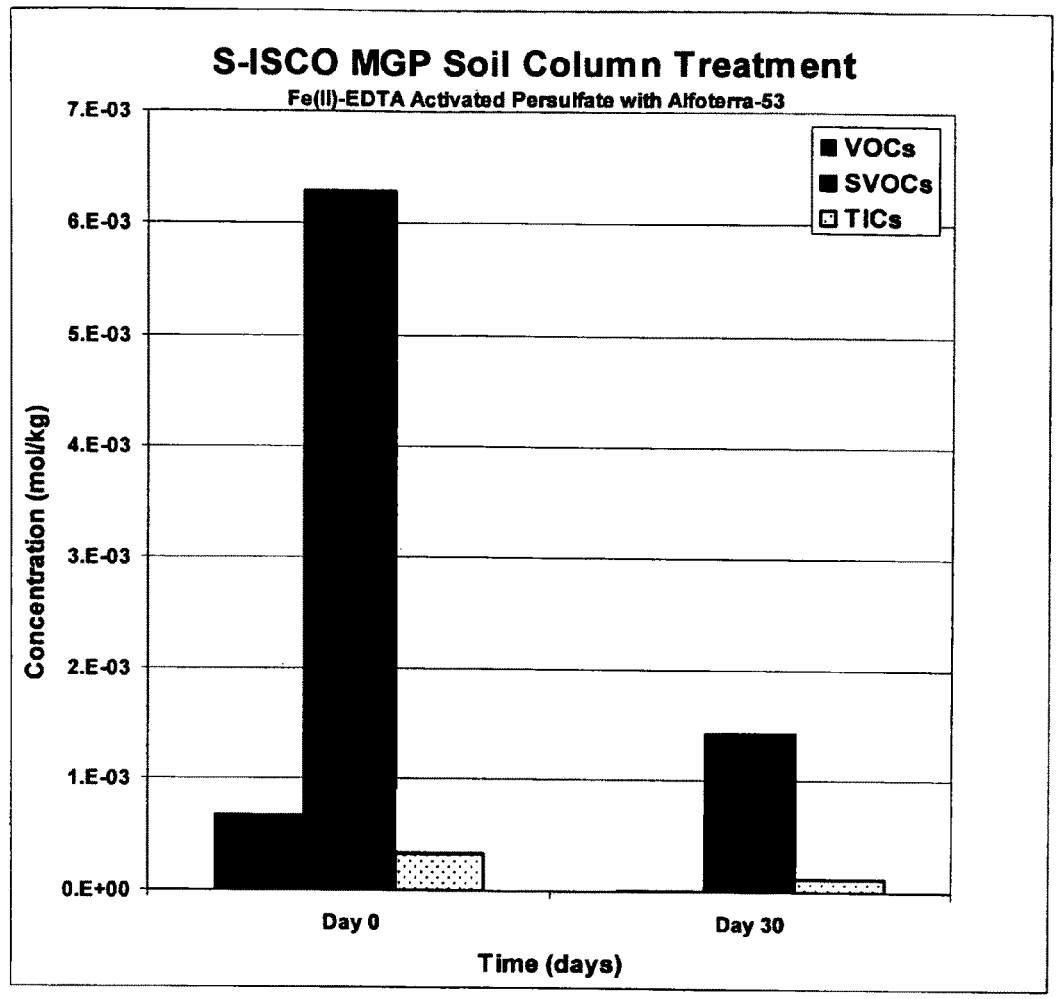
FIG. 18 is a bar graph depicting the results of column testing using Fe(II)-EDTA activated persulfate with Alfoterra-53.
Figure 19:
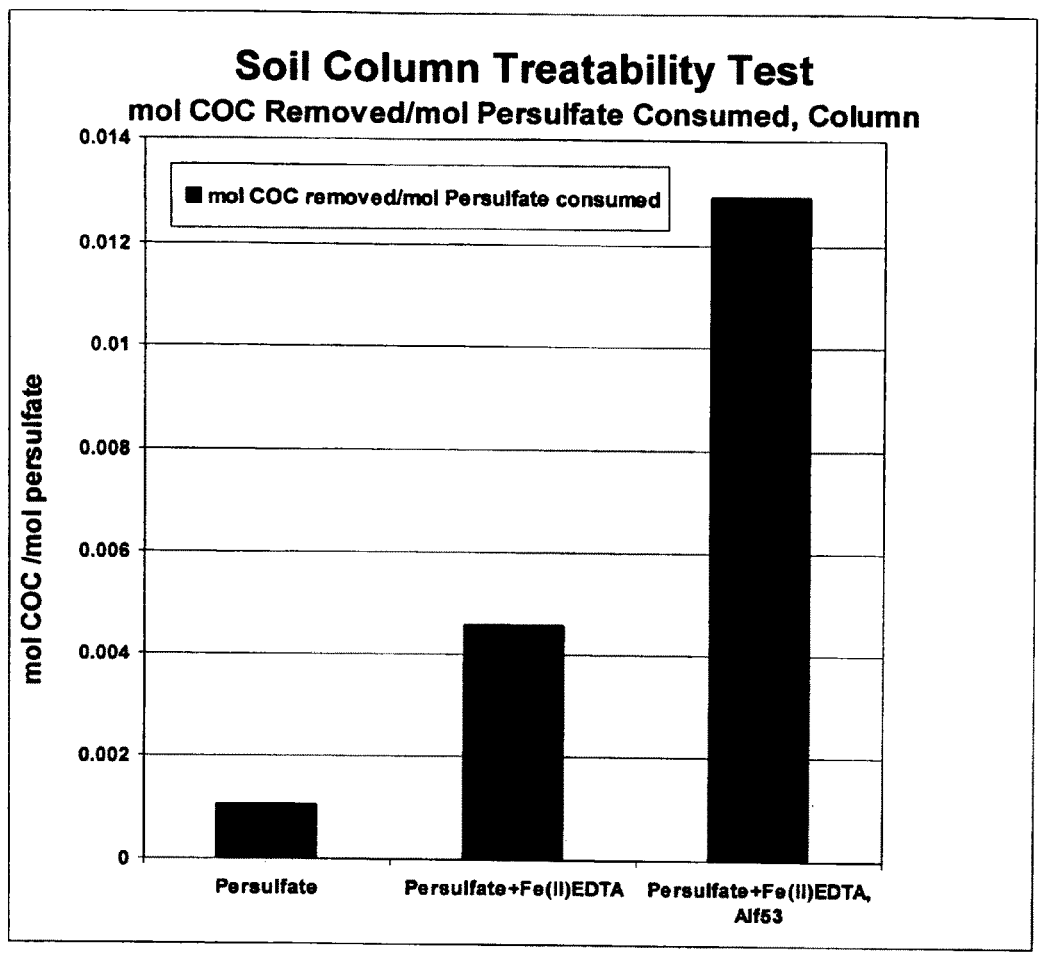
FIG. 19 is a bar graph depicting the results of column testing performed under various conditions.

Simple replicate soil column tests were conducted with homogenized soils. The results of the S-ISCO soil column using Fe(II)-EDTA activated persulfate with Alfoterra-53, in FIG. 18, had the highest removal of MGP VOCs, SVOCs and tentatively identified compounds (TICs) in comparison other soil column tests using Fe(II)-EDTA activated persulfate and persulfate alone. In FIG. 19, the efficiency of the S-ISCO process (Fe(II)-EDTA activated persulfate with Alfoterra-53) is compared to that of persulfate alone, Fe(II)-EDTA activated persulfate in a soil column study. The efficiency was 65 percent greater using the S-ISCO Process with Fe(II)-EDTA activated persulfate and Citrus Burst-2.

EXAMPLE

Former Manufactured Gas Plant (MGP) Site Pilot Test

Overview of Experimental Design

A Pilot Test was performed by remediating a portion of a site of a former manufactured gas plant (MGP). The site was contaminated with hydrocarbons.

The Pilot Test area included twelve injection wells: six wells for the combined injection of the Fe(II)-EDTA activator and the Citrus Burst-3 cosolvent-surfactant and six wells for the injection of the sodium persulfate oxidant. The injection wells (IW) were installed about 3 feet from each other in two rows perpendicular to the direction of groundwater flow. The outlet of the injection wells was from 12 to 15 feet below ground surface. The Pilot Test treatment area extended approximately 60 feet downgradient from the injection wells and 10 feet to either side of the injection wells (i.e., the Pilot Test Area was approximately 40 feet wide and 60 feet long). The Pilot Test area included 27 monitoring wells (Pilot Test Monitoring Wells: PTMW) installed for monitoring of system performance. Monitoring of system performance additionally took place upgradient and downgradient of the Pilot Test area using 16 existing groundwater monitoring wells. Monitoring tests performed in an on-site laboratory included measurements of temperature, turbidity, IFT (interfacial tension), dissolved iron concentration, Fe(II)-EDTA, pH, specific conductivity, dissolved oxygen, persulfate concentration, and ORP (oxidation-reduction potential). Troll® 9500 devices measured pH, specific conductivity, dissolved oxygen, temperature, turbidity, and ORP.

Performance monitoring was conducted at monitoring well locations upgradient, downgradient and side-gradient of the injection points to determine the distribution of the injected surfactant enhanced activated persulfate in the subsurface and the movement of the enhanced activated persulfate front. Performance monitoring was initiated three days prior to start up of the S-ISCO™ injection system and continued throughout the testing and for 31 days after injection ceased. The objective of monitoring after the injection was to gain an initial understanding of the persistence of the S-ISCO™ chemicals once injection was terminated and also effectiveness of the S-ISCO™ application at reducing the groundwater flux migrating from the Pilot Test area.

A total of 72,674 kg of persulfate, 3314 kg of Citrus Burst-3 (cosolvent-surfactant) and 475 kg of Fe(II)-EDTA were injected into the subsurface during the Pilot Test. Groundwater monitoring was performed during the Pilot Test to track the distributions of injected reagents. The performance monitoring results indicated that surfactant and oxidant mixtures reached most of the Pilot Test Area. This Pilot Test successfully demonstrated that specific MGP contaminated subsurface strata, whether they occur at shallow, deep or intermediate depths, can be targeted and treated using controlled solution densities and selected injection flow rates. The monitoring data also demonstrated that S-ISCO® mixtures traveled together (coeluted) to targeted soil zones and contaminants were solubilized and destroyed.

Pre- and post-Pilot Test subsurface soil samples were collected within the Pilot Test Area to evaluate the effectiveness of S-ISCO® for the destruction of COCs in soil. The COC mass removal in soil was calculated for soils contacted by persulfate (the oxidant) for each depth interval.

Groundwater samples were collected before, during and after the Pilot Test to evaluate the changes in COC mass flux in groundwater during the Pilot Test. The mass flux was calculated at four cross-section locations throughout the Pilot Test area.

Pilot Test Schedule

Injection of solutions and monitoring of contaminants were conducted as follows. The Pilot Test began on Apr. 11, 2006 with the Pre-Test Monitoring phase which lasted through Apr. 14, 2006. During this time all 43 monitoring wells were sampled three times each for performance monitoring parameters. The fourth day of this phase was used to sample wells that were not sampled on April 11.

On Apr. 17, 2006, the Start-up Phase began with injection of a 25 g/L persulfate/water solution alone at 10 gpm (37.85 [liters per minute] L/min.). A cumulative persulfate mass of 2605.9 kg was injected during the Start-up Phase.

The Phase I Injection of Fe(II)-EDTA, persulfate and Citrus Burst-3 started at around 1500 hours on Apr. 19, 2006. Fe-EDTA injection ceased on May 2, 2006 at approximately 0915 hours. Persulfate and Citrus Burst-3 were injected until the completion of this phase at approximately 1430 hours on May 3, 2006. The Fe(II)-EDTA chemical stream finished a day earlier than the other two chemical streams due to flow control issues with the three injection steams. The rates of injection were approximately as follows: a total flow of 10 gpm (37.85 L/min.) consisting of persulfate at 50 g/L and 5 gpm (18.92 L/min.), Citrus-Burst-3 at 4 g/L and 2.5 gpm (9.46 L/min.), and Fe(II)-EDTA at 1 g/L and 2.5 gpm (9.46 L/min.). The total quantities of chemicals injected during Phase I were as follows: 14,303.5 kg of persulfate; 714.1 kg of VeruSOL; and 141 kg of Fe(II)EDTA.

The Phase II Monitoring phase began on May 3, 2006 and was completed at approximately 1700 hours on May 10, 2006.

The Phase III-A Injection phase began on May 10, 2006 and was completed on May 18, 2006. The total injection flow rate was 10 gpm (37.85 L/min.). The concentrations as injected in the mixed, 10 gpm (37.85 L/min) total flow steam were 50 g/L persulfate, 250 mg/L Fe(II)-EDTA and 2000 mg/L Citrus Burst-3. The total quantities of chemicals injected during Phase III-A were as follows: 18,375.1 kg of persulfate; 846.3 kg of VeruSOL; and 123 kg of Fe(II)EDTA.

Interim Phase III Monitoring ran from May 19, 2006 to May 25, 2006. No monitoring took place from May 26 through May 29, 2006.

The Phase III-B Injection phase began on May 30, 2006 and ran continuously until Jun. 6, 2006, when Fe(II)-EDTA injection was completed. Persulfate and Citrus Burst-3 injections ran until Jun. 7, 2006. The total injection flow rate was 20 gpm (75.7 L/min.). The concentrations as injected in the mixed, total flow steam were 50 g/L persulfate, 250 mg/L Fe(II)-EDTA and 2000 mg/L Citrus Burst-3. The total quantities of chemicals injected during Phase III-B were as follows: 37,389.7 kg of persulfate; 1,753.7 kg of VeruSOL; and 211 kg of Fe(II)EDTA.

The Phase IV Monitoring phase began on Jun. 8, 2006 and was completed on Jul. 7, 2006. A summary of each injection phase, including the duration and quantities and concentrations of chemical injected is presented in Table 4.

TABLE 4

Process Monitoring Summary Table

| Test Conditions | | Persulfate | | Fe(II)-EDTA | | Citrus Burst-3 | | Liquid |
|---|---|---|---|---|---|---|---|---|
| | | Average | Total | Average | Total | Estimated | Total | Total |
| Phase | Duration (days) | Conc. (g/L) | Mass (kg) | Conc. (g/L) | Mass (kg) | Conc. (g/L) | Mass (kg) | Volume (Gallons) |
| Start-up | 2 | 26.1 | 2606 | | | | | 26,250 |
| Phase I | 13.98 | 40.3 | 14,303 | 0.875 | 141 | 4 | 714 | 181,000 |
| Phase III-A | 7.6 | 87.7 | 18,375 | 1.158 | 123 | 8 | 846 | 112,400 |
| Phase III-B | 8.3 | 91.9 | 37,390 | 1.043 | 211 | 8 | 1,754 | 221,400 |
| TOTAL | 31.9 | | 72,674 | | 475 | | 3,314 | 541,050 |

Sampling Schedule

Data to evaluate the reduction in contaminants were obtained from measurements performed on soil samples taken before and after the S-ISCO® Pilot Test and groundwater samples taken before, during, and after the S-ISCO® Pilot Test.

The pre-Pilot Test soil samples were collected from Dec. 27, 2005 through Feb. 10, 2006. A total of 54 pre-Pilot Test soil samples were collected from the screened intervals at each of the monitoring well locations. The post-Pilot Test soil samples were collected from Jul. 7, 2006 to Jul. 12, 2006 at the end of the Phase IV post-injection monitoring period. A total of 53 post-Pilot-Test subsurface soil samples were collected. The post-Pilot-Test subsurface soil samples were collected at the same locations and depth intervals as the pre-Pilot-Test subsurface soil samples (except for one sample, which was not obtained).

Five rounds of groundwater samples were collected. Round 1 was collected from Mar. 21, 2006 to Mar. 28, 2006, prior to initiation of the Pilot Test; Round 2 was collected from May 1, 2006 to May 2, 2006, during the end of the Phase I Injection Period; Round 3 was collected from May 8, 2006 to May 9, 2006, during the end of the Phase II Post-Injection Monitoring Period; Round 4 was collected from Jun. 5, 2006 to Jun. 7, 2006, during the end of the Phase III Injection Period; and Round 5 was collected from Jul. 6, 2006 to Jul. 7, 2006, during the end of the Phase IV Post-Injection Monitoring Period. The groundwater samples were collected from each of the 27 Pilot Test groundwater monitoring wells. Several samples were also collected from upgradient and downgradient monitoring wells.

Results of Pilot Test

Centerline cross-sectional contours of sodium persulfate concentration and electrolytic conductivity, derived from the sampling data, are presented in FIGS. 20 and 21 for the end of the Phase II monitoring period, and for the end of the Phase IIIB injection period, respectively. Sodium persulfate contours are shown by the light gray curves, the units are mg/L. Conductivity contours are shown by the dark gray curves, the units are µS/cm. It is evident that increasing the persulfate concentration from that of the start-up and Phase I injections to that of the Phase III injections caused an increase in solution density and resulted in a net downward density driven flux when comparing the results in FIGS. 1 and 2. The subsurface in the area of the Pilot Test consists of medium to fine sands. Generally, the hydraulic conductivity in the subsurface to a depth of approximately 50 feet bgs is greater than in the fine sands located from 50 feet to a lower permeability formation at approximately 70 feet bgs. The electrolytic conductivity contours seen in Figure AA reveal greater horizontal transport in the 15 feet bgs depth to approximately 50 feet bgs, corresponding to the known differences in hydraulic conductivity at this site. The distribution of electrolytic conductivity as shown in FIG. 2, clearly indicates a much deeper influence of the injected reagents than that in FIG. 1, exemplifying the density driven component of the mostly conservative salts associated with the injected reagents. The sodium persulfate concentration distributions additionally exemplify the density driven transport of the oxidant species. Distributions of Fe(II)-EDTA and Interfacial Tension (IFT) measurements follow similar trends as do the electrolytic conductivity and sodium persulfate data.

The reduction of mass of several classes of contaminants at the depth intervals sampled is presented in Table 5.

TABLE 5

| ANALYTE | PRE TREATMENT Totals | POST TREATMENT Totals | Δ | Percent Removal |
|---|---|---|---|---|
| TOTAL BTEX Kg | 6 Kg | 81 Kg | −75 | −1357% |
| Total Polycyclic Aromatic Hydrocarbons Kg | 1870 Kg | 954 Kg | 916 | 49% |
| TICS (Kg) | 10 Kg | 7 Kg | 3 | 28% |
| Total Analytical (Kg) | 1886 Kg | 1044 Kg | 822 | 45% |
| Naphthalenes (Kg) | 616 Kg | 238 Kg | 379 | 61% |
| Medium Weight Petroleum Hydrocarbons | 7155 Kg | 3519 Kg | 3636 | 51% |

The calculated masses of contaminants were based on the analytical data obtained from pre-Pilot Test soil samples and from post-Pilot Test soil samples. The mass analysis results indicate an overall decrease in total PAHs of approximately 49% or 954 kg taking into account all the depth intervals. Napthalene compounds exhibited a 61 percent reduction in mass, while the Total VOCs and SVOCs had a 45 percent reduction in mass. The largest reduction in mass was for Medium Weight Petroleum Hydrocarbons (MPH) which decreased by 3,519 kg or 51 percent. Dosing of the injected reagents was estimated on approximately ⅓ of the mass of contaminants present in the subsurface that was subsequently estimated during the baseline sample of 54 soil samples.

The results of the depth interval analysis indicate that there was an increase in the quantity of benzene, toluene, ethyl benzene, and xylene (BTEX) mass in the 15 to 20 foot, 20 to 25 foot, 45 to 50 foot, 50 to 55 foot and 65 to 70 foot interval. BTEX mass decreased in the 30 to 35 and 35 to 40 foot depth intervals. BTEX constituents were not detected in the pre- or post-Pilot Test samples for the 60 to 65 foot interval. The mass analysis results indicate a total increase of approximately 1,357% or 75.5 kg of BTEX taking into account all the depth interval observed changes in concentrations. It is unlikely that BTEX mass was created during the Pilot Test; therefore, the increase in BTEX may be influenced by heterogeneities in the sampling, variations in the sampling methodology. At any rate, this apparent increase in BTEX mass was far less than the total decrease in mass of PAH, total analytical, and MPH compounds.

Groundwater samples were analyzed for benzene, toluene, ethyl benzene, and xylene (BTEX), polycyclic aromatic hydrocarbon (PAH), total analytical (TA), and medium-weight petroleum hydrocarbons (MPH) for each of the five sampling rounds. The mass flux through four cross-sectional areas approximately normal to the flow of groundwater. Cross-section A-A' was taken across the upgradient edge of the treatment area (located 18 feet down gradient of the injection wells); cross-section B-B' was taken across the center of the treatment area; cross-section (located 33 feet downgradient from the injection wells, C-C' was taken across the downgradient edge of the Pilot Test area (located 63 feet downgradient from the injection wells; and cross-section D-D' (located 83 feet downgradient from the injection wells) about 20 feet downgradient from the Pilot Test area. Thus, groundwater flowed successively through cross-sections A-A', B-B', C-C', and D-D'. The mass flux was calculated according to Eq. (1).

$$\text{Mass Flux (g/day)} = (v) \times (n) \times (A) \times (C) \times (28.312 \text{L/ft}^3) \times (1 \text{g}/1000000 \text{ ug}) \qquad \text{Eq. (1)}$$

In Eq. 1, v is the linear groundwater velocity (ft/day), n is the porosity (assumed equal to 0.3), A is the cross-sectional area (ft$^2$), and C is the average concentration across the cross-sectional area (ug/L).

The width of the cross-sectional area used was based on the approximate width of the treatment area which was set at the distance between well clusters PTMW-3 and PTMW-4 (approximately 40 feet). The mass flux was calculated for the 20 to 70 ft bgs depth interval for each of the cross-section locations for each sampling round. The mass flux calculated for the 20 to 70 ft bgs interval will be used in the evaluation of the destruction of COCs in groundwater. This depth interval was selected for the contaminant of concern (COC) destruction evaluation because the injection wells are screened from 12 to 15 feet bgs.

The average linear groundwater flow velocity used in the flux calculation varied based on the phase of the Pilot Test and the location of the cross-section. During the non-injection phases (Rounds 1, 3 and 5 of groundwater sampling) a baseline linear groundwater velocity of 0.8 ft/day was used in the flux calculations at all cross-section locations. This velocity represents the static condition (excluding influence from injection) at the site and was calculated from site data and from the calibrated groundwater flow model developed for the site and the implementation of the Pilot Test.

The average linear groundwater flow velocities used to calculate flux during the injection phases (Rounds 2 and 4 of groundwater sampling) were calculated from the performance monitoring data based on the time required for the conductivity front to reach the monitoring wells at the specific cross-section locations. The arrival of the electrolytic conductivity front at PTMW-01(10-20) took 2.76 days. Given that this well is located 18-feet downgradient from the injection wells, the calculated seepage velocity was 6.52 ft/day, between the injection wells and the PTMW-01 cluster (cross-section A-A') during the Phase I injection.

The average linear groundwater flow velocity calculated for cross-sections B-B' and C-C' was 2.35 ft/day based on the 14.03 days that it took the conductivity front to reach PMTW-02 (20-30). The groundwater velocity calculated for cross-section D-D' was 2.72 ft/day based on the time of 42.07 days that it took the conductivity front to reach PTMWO7(30-40).

The mass-flux values, for the 20 to 70 ft bgs (below ground surface) depth interval at the four downgradient transects from the injection wells are illustrated in FIG. 22. The baseline groundwater contaminant flux prior to commencement of the pilot test as indicated on FIG. 22 for Total VOCs, Total PAHs and MPH are estimated to be 0.04 kg/day, 0.013 kg/day and 0.026 kg/day, respectively. The groundwater contaminant flux at transect A-A' immediately estimated from samples taken immediately after the last injection round (Injection Phase IIIB) as indicated on Figure EE for Total VOCs, Total PAHs and MPH are estimated to be 2.92 kg/day, 3.22 kg/day, and 22.26 kg/day, respectively. To follow the increased groundwater COC flux from transect A-A' reported above, the groundwater contaminant flux was calculated at transect B-B' 30 days after the termination of S-ISCO injection. The groundwater contaminant flux calculated at Transect B-B', 16 feet downgradient of transect A-A' and 30 days after the maximum flux as indicated on Figure EE for Total VOCs, Total PAHs and MPH are estimated to be 0.023 kg/day, 0.008 kg/day and 0.064 kg/day, respectively. This indicates that the groundwater COC flux return to baseline conditions in only 16 feet of travel distance. Similarly, the groundwater contaminant flux measures at Transect C-C' 30 days after the maximum flux observed at Transect A-A' and located approximately 83 feet downgradient from the injection wells as indicated on FIG. 22 for Total VOCs, Total PAHs and MPH are estimated to be 0.023 kg/day, 0.005 kg/day and 0.026 kg/day, respectively. These results are consistent with the following interpretation. At A-A', the solubilized contaminant has not yet had sufficient time to be oxidized by the activated persulfate, as the local rate of solubilization exceeded the local rate of oxidation. However, as the groundwater continued to migrate downgradient from Transect A-A', there was sufficient time for the overall oxidation rate to exceed the overall solubilization rate. Thus, a very substantial decrease in contaminant flux was observed between the maximum observed flux at transect A-A' and the return to baseline flux conditions or below at Transects C-C' and D-D' 20 days after the maximum flux was observed. Thus, the S-ISCO® process effectively solubilized and oxidized contaminants. The groundwater contaminant flux data exemplify the S-ISCO process and methodology. The basis of the S-ISCO process is to simultaneously or sequentially solubilize NAPL and sorbed COC species in the subsurface and oxidize them. The groundwater flux measurements demonstrated that as the injection loading rate of Citrus Burst-3 was increased, that locally the solubilization rate exceeded the oxidation rate. However, given increased travel time (and distance) in the subsurface the overall rate of oxidation exceeded the overall solubilization rate.

Summary of Pilot Test Results

When injected, the sodium persulfate immediately dissociates to sodium and persulfate ions and subsequently the persulfate ultimately decomposes to the sulfate ion. All of these compounds collectively make up the bulk of the conductivity measured in groundwater. Electrolytic conductivity is important in understanding rates of transport of injected liquids and effects of density and injection flow rates on transport, while persulfate concentration is important in understanding where oxidation can take place in the subsurface under different injection scenarios. The injected persulfate is reactive, and as such, the persulfate front was expected to, and was found to lag behind the conductivity front.

The objective of confirming that density driven flow is a major factor in the transport of the injected S-ISCO® reagents was achieved during the Pilot Test. Increasing the injected persulfate concentration from 25 g/L to 50 g/L had a dramatic effect on the downward vertical transport of persulfate. Increasing the flow rate from 10 to 20 gpm increased the horizontal transport of the injected chemicals. This exemplifies that the ratio of injected flow rate to density driven flow rate will result in the specific transport of the injected liquids and persulfate was confirmed. By controlling injected solution density and injected flow rate, one can control and deliver S-ISCO® reagents to specific subsurface lithologies, for example, LNAPL smear zones or to zones of deep DNAPL accumulations.

In the Pilot Test, persulfate was underdosed because the mass of chemicals of concern (COCs) present in the Pilot Test Area was greater than initially estimated. When an accurate estimate of COCs is available the injected solution amount and composition can be better controlled, allowing for better targeting of specific depth intervals, better contact of injected solutions with COCs, more appropriate duration of treatment, and a more optimal mass loading of VeruSOL© and persulfate, so that a greater fraction of COCs in soil can be removed.

The Pilot Test demonstrated that the methods presented herein are effective at remediating subsurface contamination by organic compounds that are chemicals of concern (COCs). A reason for the effective removal of the COCs is the control achieved by the methods presented herein over several aspects of the remediation process. Surfactants and cosolvent-surfactant mixtures and oxidants are selected, so that the oxidant does not prematurely degrade the surfactant, and the surfactant can effectively solubilize the COCs. The oxidant travels through the soil without prematurely reacting, so that it efficiently destroys the COCs. Control of where the oxidant reacts can be further enhanced by use of an antioxidant. The components of the injected treatment solution, e.g., oxidant, activator, and surfactant, co-elute, so that they can effectively work in conjunction to destroy COCs. The density of the injected solution is controlled, so that the surfactant, oxidant, activator and other injected components travel downward to where the COCs targeted for destruction are located. The treatment solution can be injected to remove COCs residing at a downgradient location where it is not practical or economical to inject solution, e.g., under a building or railroad track.

Additional embodiments of the invention are as described below.

In an embodiment, the oxidant and the surfactant are added to the soil by using equipment selected from a backhoe, excavator, soil mixing auger, mixing jet, and windrow composting type above ground mixer. The oxidant and the surfactant can be introduced through injection into an injection well, an injection trench, or a temporary injection point. The oxidant and surfactant can be introduced through non-pressurized injection. The oxidant and surfactant can be introduced through an infiltration gallery or monitoring well. The oxidant and surfactant can be introduced by being sprayed on the soil, added as a concentrated slurry to the soil, or added as a solid phase to the soil.

In an embodiment, the solvent includes a biodegradable solvent, a naturally occurring biodegradable solvent, and/or d-limonene. The surfactant can include a biodegradable surfactant, a surfactant made from a naturally occurring biodegradable plant oil, Citrus Burst 1, Citrus Burst 2, Citrus Burst 3, E-Z Mulse, ALFOTERRA 123-8S, ALFOTERRA 145-8S, ALFOTERRA L167-7S, ETHOX HCO-5, ETHOX HCO-25, ETHOX CO-5, ETHOX CO-40, ETHOX ML-5, ETHAL LA-4, AG-6202, AG-6206, ETHOX CO-36, ETHOX CO-81, ETHOX CO-25, ETHOX TO-16, ETHSORBOX L-20, ETHOX MO-14, S-MAZ 80K, T-MAZ 60 K 60, TERGITOL L-64, DOWFAX 8390, ALFOTERRA L167-4S, ALFOTERRA L123-4S, ALFOTERRA L145-4S, and/or ALFOTERRA 53. The surfactant can be made from an oil selected from the group consisting of castor oil, coca oil, coconut oil, soy oil, tallow oil, cotton seed oil, and a naturally occurring plant oil. The activator can include a metal, a chelated metal, Fe(II)-EDTA, and/or Fe(III)-EDTA. The oxidant can include a persulfate, sodium persulfate, ozone, hydrogen peroxide, a percarbonate compound, a peroxide, and/or a peroxide containing compound. In an embodiment, the oxidant is introduced into a subsurface, ground surface, and/or above-ground formation, structure, and/or container in the solid phase.

In an embodiment, the surfactant solubilizes sorbed contaminants.

A method for reducing the concentration of a contaminant in soil can include solubilizing the contaminant and oxidizing the contaminant, with mobilization of the contaminant during solubilization and oxidation is minimal. The contaminant can be a non-aqueous phase liquid.

A method can include forming a Winsor Type I solution or a submicellar surfactant solution or a microemulsion to solubilize the nonaqueous phase liquid contaminant. The contaminant can be simultaneously oxidized and solubilized. The contaminant can be sequentially mobilized and oxidized. The contaminant can be mobilized and then the emulsion can be broken or oxidized.

A method can include collecting a contaminant sample from the subsurface.

A method can include optimizing the hydrophile/lipophile balance (HLB) ratio of the surfactant or surfactants of a solution to be injected, in order to maximize the solubility of the target contaminant.

A method can include determining the spatial mass distribution of the target contaminant in the subsurface. A method can include determining a hydrogeological property of the subsurface. The hydrogeological property can be selected from the group consisting of water saturated zones, water unsaturated zones, hydraulic gradient, saturated thickness, soil composition, hydraulic conductivity, porosity, density, and variation of any of these with time or space. The hydrogeological property can be a physical property or a chemical property. A method can include using the determined spatial concentration distribution of the target contaminant and the hydrogeological property to determine an optimal location of an injection site for introducing the surfactant and oxidant and optionally the solvent and optionally the activator and an optimal amount of surfactant and oxidant and optionally the solvent and optionally the activator to introduce at each injection site. Determining the optimal location of an injection site can include modeling the flow of surfactant and oxidant and optionally the solvent and optionally the activator in the subsurface and selecting an injection site from which the surfactant and oxidant and optionally the solvent and optionally the activator will flow to the target contaminant. Determining the optimal amount of surfactant and oxidant and optionally the solvent and optionally the activator can include determining the amount of surfactant and oxidant and optionally the amount of solvent and optionally the amount of activator to oxidize at least 90% of the target contaminant.

A method for determining a subsurface contaminant remediation protocol can include the following: collecting a soil sample from the subsurface; identifying at least one target contaminant for concentration reduction; choosing a surfactant or surfactants and optionally choosing a solvent and/or cosolvent for injection into the subsurface to desorb and solubilize the at least one target contaminant; choosing an oxidant and optionally choosing an activator for injection into the subsurface to oxidize the target contaminant; choosing the quantity of surfactant for injection into the subsurface to form a Winsor I system or a microemulsion; determining the spatial concentration distribution of the target contaminant; determining a hydrogeological property of the subsurface; and using the determined spatial concentration distribution of the target contaminant and the hydrogeological property to determine the target depth for the surfactant and oxidant and optionally for the solvent, cosolvent, and/or activator. At least one contaminant sample can be collected from the subsurface. An introduced substance can include water.

In an embodiment, the ratio of the mass of surfactant and oxidant and optionally of solvent and activator to the mass of the introduced substance is selected, so that the density of the introduced substance is less than 1 gram/cm$^3$ if, for example, the at least one target contaminant resides above the water table. The ratio of the mass of surfactant and oxidant and optionally of solvent and activator to the mass of the introduced substance can be selected, so that the density of the introduced substance is greater than 1 gram/cm$^3$ if, for example, the at least one target contaminant resides below the water table. The ratio of the mass of surfactant and oxidant and optionally of solvent and activator to the mass of the introduced substance can be selected, so that the density of the introduced substance is about 1 gram/cm$^3$ if, for example, the at least one target contaminant resides at about the same level as the water table. A non-oxidant, non-activator salt can be selected for injection into the subsurface to maximize the fraction of surfactant and oxidant and optionally of solvent and activator that remains at the target depth.

A method for reducing the concentration of a contaminant in a soil at a target depth can include the following: identifying a target depth range for reducing the concentration of the contaminant; selecting a surfactant, an oxidant, and optionally a non-oxidant, non-activator salt; introducing the surfactant, the oxidant, and optionally the non-oxidant, non-activator salt into a subsurface containing the soil; allowing the surfactant to solubilize or desorb the contaminant; and allowing the oxidant to oxidize the contaminant in the subsurface, so that the concentration of the contaminant in the soil is substantially reduced. The surfactant and the oxidant can be introduced together and the oxidant can be selected, so that the combination of the surfactant and the oxidant has a density to maximize the fraction of the surfactant and oxidant mixture that remains within the target depth range. Or the non-oxidant, non-activator salt can be introduced together with the surfactant, the oxidant, or both, and the non-oxidant, non-activator salt can be selected, so that the mixture of the non-oxidant, non-activator salt with the surfactant, the oxidant, or both has a density to maximize the fraction of the surfactant and maximize the fraction of the oxidant that remains within the target depth range. The contaminant can include a non-aqueous phase liquid, a light non-aqueous phase liquid, a dense non-aqueous phase liquid, and/or an aromatic hydrocarbon.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

REFERENCES (1) Hoag, G. E.; Chheda, P.; Woody, B. A.; Dobbs, G. M. "Chemical Oxidation of Volatile Organic Compounds," U.S. Pat. No. 6,019,548. Issued Feb. 1, 2000.
(2) Hoag, G. E.; Chheda, P.; Woody, B. A.; and Dobbs, G. M. "Chemical Oxidation of Volatile Organic Compounds," U.S. Pat. No. 6,474,908. Issued Nov. 5, 2002.
(3) Huang, K., Couttenye, R. A., and Hoag, G. (2002) Kinetics of heat-assisted persulfate oxidation of methyl tert-butyl ether (MTBE). *Chemosphere* 49 (4), 413-420.
(4) Liang, C., Bruell, C., Marley, M., and Sperry, K. (2003) Thermally activated persulfate oxidation of trichloroethylene (TCE) and 1,1,1-trichloroethane (TCA) in aqueous systems and soil slurries. *Soil and Sediment Contamination* 12 (2), 207-228.
(5) Couttenye, R. A.; Huang, K. C.; Hoag, G. E.; Suib, S. L. Evidence of Sulfate Free Radical ($SO_4^-$.) Formation under Heat-assisted Persulfate Oxidation of MTBE. *Proceedings of the 19$^{th}$ Petroleum Hydrocarbons and Organic Chemicals in Ground Water: Prevention, Assessment, and Remediation, Conference and Exposition*, Atlanta, Ga., United States, Nov. 5-8, 2002, 345-350.
(6) Berlin, A. A. *Kinetics and Catalysis*. 1986, 27, 34-39.
(7) House, D. A. *Chem. Rev.* 1962, 62, 185-200.
(8) Kolthoff, I. M.; Medalia, A. I.; Raaen, H. P. *Journal of American Chemical Society.* 1951, 73, 1733-1739.
(9) Kislenko, V. N.; Berlin, A. A.; Litovchenko, N. V. *Russian Journal of General Chemistry.* 1995, 65, 7, 1092-1096.
(10) Kislenko, V. N.; Berlin, A. A.; Litovchenko, N. V. *Kinetics and Catalysis.* 1997, 38, 3, 391-396.
(11) Brown, R., Robinson, D., Sethi, D., and Block, P. Second generation persulfate ISCO. Second International Conference on Oxidation and Reduction Technologies for In-Situ Treatment of Soil and Groundwater. Toronto, Canada.
(12) Hoag, G. E., and Mao, Feng, An Analysis of Chelated Iron Activated Persulfate-Mechanisms and Reactions, The Third International Conference on Oxidation and Reduction Technologies for In-Situ Treatment of Soil and Groundwater (ORTs-3). 2004. San Diego, Calif., Oct. 24-28, 2004.
(13) Liang, C., Bruell, C., Marley, M., and Sperry, K. (2004) Persulfate oxidation for in situ remediation of TCE: II. Activated by chelated ferrous ion. Chemosphere 55 (9), 1225-1233.
(14) Robinson, D., Brown, R., Dablow, J, and Rowland, K. (2004) Chemical oxidation of MGP residuals and dicyclopentadiene at a former MGP site, Proceedings of the Fourth International Conference on the Remediation of Chlorinated and Recalcitrant Compounds, Monterey, Calif., May 2004. Batelle Press, Columbus, Ohio.
(15) Block, P. A., Brown, R. A., and Robinson, D. (2004) Novel activation technologies for sodium persulfate in situ chemical oxidation, Proceedings of the Fourth International Conference on the Remediation of Chlorinated and Recalcitrant Compounds, Monterey, Calif., May 2004. Batelle Press, Columbus, Ohio.
(16) Zhai, X, Hua, I., and Rao, P. S. C. (2004) Cosolvent-enhanced chemical oxidation of PCE by potassium permanganate: Laboratory-scale evaluation, The Third International Conference on Oxidation and Reduction Technologies for In-Situ Treatment of Soil and Groundwater (ORTs-3). 2004. San Diego, Calif., Oct. 24-28, 2004.
(17) Dugan, P. J., Siegrist, R. L., Crimi, M. L., and Divinr, C. E. (2004) Coupling surfactants/cosolvents with oxidants: Effects on remediation and performance assessment, The Third International Conference on Oxidation and Reduction Technologies for In-Situ Treatment of Soil and Groundwater (ORTs-3). 2004. San Diego, Calif., Oct. 24-28, 2004.
(18) Young, C. M., Dwarakanath, V., Mailk, T., Milner, L, Chittet, J., Jazdanian, A., Huston, N, and Weerasooryia, V. (2002) In-situ remediation of Coal-Tar Impacted Soil by Biopolymer-surfactant flooding, Proceedings of the Second International Conference on the Remediation of Chlorinated and Recalcitrant Compounds, Monterey, Calif., May 2002. Batelle Press, Columbus, Ohio.
(19) Carvel, D. D., and Cartwright, R. T. (2005) Innovative heavy oil contaminant remediation at typical MGP remediation sites. Unpublished data from web sites: http://www.mecx.net/services1.html.
(20) Falta, R. W. (1998) Using Phase Diagrams to Predict the Performance of Cosolvent Floods for NAPL Remediation. Ground Water Monit. Rem. 18 (3), 227-232.
(21) Shiau, B. J., Sabatini, D. A., and Harwell, J. H. (1994) Solubilization and mobilization of DNAPLs using direct food additive (edible) surfactants. Ground Water 32, 561-569.
(22) Martel, R.; Gelinas, P. J.; Desnoyers, J. E.; Masson, A. (1993) Phase Diagrams to Optimize Surfactant Solutions for Oil and DNAPL Recovery in Aquifers, Ground Water, 31, 789-800.

(23) Martel, R., and Gelinas, P. (1996) Surfactant solutions developed for NAPL recovery in contaminated aquifers. Ground Water, 34, 143-154.
(24) Chun, H. and Scriven, L. E. Hydrodynamic model of steady movement of a solid/liquid/fluid contact line. *J. Colloid Interface Sci.,* 35:85-101, 1971.
(25) Kotterman, M. J. J., Rietberg, H. J., Hage, A., Field, J. A. (1997) Polycyclic aromatic hydrocarbon oxidation by white-rot fungus Bjerkandera sp. Strain BOS55 in the presence of non-ionic surfactants. Biotechnology and Bioengineering, 57, 220-227.
(26) Tawitz, J. W., Annable, M. D., Rao, P. S. C., and Rhue, R. D. (1998) Field implementation of a Winsor Type I surfactant/alcohol mixture for in situ solubilization of a complex LNAPL as a single phase microemulsion. Environmental Science and Technology, 32, 523-530.

We claim:

1. A method for reducing the concentration of a contaminant in a soil, comprising:
   introducing an oxidant and a surfactant into a subsurface containing the soil;
   allowing the surfactant to solubilize or desorb the contaminant; and
   allowing the oxidant to oxidize the solubilized contaminant in the subsurface, so that the amount of the contaminant in the soil is substantially reduced,
   wherein the overall rate of oxidization of the contaminant is controlled to a predetermined value and the overall rate of solubilization of the contaminant is controlled to a predetermined value by selecting the oxidant and surfactant and adjusting the concentrations of the surfactant and oxidant, so that the rate of oxidation of the contaminant is greater than, less than, or equal to the rate of solubilization of the contaminant,
   wherein at least 40% of the initial mass of contaminant is destroyed in situ in the subsurface,
   wherein the surfactant resists oxidation by the oxidant, and the surfactant increases oxidation of the contaminant, and
   wherein the contaminant comprises a nonaqueous phase liquid (NAPL).

2. The method of claim 1, wherein the rate of oxidation of the contaminant is greater than the rate of solubilization of the contaminant.

3. The method of claim 1, wherein the oxidant and surfactant are introduced through pressurized injection.

4. A method for reducing the concentration of a contaminant in a soil, comprising:
   introducing an oxidant and a surfactant into a subsurface containing the soil;
   introducing an antioxidant into the subsurface containing the soil;
   allowing the surfactant to solubilize or desorb the contaminant; and
   allowing the oxidant to oxidize the solubilized contaminant in the subsurface, so that the amount of the contaminant in the soil is substantially reduced,
   wherein the overall rate of oxidization of the contaminant is controlled to a predetermined value and the overall rate of solubilization of the contaminant is controlled to a predetermined value by selecting the surfactant, oxidant, and antioxidant and adjusting the concentrations of the surfactant, oxidant, and antioxidant, so that the rate of oxidation of the contaminant is greater than, less than, or equal to the rate of solubilization of the contaminant and
   wherein the surfactant resists oxidation by the oxidant.

5. The method of claim 4, wherein the antioxidant is a biodegradable antioxidant.

6. The method of claim 4, wherein the antioxidant is a natural constituent of a plant oil.

7. The method of claim 4, wherein the antioxidant is selected from the group consisting of synthetic organic antioxidants such as beta hydroxy toluene and beta hydroxy anisole.

8. The method of claim 1, wherein the oxidant does not degrade the surfactant prior to a time at which contaminant is solubilized and oxidized.

9. The method of claim 1, wherein the oxidant and surfactant are introduced into the subsurface containing the soil to achieve a concentration of surfactant greater than the critical micelle concentration.

10. The method of claim 9, wherein the oxidant and surfactant are introduced into the subsurface containing the soil to achieve a concentration of surfactant of at least three times the critical micelle concentration.

11. The method of claim 9, wherein the oxidant and surfactant are introduced into the subsurface containing the soil to achieve a concentration of surfactant of at least ten times the critical micelle concentration.

12. The method of claim 1, further comprising optimizing the hydrophile/lipophile (HLB) ratio of a surfactant or HLB ratios of a mixture of surfactants in an injected mixture comprising the surfactant and the oxidant for components of the contaminant in order to maximize the solubility of the contaminant.

13. The method of claim 1, wherein the surfactant and the oxidant are introduced simultaneously.

14. The method of claim 1, wherein the surfactant and the oxidant are introduced sequentially.

15. The method of claim 1, further comprising introducing a solvent into the subsurface.

16. The method of claim 15, wherein the solvent is selected from the group consisting of a biodegradable solvent, a naturally occurring biodegradable solvent, d-limonene, and combinations.

17. The method of claim 1, wherein the surfactant is made from a naturally occurring plant oil.

18. The method of claim 17, wherein the naturally occurring biodegradable plant oil is selected from the group consisting essentially of castor oil, coca oil, coconut oil, soy oil, cotton seed oil, and combinations.

19. The method of claim 1, further comprising introducing an activator into the subsurface.

20. The method of claim 1, wherein the oxidant and surfactant are selected to have a density less that that of water and are introduced above the water table, controlling migration of volatile organic and inorganic contaminants into the unsaturated zone above the water table.

21. The method of claim 1, wherein the oxidant reacts with micellularized contaminant.

22. The method of claim 19, wherein the activator is selected from the group consisting essentially of a metal, ferrous ion, a chelated metal, chelated iron, a transition metal, a complexed metal, a metallorganic complex, Fe(II), Fe(III), Fe(II)-chelate, Fe(II)-EDTA, Fe(III)-EDTA, Fe(II)-citric acid, Fe(III)-citric acid, Fe(II)-NTA, and combinations.

23. The method of claim 19, wherein the activator is heat.

24. The method of claim 19, wherein the activator is a base or caustic chemical and wherein a region of the subsoil in which the contaminant is present has a pH greater than 10.5.

25. The method of claim 1, wherein the oxidant is selected from the group consisting essentially of a persulfate, sodium persulfate, ozone, hydrogen peroxide, a percarbonate compound, a peroxide, a peroxide containing compound, and combinations.

26. The method of claim 1,
further comprising dissolving a salt in the water to increase the density of the introduced composition.

27. The method of claim 1, wherein the oxidant is introduced in an aqueous solution.

28. The method of claim 27, wherein the aqueous solution has a density approximately equal to water.

29. The method of claim 27, wherein the density of the aqueous solution is in the range of from about 1.0 gram/cm$^3$ to about 1.5 gram/cm$^3$.

30. The method of claim 1, wherein the contaminant and the surfactant form a Winsor Type I system or a submicellar surfactant solution in contact with the contaminant or a microemulsion in the subsurface.

31. The method of claim 1, wherein a mixture in the subsurface comprising the contaminant and the surfactant has an interfacial tension of at least the interfacial tension associated with the critical micelle concentration of the surfactant.

32. The method of claim 1, wherein the contaminant and the surfactant do not form a Winsor Type II system or a reversed-micelle system in the subsurface.

33. The method of claim 1, wherein the mobilization of the contaminant during solubilization and oxidation is minimal.

34. The method of claim 1,
wherein the surfactant is in a quantity sufficient to solubilize the nonaqueous phase liquid contaminant, and
wherein the surfactant forms a Winsor I solution or microemulsion.

35. The method of claim 34, wherein the mass ratio of surfactant to oxidant in the subsurface is in the range of from about 0.005 to 1 to about 0.20 to 1.

36. The method of claim 34, wherein the subsurface comprises an oxidized contaminant and an oxidant residue.

37. The method of claim 1, comprising locally mobilizing the contaminant and oxidizing the contaminant.

38. The method of claim 37, comprising forming a Winsor Type II or III solution or microemulsion to mobilize the contaminant.

39. The method of claim 38, wherein the Winsor Type II or III solution or microemulsion is broken or oxidized to destroy the contaminant.

40. The method of claim 1, further comprising:
collecting a soil sample from the subsurface;
identifying the contaminant as a target for concentration reduction;
choosing the surfactant and optionally choosing a solvent or cosolvent for injection into the subsurface to solubilize the contaminant;
choosing the oxidant and optionally choosing an activator for the oxidant for injection into the subsurface to oxidize the contaminant; and
choosing a quantity of the surfactant for injection into the subsurface to form a Winsor I system or a submicellar surfactant solution or a microemulsion.

41. The method of claim 40, further comprising
determining the type and quantity of surfactant and optionally of cosolvent required to solubilize or desorb the contaminant in a batch experiment.

42. The method of claim 40, further comprising determining the spatial concentration distribution of the contaminant in the subsurface.

43. The method of claim 42, further comprising determining a hydrogeological property of the subsurface,
wherein the hydrogeological property is selected from the group consisting of water saturated zones, water unsaturated zones, hydraulic gradient, saturated thickness, soil composition, hydraulic conductivity, porosity, density, and variation of any of these with time or space.

44. The method of claim 43, further comprising using the determined spatial concentration distribution of the contaminant and the hydrogeological property to determine an optimal location of an injection site for introducing the surfactant and oxidant and optionally the solvent and optionally the activator and an optimal amount of surfactant and oxidant and optionally the solvent and optionally the activator to introduce at each injection site,
wherein determining the optimal location of an injection site comprises modeling the flow of surfactant and oxidant and optionally the solvent and optionally the activator in the subsurface and selecting an injection site from which the surfactant and oxidant and optionally the solvent and optionally the activator will flow to the contaminant, and
wherein determining the optimal amount of surfactant and oxidant and optionally the solvent and optionally the activator comprises determining the amount of surfactant and oxidant and optionally the amount of solvent and optionally the amount of activator to oxidize at least 90% of the contaminant.

45. The method of claim 40, further comprising
determining the spatial concentration distribution of the contaminant;
determining a hydrogeological property of the subsurface; and
using the determined spatial concentration distribution of the contaminant and the hydrogeological property to determine the target depth for the surfactant and oxidant and optionally for the cosolvent and activator.

46. The method of claim 45, further comprising selecting the ratio of the mass of surfactant and oxidant and optionally of cosolvent and activator to the mass of an introduced substance to maximize the fraction of surfactant and oxidant and optionally of solvent and activator that remains at the target depth.

47. The method of claim 17, wherein the surfactant comprises at least one citrus terpene, at least one nonionic surfactant selected from the group consisting of ethoxylated soybean oil, ethoxylated castor oil, ethoxylated coconut fatty acid, and amidified, ethoxylated coconut fatty acid, and water.

48. The method of claim 47, wherein the surfactant comprises from about 10 wt % to about 40 wt % of the at least one citrus terpene and from about 10 wt % to about 40 wt % of the at least one nonionic surfactant.

49. The method of claim 47, wherein the surfactant comprises from about 10 wt % to about 40 wt % of the at least one citrus terpene and from about 10 wt % to about 90 wt % of the at least one nonionic surfactant.

50. The method of claim 1,
wherein the oxidant is introduced with a volume of a solution and wherein the surfactant is introduced with a volume of a solution and
wherein no more than 5% of the combined volume of the solution comprising the oxidant and the volume of the solution comprising the surfactant is extracted from the soil.

51. The method of claim 50, wherein a solution introduced into a substrate containing the soil comprises the oxidant and the surfactant.

52. A method for reducing the concentration of a contaminant in a soil, comprising:
   introducing an oxidant and a surfactant into a ground surface or above-ground formation, structure, or container containing the soil;
   allowing the surfactant to solubilize or desorb the contaminant; and
   allowing the oxidant to oxidize the solubilized contaminant, so that the amount of the contaminant in the soil is substantially reduced,
   wherein the overall rate of oxidization of the contaminant is controlled to a predetermined value and the overall rate of solubilization of the contaminant is controlled to a predetermined value by selecting the oxidant and surfactant and adjusting the concentrations of the oxidant and surfactant, so that the rate of oxidation of the contaminant is greater than, less than, or equal to the rate of solubilization of the contaminant,
   wherein at least 40% of the initial mass of contaminant is destroyed in situ in the ground surface or above-ground formation, structure, or container,
   wherein the surfactant resists oxidation by the oxidant, and the surfactant increases oxidation of the contaminant, and
   wherein the contaminant comprises a nonaqueous phase liquid (NAPL).

53. The method of claim 19, wherein the activator is selected from the group consisting essentially of a peroxide, calcium peroxide, and hydrogen peroxide.

54. The method of claim 1, wherein none of the introduced surfactant is extracted from the soil.

55. The method of claim 1, wherein the oxidant is selected from the group consisting essentially of a persulfate and sodium persulfate.

56. The method of claim 1, wherein the surfactant forms micelles in the subsurface.

57. The method of claim 1, wherein the oxidant comprises hydrogen peroxide, a peroxide, and/or a peroxide containing compound.

58. The method of claim 4, wherein the oxidant comprises hydrogen peroxide, a peroxide, and/or a peroxide containing compound.

59. The method of claim 52, wherein the oxidant comprises hydrogen peroxide, a peroxide, and/or a peroxide containing compound.

* * * * *